(12) United States Patent
Yoda

(10) Patent No.: US 6,593,946 B1
(45) Date of Patent: Jul. 15, 2003

(54) CONTROLLING TERMINAL DEVICE TO ASSIST USER OPERATION

(75) Inventor: Kazushi Yoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/317,174

(22) Filed: May 24, 1999

(30) Foreign Application Priority Data

Jul. 6, 1998 (JP) .......................................... 10-190618

(51) Int. Cl.[7] .................................................. G09G 5/00
(52) U.S. Cl. ...................... 345/806; 345/818; 345/520; 345/538
(58) Field of Search ................................. 345/204, 501, 345/511, 520, 530–538, 716, 721, 764–766, 806, 812, 818, 844

(56) References Cited

U.S. PATENT DOCUMENTS 5,774,109 A * 6/1998 Winksy et al. .............. 345/124
6,069,606 A * 5/2000 Sciammarella et al. ..... 345/127

* cited by examiner

*Primary Examiner*—Matthew C. Bella
*Assistant Examiner*—Mackly Monestime
(74) *Attorney, Agent, or Firm*—Staas & Halsey LLP

(57) ABSTRACT

A method of controlling a terminal device which receives display information from a host device and displays the display information on a screen includes the steps of displaying newest display information supplied from the host device in a predetermined area of the screen, and displaying previous display information in a remaining area of the screen, the previous display information having been supplied from the host device and once displayed as the newest display information in said predetermined area.

10 Claims, 45 Drawing Sheets

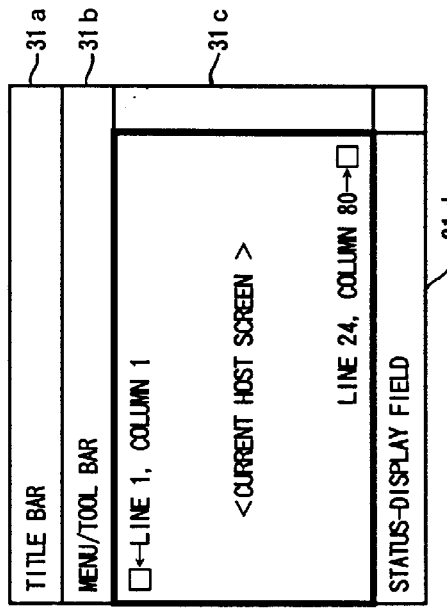
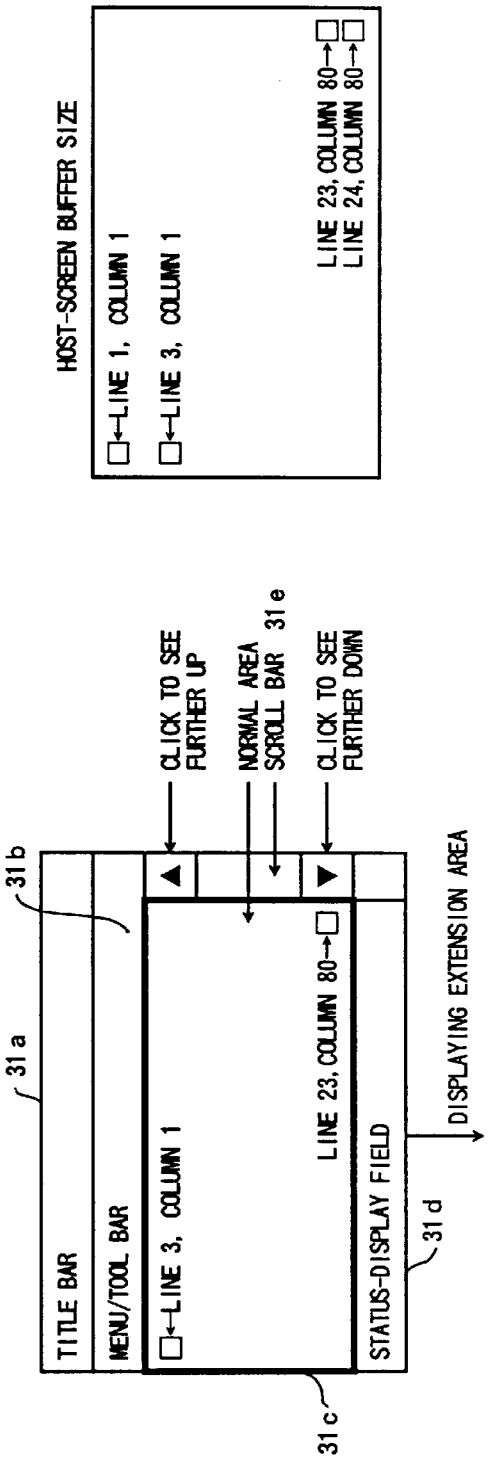

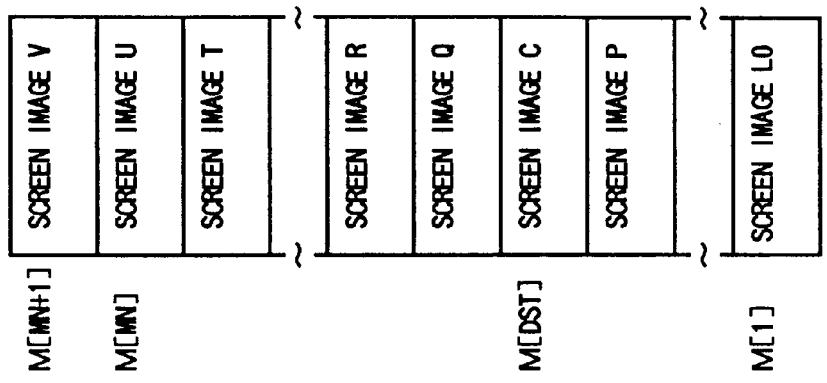
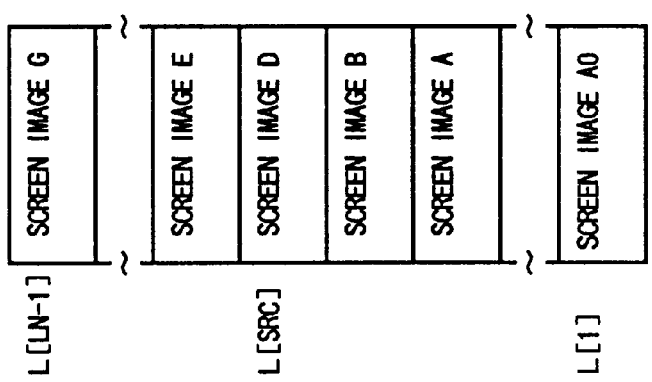
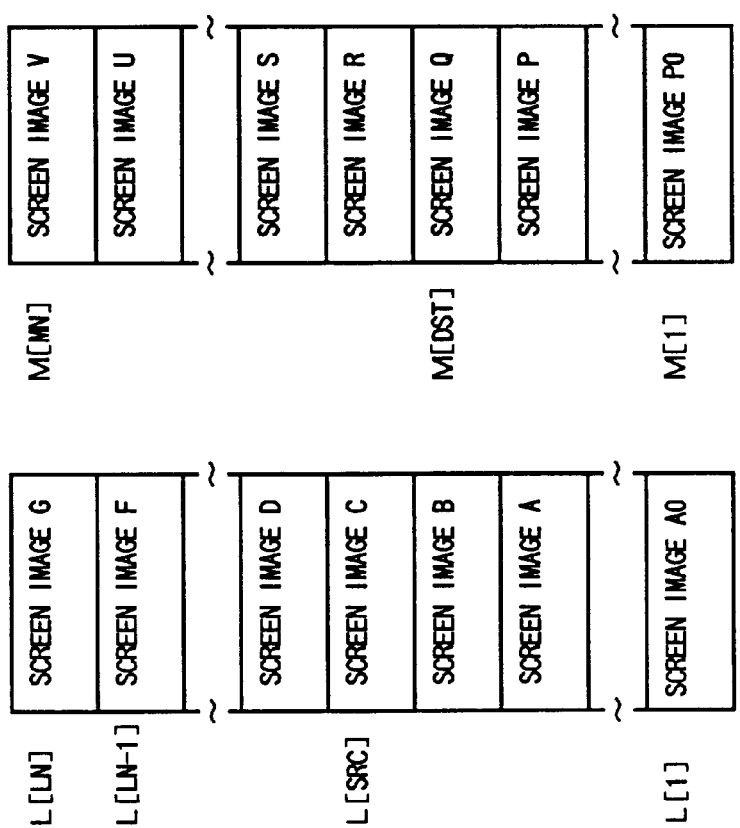
FIG. 43A  FIG. 43B  FIG. 43C  FIG. 43D

CONTROLLING TERMINAL DEVICE TO ASSIST USER OPERATION

BACKGROUND OF THE INVENTION

1. Field of the Invention

The present invention relates to a method of controlling a terminal device, a terminal device operating based on such control, and a memory medium having a program recorded therein for controlling a terminal device. The present invention particularly relates to controlling of a terminal device whereby the terminal device displays results of processing that is performed by a host device.

A display terminal used in a host-terminal system has a screen of 24 rows and 80 columns, for example, and the host system is designed and operated according to such a specification of the screen. Because of development of multi-window environment, however, window sizes on the terminal side are not fixed but vary. In such a system, a system-display screen, a command-input screen, applications, etc., of a host device need to be changed in order to display results of processing on the terminal side when the processing is performed by the host device because the terminal-device screen does not always have a 24-by-80 configuration. A change in a screen size cannot be made only on the terminal side.

2. Description of the Related Art

FIG. 1 is a block diagram showing a configuration of a related-art system.

In a system 1, a host computer 2 is connected to a terminal 3 via a communication line 4.

The host computer 2 includes a program 5, an OS 6, and a communication card 7. The program 5 is designed according to such specifications as a screen is comprised of 24 rows and 80 columns, and operates to supply information to the terminal 3 in response to a request therefrom.

The OS 6 controls execution of programs. The communication card 7 is connected to the communication line 4, and attends to communication with the terminal 3.

The terminal 3 includes a terminal device 8, a display device 9, and a input device 10. The terminal device 8 is connected to the communication line 4, and communicates with the host computer 2 through terminal-emulator processing.

The terminal device 8 includes a communication card 11, an OS 12, and a terminal-emulator program 13.

The communication card 11 attends to communication control of the communication line 4. The OS 12 controls execution of programs installed in the terminal device 8. The terminal-emulator program 13 is used for accessing the host computer 2 to obtain information from the host computer 2 and for displaying the information on the display device 9 in such a size as the host computer 2 determines. For example, the information may be displayed in 24 rows and 80 columns.

The display device 9 is comprised of a CRT, for example, and is connected to the terminal device 8 to display information supplied from the terminal device 8.

The input device 10 is connected to the terminal device 8, and is used for operating the terminal device 8.

In what follows, the terminal-emulator program 13 installed in the terminal device 8 will be described.

FIG. 2 is a block diagram showing functional blocks of a related-art terminal-emulator program.

The terminal-emulator program 13 includes a data-analysis unit 14, a data-display unit 15, a screen buffer 16, a data-input unit 17, and a data-transmission unit 18.

Data supplied from the host computer 2 via the communication line 4 is received and demodulated by the communication card 11. The data demodulated by the communication card 11 is supplied to the terminal-emulator program 13 via a communication driver 19 and a communication-control service 20 under the control of the OS 12.

The data supplied to the terminal-emulator program 13 first goes to the data-analysis unit 14. The data-analysis unit 14 analyzes the data supplied from the communication-control service 20.

The data analysis by the data-analysis unit 14 discriminates commands from display information. The display information is supplied to the screen buffer 16, where the display information is stored in the form of 24 rows and 80 columns as is so designed by the host computer 2. The data-analysis unit 14 further determines whether a command supplied from the host computer 2 is a write command, an erase command, or a read command.

When the write command or the erase command is identified by the data-analysis unit 14, the write command or the erase command is supplied to the data-display unit 15.

In accordance with the command supplied from the data-analysis unit 14, the data-display unit 15 controls the display device 9 via a system-control unit 21, and displays on the display device 9 the 24-by-80 information stored in the screen buffer 16.

The data-input unit 17 receives information about a display area or information about changes in displayed contents via the system-control unit 21 when such information is sent from the input device 10 comprised of a keyboard and a mouse, for example. The received information is supplied either to the data-display unit 15 or to the screen buffer 16. The information about a display area is sent to the data-display unit 15. The data-display unit 15 controls which area portion of the 24-by-80 information is displayed on the display device 9 according to the supplied information about a display area.

The information about changes in displayed contents is supplied to the screen buffer 16. The contents of the screen buffer 16 are changed accordingly.

When a read command is supplied from the host computer 2 to the data-analysis unit 14, the data-analysis unit 14 forwards the read command to the data-transmission unit 18.

Upon receiving the read command, the data-transmission unit 18 sends the information stored in the screen buffer 16 to the host computer 2 via the communication-control service 20, the communication driver 19, the communication card 11, and the communication line 4.

FIG. 3 is an illustrative drawing for explaining operations of the related-art terminal-emulator program.

When receiving the display information from the host computer 2, the terminal-emulator program 13 stores the display information in the screen buffer 16 via the data-analysis unit 14. The display information stored in the screen buffer 16 is mapped to a display screen by the data-display unit 15 according to the information about a display area when the information about a display area is sent from the input device 10 via the data-input unit 17. The mapped display information is supplied to the display device 9 via the system-control unit 21.

For example, as shown in the screen buffer 16 of FIG. 3, the display information may be comprised of "ABC" starting from column 3 at line 1, "DEF" starting from column 40 at line 12, and "GHI" starting from column 78 at line 24.

Where an instruction to display the whole display area is given from the input device 10, the 24-by-80 information stored in the screen buffer 16 is mapped in its entirety as shown in a logical screen 15a of the data-display unit 15. In this case, therefore, all the character strings "ABC", "DEF", and "GHI" stored in the screen buffer 16 are displayed on the display device 9 as shown in FIG. 3 as a window W1.

Where an instruction given from the input device 10 indicates a display area as columns 35–45 of row 12, a portion from column 35 to 45 at line 12, i.e., "DEF", is mapped from the display information stored in the screen buffer 16 as shown in a logical screen 15b of the data-display unit 15. On the display device 9, therefore, only the center portion "DEF" of the display information stored in the data-display unit 15 is displayed as shown in FIG. 3 as a window W2.

FIGS. 4A through 4C are illustrative drawings for explaining a display screen of the related-art terminal. FIG. 4A shows a screen for displaying the whole, and FIG. 4B shows a screen for displaying a part. FIG. 4C shows the contents of the screen buffer 16.

As shown in FIGS. 4A and 4B, a display screen includes a title bar 31a, a menu/tool bar 31b, a contents-display field 31c, a status-display field 31d, and a scroll bar 31e.

The title bar 31a shows a title of the displayed screen. The menu/tool bar 31b provides various menu/tool buttons for editing purposes and for switching of windows or the like.

The contents-display field 31c displays a selected area of the display information stored in the screen buffer 16 as the area is selected by the data-display unit 15. The status-display field 31d displays line numbers of the lines displayed in the contents-display display field 31c. The scroll bar 31e appears in the case of partial display, and is used for moving the area of display.

An instruction to display the whole display information stored in the screen buffer 16 may be given by operating the menu/tool bar 31b. In response to such an instruction, the contents-display field 31c shows the entirety of the display information stored in the screen buffer 16 as shown in FIG. 4A. That is, the display information from line 1:column 1 to line 24:column 80 is displayed.

When an instruction to display a portion of the display information stored in the screen buffer 16 is given by operating the menu/tool bar 31b, the contents-display field 31c displays a portion of the display information stored in the screen buffer 16, e.g., a portion from line 3:column 1 to line 23:column 80 as shown in FIG. 4B.

In the related-art terminal-emulator program, only the contents of the screen buffer 16 can be displayed. When a next display screen is to be displayed, display information is newly obtained from the host computer 2, and the newly obtained display information is written over the existing display information in the screen buffer 16.

When a previous display screen is needed, the display information of the previous display screen is obtained again from the host computer 2, and is written over the existing display information in the screen buffer 16.

In this manner, the terminal-emulator program stores display information in the screen buffer when the display information is supplied from the host computer 2, and displays what is stored in the screen buffer 16. When there is a need to take a look at a previous screen while the display information currently shown on the screen is being edited, the editing is stopped, and the display information edited halfway through is stored in the host computer 2. Then, display information of the previous screen is obtained from the host computer 2, and is stored in the screen buffer 16. When use of this display information is finished, the display information is again stored in the host computer 2. Then, the display information of the original screen is obtained from the host computer 2, and is stored in the screen buffer 16. The editing process is resumed with respect to the display information shown on the screen. In this manner, the whole series of procedure is complex, and does not provide decent manipulability.

In the related-art terminal-emulator program, a screen display operation is not really designed to handle multi-window display in that there is a need to constantly maintain consistency with the host computer 2. This gives rise to a problem that the manipulability of the terminal device is not satisfactory.

Accordingly, there is a need for a scheme for controlling a terminal device which can provide a terminal device with decent manipulability.

SUMMARY OF THE INVENTION

Accordingly, it is a general object of the present invention to provide a scheme for controlling a terminal device which can satisfy the need described above.

It is another and more specific object of the present invention to provide a scheme for controlling a terminal device which can provide a terminal device with decent manipulability.

In order to achieve the above objects according to a first aspect of the present invention, a method of controlling a terminal device which receives display information from a host device and displays the display information on a screen includes the steps of dividing the screen into a plurality of areas, displaying newest display information supplied from the host device in a predetermined one of the areas, and displaying previous display information in one or more remaining areas, the previous display information having been supplied from the host device and once displayed as the newest display information in the predetermined one of the areas.

In the method described above, the newest display information sent from the host device is displayed along with the previous display information. When operating the terminal device, therefore, an operator can constantly refer to the previous display information. This helps to achieve reliable user operation of the terminal device.

According to a second aspect of the present invention, the method as described as the first aspect is such that the one or more remaining areas are dedicated for displaying of the previous display information.

In the method described above, since the previous display information is displayed on the areas dedicated for displaying the previous display information, it is easy to discern the previous information from the newest information.

According to a third aspect of the present invention, the method as described as the first aspect further includes a step of deleting oldest display information among the previous display information displayed in the one or more remaining areas when the newest display information arrives from the host device.

According to a fourth aspect of the present invention, the method as described as the third aspect further includes the steps of arranging the one or more remaining areas in a chronological order, and shifting the previous display information in the one or more remaining areas from one area to a next area toward a chronologically older direction each time the newest display information arrives from the host device.

According to a fifth aspect of the present invention, the method as described as the first aspect further includes the steps of selecting display information, displaying the selected display information in one of the one or more remaining areas, and deleting, from the screen, oldest display information among the previous display information except for the selected display information when the newest display information arrives from the host device.

According to a sixth aspect of the present invention, the method as described as the fifth aspect further includes the steps of arranging the one or more remaining areas in a chronological order, except for the one of the one or more remaining areas, and shifting the previous display information in the chronologically arranged areas from one area to a next area toward a chronologically older direction each time the newest display information arrives from the host device.

According to a seventh aspect of the present invention, the method as described as the first aspect is such that the step of dividing the screen is performed upon a request from a user operating the terminal device.

The methods described above can be practiced by a terminal device which includes a first memory that stores newest display information supplied from the host device, a second memory that stores previous display information that has been supplied from the host device and once stored as the newest display information in the first memory, and a control unit that divides the screen into a plurality of areas, and displays the newest display information in a predetermined one of the areas and the previous display information in one or more remaining areas.

Other objects and further features of the present invention will be apparent from the following detailed description when read in conjunction with the accompanying drawings.

BRIEF DESCRIPTION OF THE DRAWINGS

FIGS. 4A through 4C are illustrative drawings for explaining a display screen of a related-art terminal;

FIGS. 43A through 43D are illustrative drawings for explaining operations of the terminal-emulator program when screen images are shifted according to the second embodiment of the present invention;

DESCRIPTION OF THE PREFERRED EMBODIMENTS

In the following, embodiments of the present invention will be described with reference to the accompanying drawings.

Figure 5:
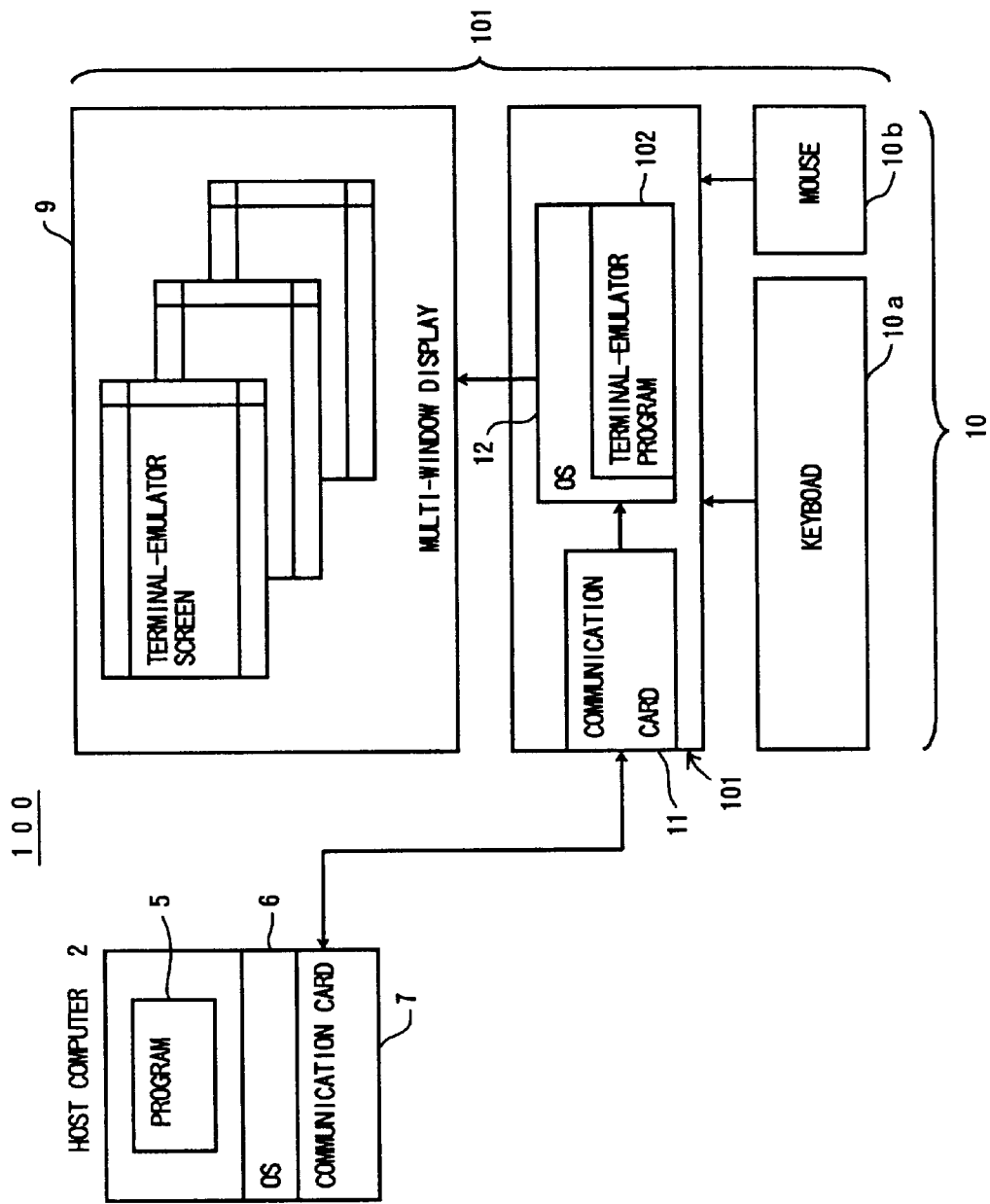
FIG. 5 is a block diagram showing a configuration of a system according a first embodiment of the present invention.

FIG. 5 is a block diagram showing a configuration of a system according a first embodiment of the present invention. In FIG. 5, the same elements as those of FIG. 1 are referred to by the same numerals, and a description thereof will be omitted.

Figure 1:
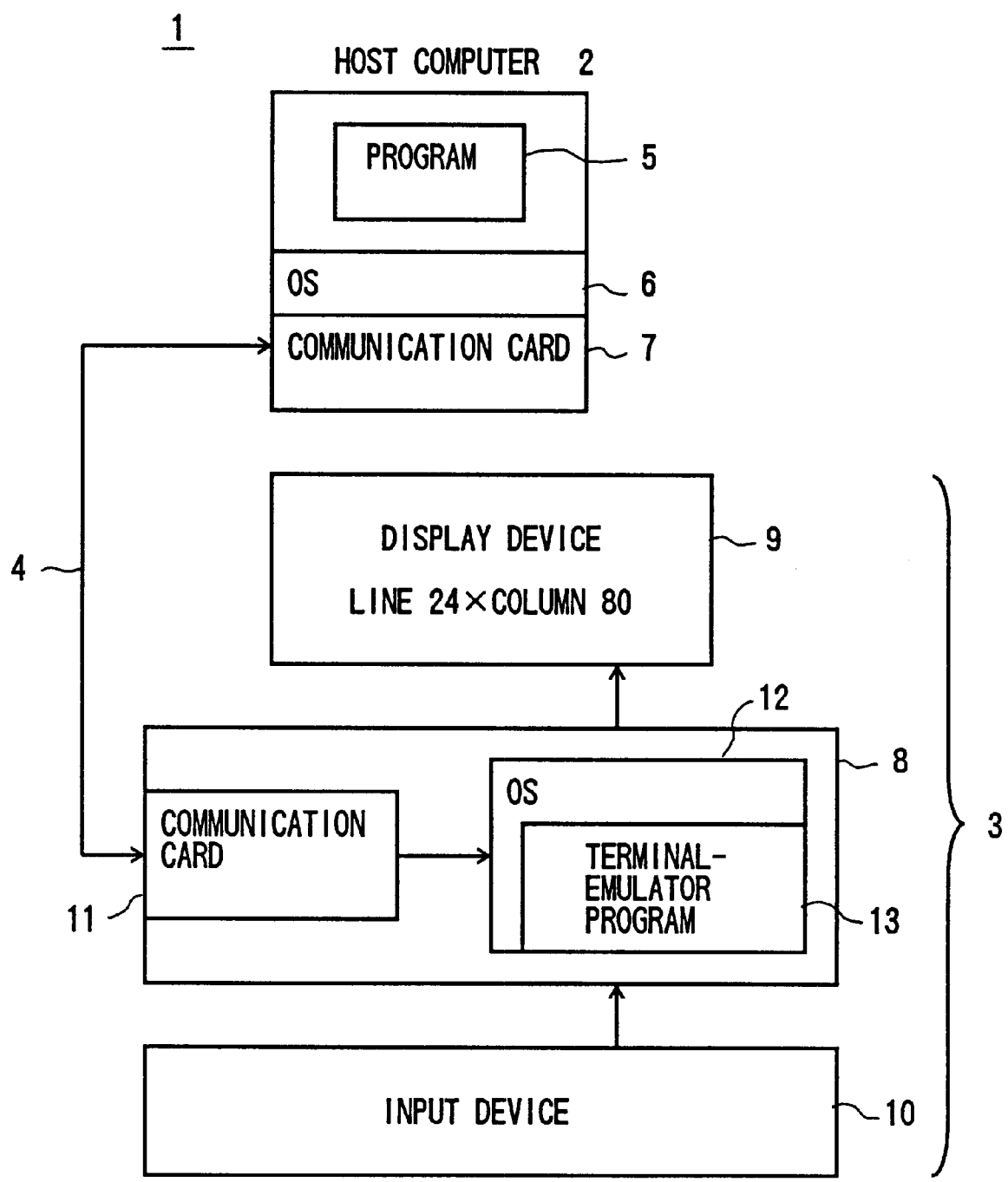
FIG. 1 is a block diagram showing a configuration of a related-art system.

A system 100 of this embodiment differs from that of FIG. 1 in that a terminal-emulator program 102 installed in a terminal device 101 has different functions.

Figure 6:
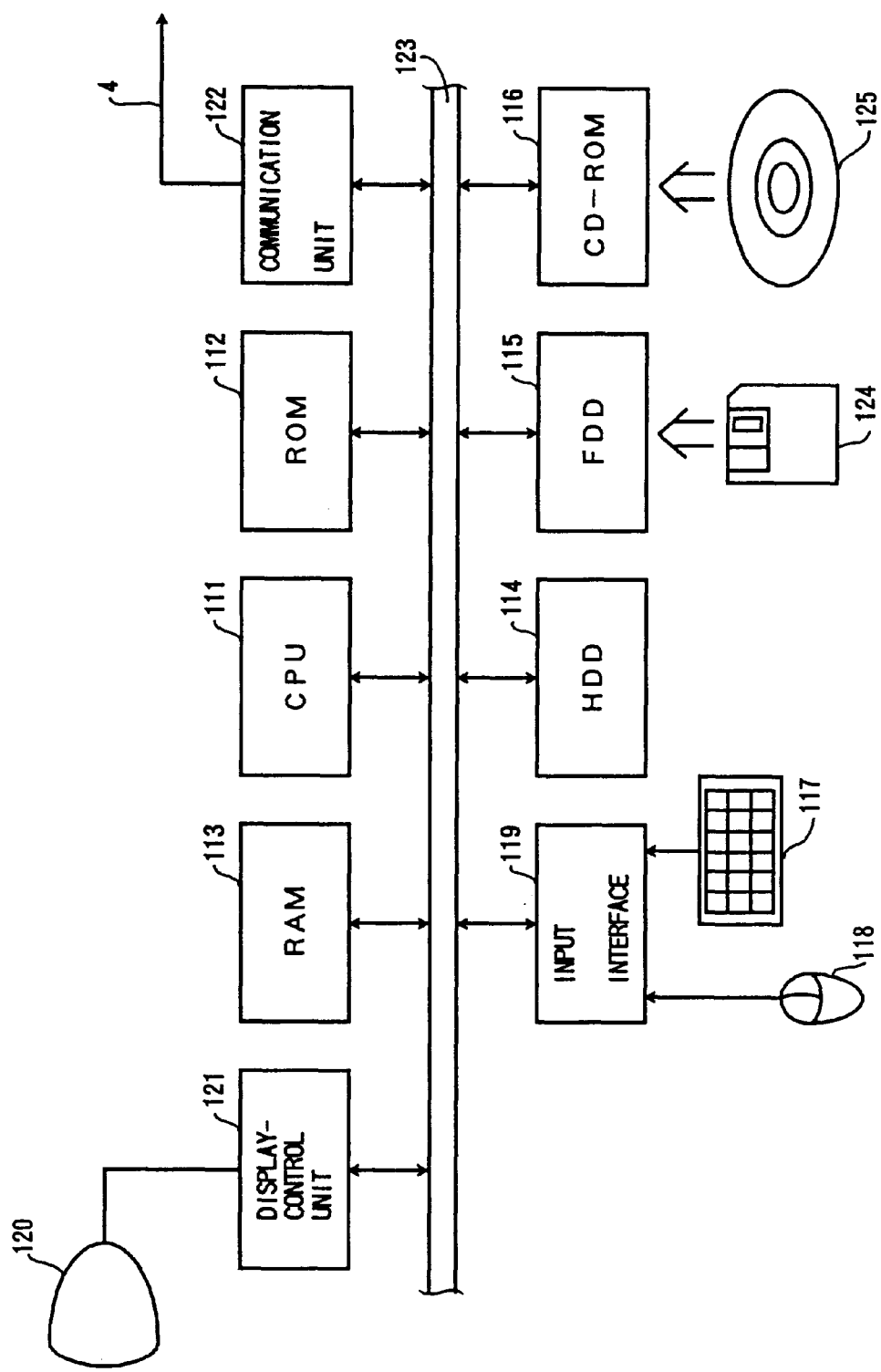
FIG. 6 is a block diagram showing a configuration of a terminal device of the first embodiment of the present invention.

FIG. 6 is a block diagram showing a configuration of the terminal device of the first embodiment of the present invention.

The terminal device 101 includes a CPU 111, a ROM 112, a RAM 113, a hard drive 114, a floppy-disk drive 115, a CD-ROM drive 116, a keyboard 117, a mouse 118, a input interface 119, a display device 120, a display-control unit 121, a communication unit 122, and a bus 123.

The CPU 111 operates according to the OS 12 and application programs stored in the hard drive 114, and attends to processing called for by the programs.

The ROM 112 stores a boot OS for starting the terminal device 101 at the time when the terminal device 101 is switched on. The RAM 113 serves as a work area for the CPU 111, and stores programs to be executed and data to be processed.

The hard drive 114 stores the OS 12 for controlling execution of installed programs, and, also, stores application programs and data. The floppy-disk drive 115 has a floppy disk 124 inserted therein, and reads programs and data magnetically recorded in the floppy disk 124.

The CD-ROM drive 116 has a CD-ROM 125 inserted therein, and reads programs and data optically recorded in the CD-ROM 125. The keyboard 117 is used for entering data via key operations. The mouse 118 is used for moving a position of a pointer displayed on the screen.

The input interface 119 supplies data to the CPU 111 as the data is supplied from the keyboard 117 and the mouse 118 being operated. The display device 120 displays data processed by the CPU 111 according to the programs. The display-control unit 121 converts data processed by the CPU 111 into signals that can be displayed on the display device 120, and attends to display control.

The communication unit 122 communicates with the host computer 2 via the communication line 4. The bus 123 connects between the CPU 111, the ROM 112, the RAM 113, the hard drive 114, the floppy-disk drive 115, the CD-ROM drive 116, the input interface 119, the display-control unit 121, and the communication unit 122.

The hard drive 114 stores therein the terminal-emulator program 102 according to this embodiment. The terminal-emulator program 102 is first loaded in the RAM 113, and, then, is executed by the CPU 111. The terminal-emulator program 102 may be initially stored in the floppy disk 124 or the CD-ROM 125, and is read by the floppy-disk drive 115 or the CD-ROM drive 116 to be installed in the hard drive 114.

Alternatively, the terminal-emulator program 102 stored in the floppy disk 124 or the CD-ROM 125 may be read by the floppy-disk drive 115 or the CD-ROM drive 116, respectively, to be directly loaded in the RAM 113 immediately before the execution thereof.

The terminal-emulator program 102 obtains display information in a 24-by-80 format from the communication line 4 after the host computer 2 processes the display information. The terminal-emulator program 102 then displays the display information, and, also, is used for changing or editing the display information.

Figure 2:
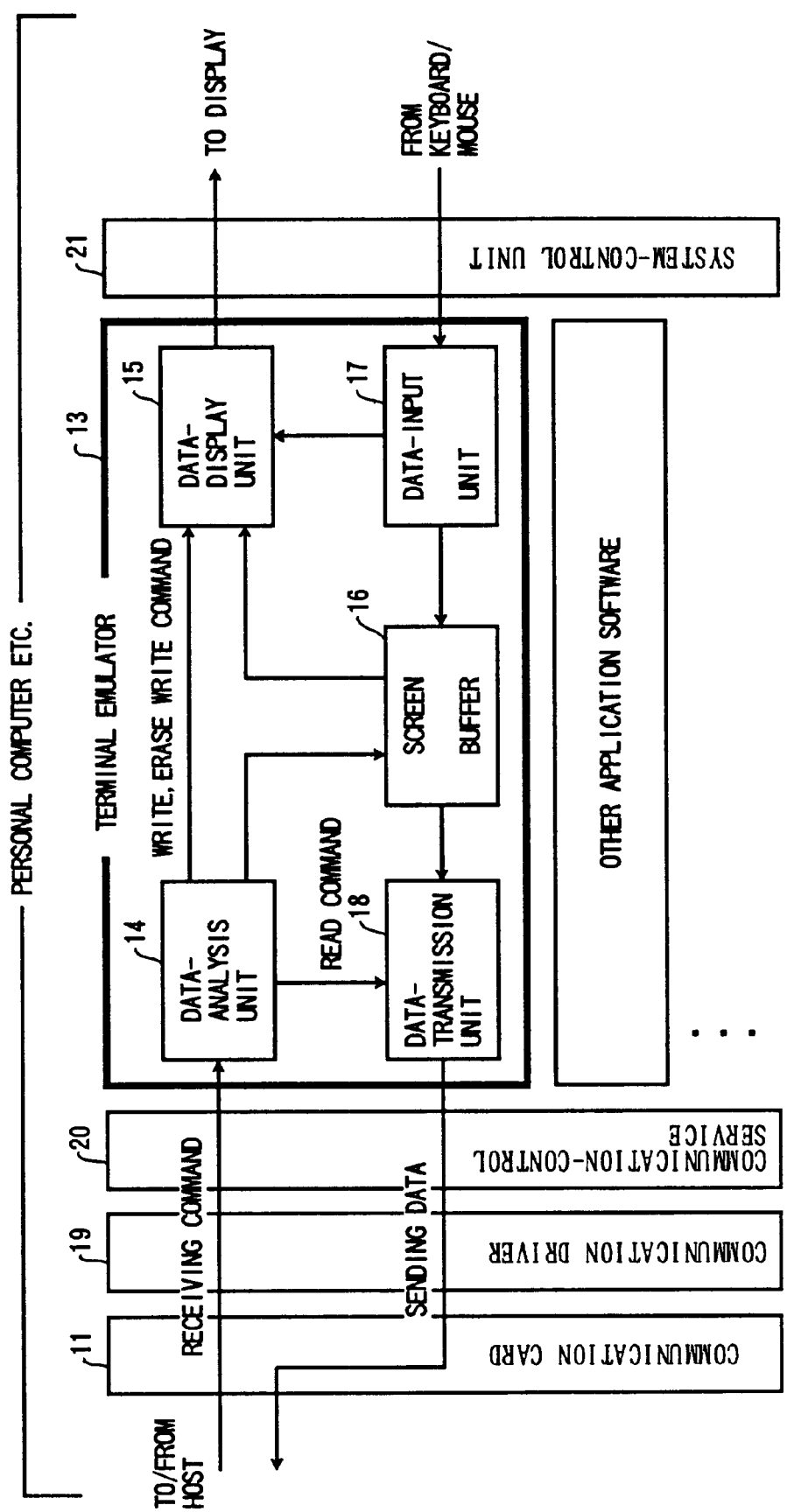
FIG. 2 is a block diagram showing functional blocks of a related-art terminal-emulator program.
Figure 3:
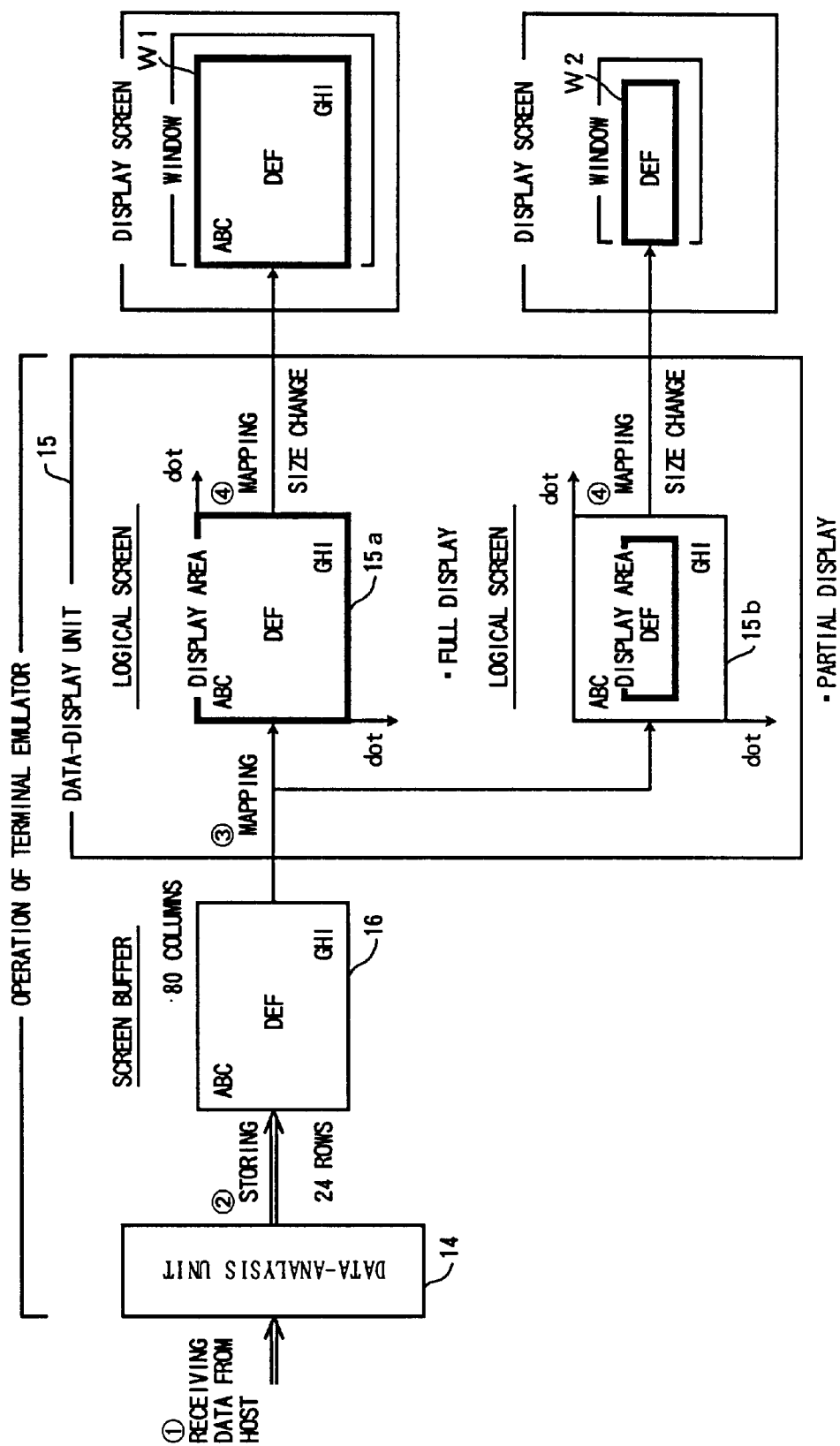
FIG. 3 is an illustrative drawing for explaining operations of the related-art terminal-emulator program.
Figure 7:
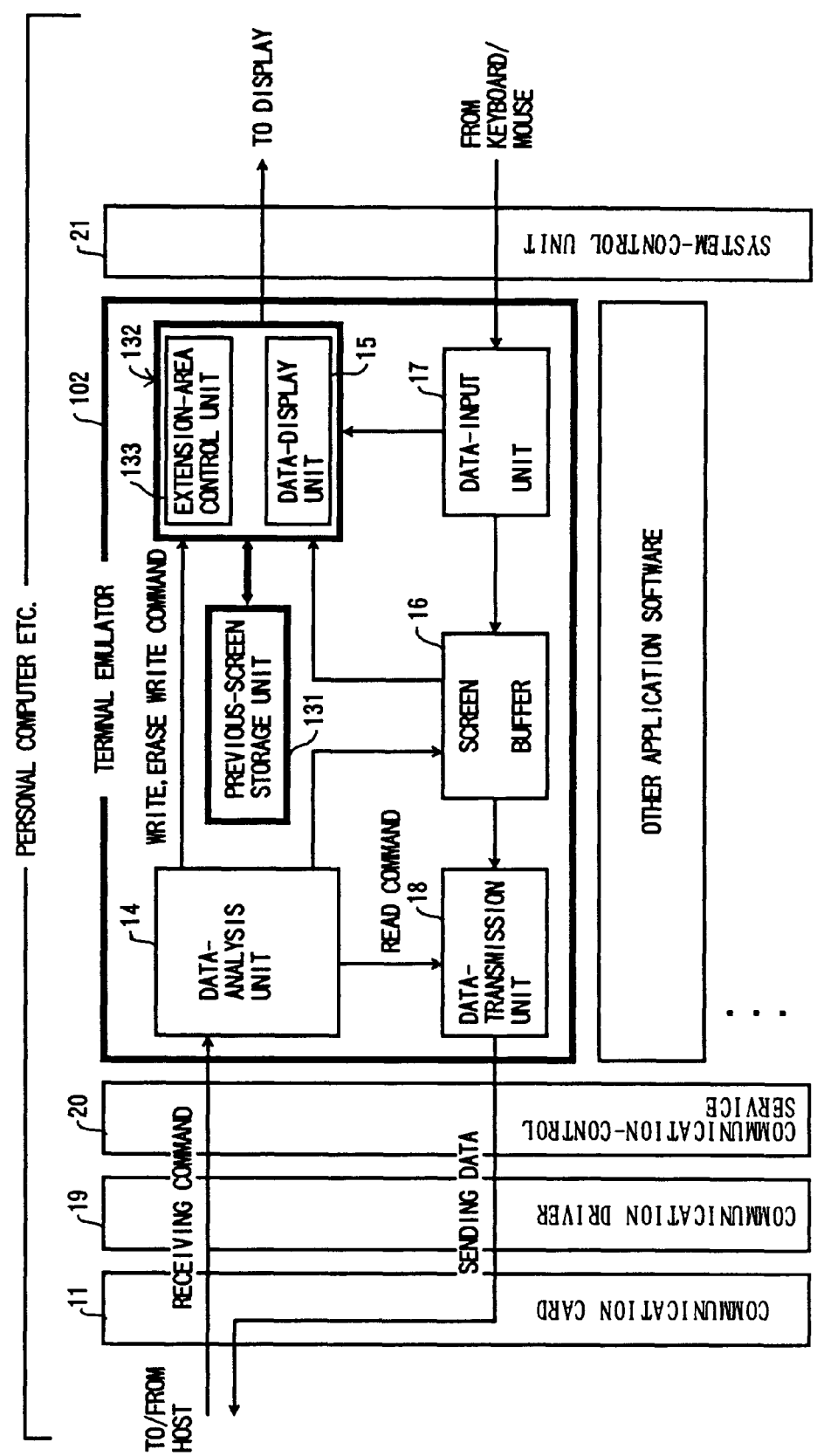
FIG. 7 is a block diagram showing functional blocks of a terminal-emulator program according to the first embodiment of the present invention.

FIG. 7 is a block diagram showing functional blocks of the terminal-emulator program according to the first embodiment of the present invention. In FIG. 7, the same elements as those of FIG. 2 are referred to by the same numerals, and a description thereof will be omitted.

The terminal-emulator program 102 of this embodiment includes the data-analysis unit 14, the screen buffer 16, the data-input unit 17, the data-transmission unit 18, a previous-screen storage unit 131, and a main-control unit 132.

The previous-screen storage unit 131 stores display information that was stored in the screen buffer 16.

The main-control unit 132 includes the data-display unit 15 and an extension-area control unit 133. The data-display unit 15 displays what is currently stored in the screen buffer 16. The extension-area control unit 133 controls displaying of an extension area and displaying of what is stored in the previous-screen storage unit 131 according to commands supplied from the host computer 2 or through operations of the input device 10.

Figure 8:
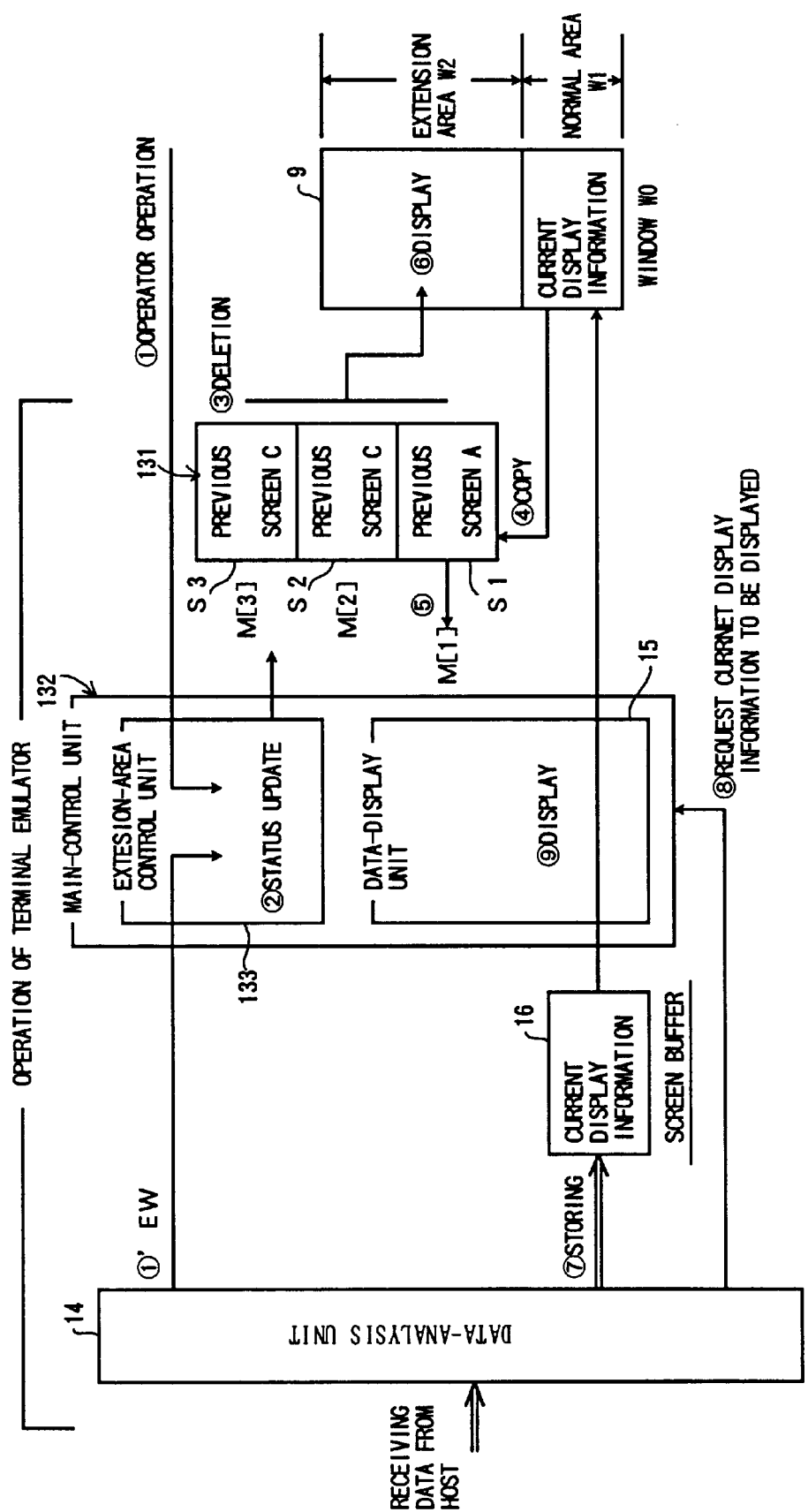
FIG. 8 is an illustrative drawing for explaining operations of the terminal-emulator program according to the first embodiment of the present invention.

FIG. 8 is an illustrative drawing for explaining operations of the terminal-emulator program according to the first embodiment of the present invention.

Upon receiving data from the host computer 2, the data-analysis unit 14 analyzes the received data. If this analysis finds that the data is display information, the data is stored in the screen buffer 16 as a current host screen.

If the data received from the host computer 2 is an erase-write command EW, i.e., a command for rewriting of an entire screen, the erase-write command EW is supplied to the extension-area control unit 133. Upon receiving the erase-write command, the extension-area control unit 133 updates the display information stored in the previous-screen storage unit 131 in accordance with the command. The extension-area control unit 133 may update the display information stored in the previous-screen storage unit 131 in accordance with user operations.

When new display information is to be stored in the screen buffer 16, display information stored in a third previous-screen storage area S3 of the previous-screen storage unit 131 is erased. Display information stored in a second previous-screen storage area S2 is transferred to the third previous-screen storage area S3, and display information stored in a first previous-screen storage area S1 is transferred to the second previous-screen storage area S2.

Further, the first previous-screen storage area S1 stores the current host screen which is displayed in a normal area W1 of a window W0 on the display device 9. That is, the first previous-screen storage area S1 stores what is stored in the screen buffer 16 before rewriting of the screen buffer 16. After this, the screen buffer 16 stores the display information sent from the host computer 2.

The new display information stored in the screen buffer 16 is displayed in the normal area W1 of the window W0 on the display device 9, and the old display information stored in the previous-screen storage unit 131 is displayed in the extension area W2 of the window W0 on the display device 9.

Further, this embodiment allows a choice to be made with respect to the first to third previous-screen storage areas S1 through S3 of the previous-screen storage unit 131, so that a desired image is stored in the selected area. Hereinafter, this operation is referred to as memo display.

Figure 9:
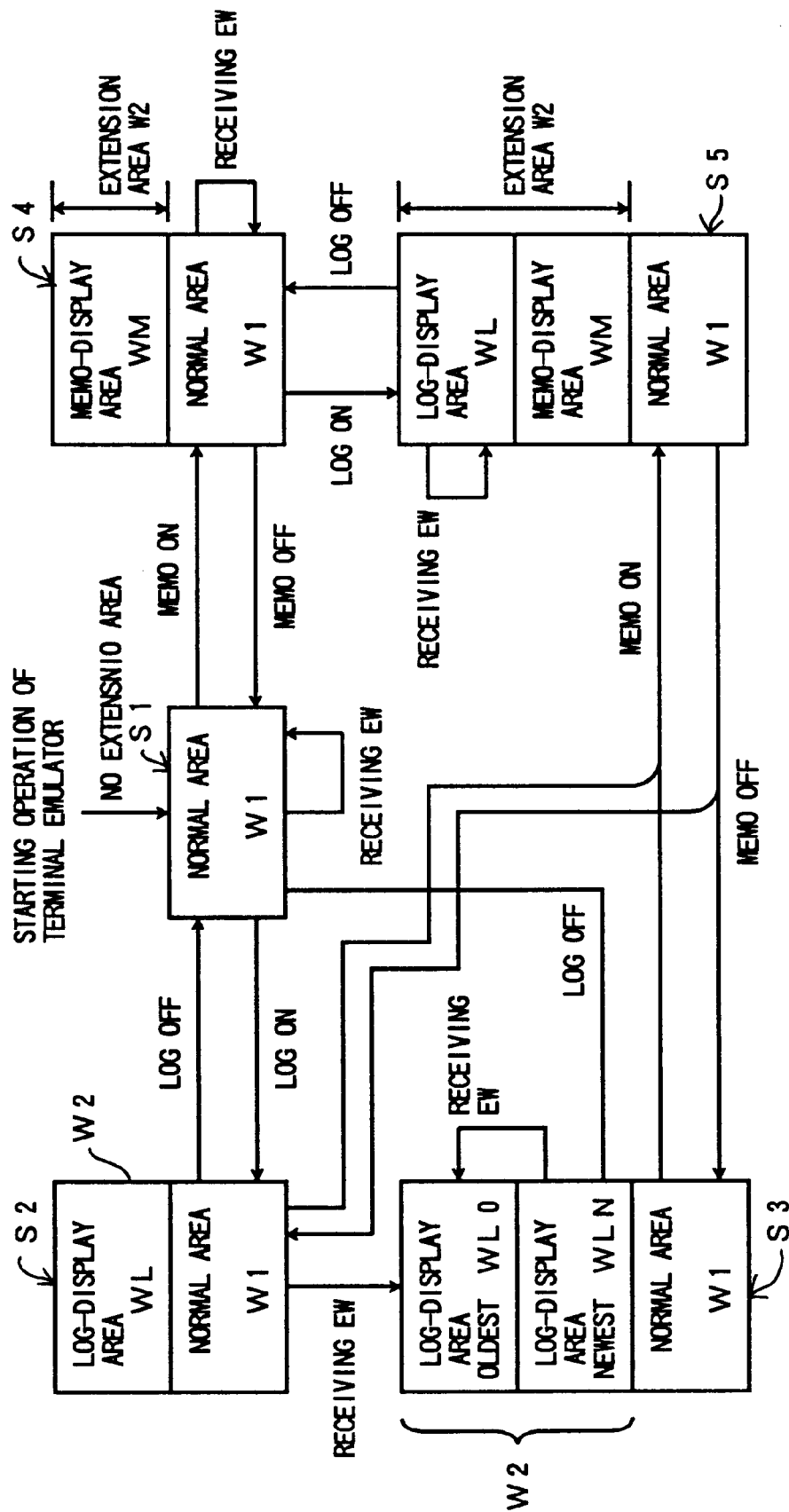
FIG. 9 is an illustrative drawing showing state transitions according to the first embodiment of the present invention.

FIG. 9 is an illustrative drawing showing state transitions according to the first embodiment of the present invention.

When the terminal-emulator program 102 starts to run and new display information is supplied from the host computer 2, the new display information is stored in the screen buffer 16. At this point of time, no display information is stored in the previous-screen storage unit 131, so that only the display information stored in the screen buffer 16 is displayed in the normal area W1 of the window W0 as shown in a state S1. If no instruction is given to display the extension area W2 in the state S1, the normal area W1 is always displayed, and is erased and overwritten each time new display information is supplied from the host computer 2 in the same manner as in the related art.

When display information is supplied from the host computer 2 in the state S1, this display information arriving from the host computer 2 is displayed in the normal area W1. A log-display area WLN, which is provided in the extension area W2 immediately above the normal area W1, displays the display information that had been displayed in the normal area W1 before the new display information was supplied from the host computer 2. A log-display area WL0, which is provided in the extension area W2 immediately above the log-display area WLN, displays the display information that had been displayed in the log-display area WL0 before the new display information was supplied from the host computer 2.

When a memo-display operation is requested via the input device 10 while display information is displayed in the extension area W2, the extension area W2 is changed to a memo-display area WM, and the display information in the memo-display area WM is displayed regardless of presence of new display information. In this state, the normal area W1 is erased and overwritten each time new display information is supplied from the host computer, and, thus, always displays the latest display information.

When a log-start request is made via the input device 10 and new display information is supplied from the host computer 2 in a state S4, the display information displayed in the normal area W1 is newly displayed in the log-display area WL provided above the memo-display area WM in the extension area W2. The normal area W1 shows the new display information supplied from the host computer 2.

When new display information is supplied from the host computer 2 while the normal area W1, the log-display area WL of the extension area W2, and the memo-display area WM of the extension area W2 are displaying respective display information as shown in a state S5, the log-display area WL of the extension area W2 has the display information thereof erased, and newly displays the display information that has been displayed in the normal area. The normal area W1 displays the new display information supplied from the host computer 2.

Figure 10:
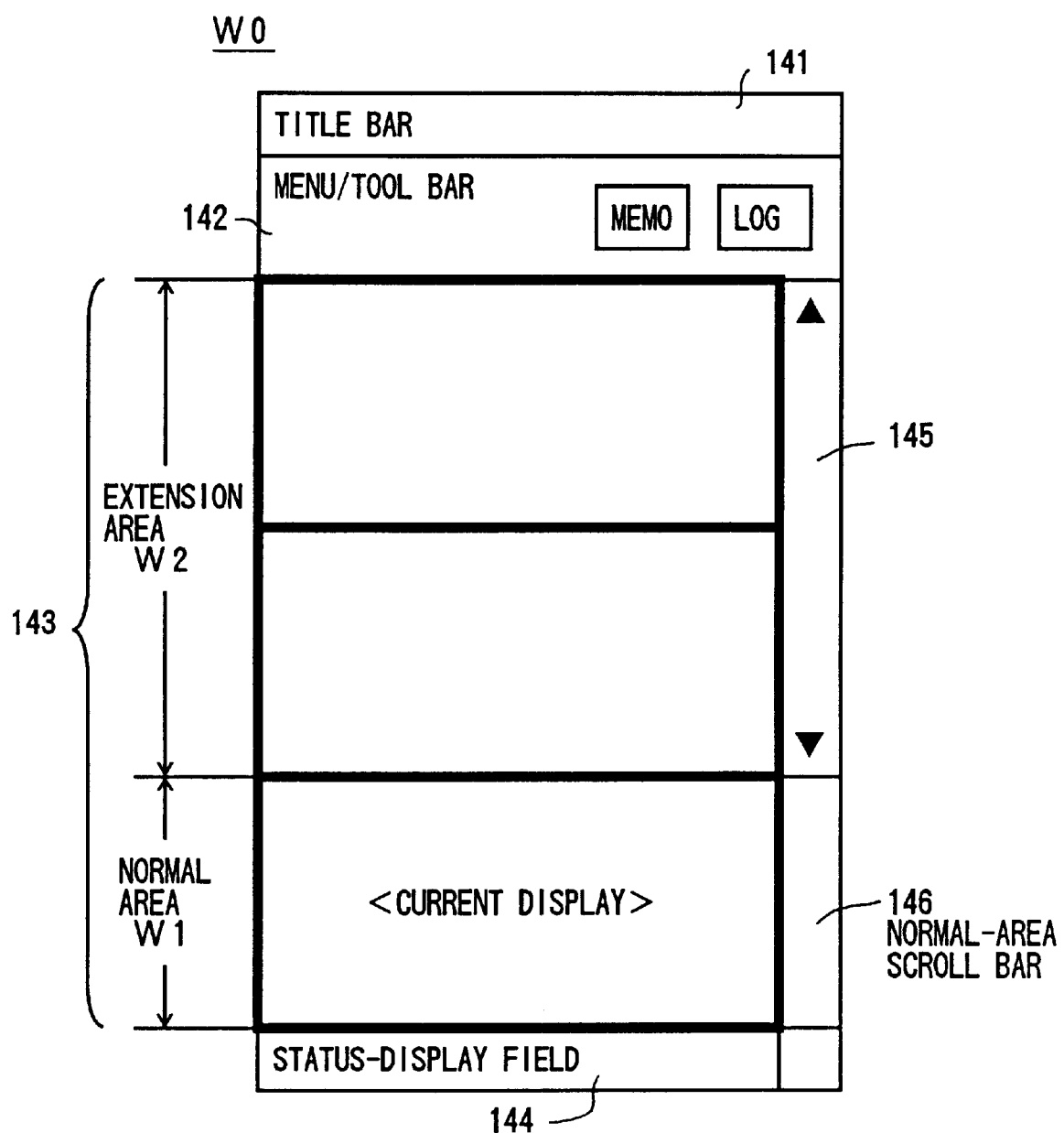
FIG. 10 is an illustrative drawing showing appearance of a display screen according to the first embodiment of the present invention.

FIG. 10 is an illustrative drawing showing appearance of the display screen according to the first embodiment of the present invention.

The window W0 displayed by the terminal-emulator program 102 includes a title bar 141, a menu/tool bar 142, a contents-display field 143, a status-display field 144, an extension-area scroll bar 145, and a normal-area scroll bar 146.

The title bar 141 displays a title of the displayed contents. The menu/tool bar 142 shows various menu/tool buttons for switching and editing of the screen. Such buttons include a memo button 142a for opening the memo-display area WM, a log button 142b for opening the log-display area WL, etc.

The contents-display field 143 includes the normal area W1 and the extension area W2. The normal area W1 displays the newest display information.

The extension area W2 includes one or two areas. Upon click of the memo button 142a in the menu/tool bar 142, the extension area W2 is opened as the memo-display area WM. When the log-button 142b is clicked, the extension area W2 is opened as the log-display area WL.

In what follows, operations of the terminal-emulator program 102 for implementing the above configuration will be described.

Figure 11:
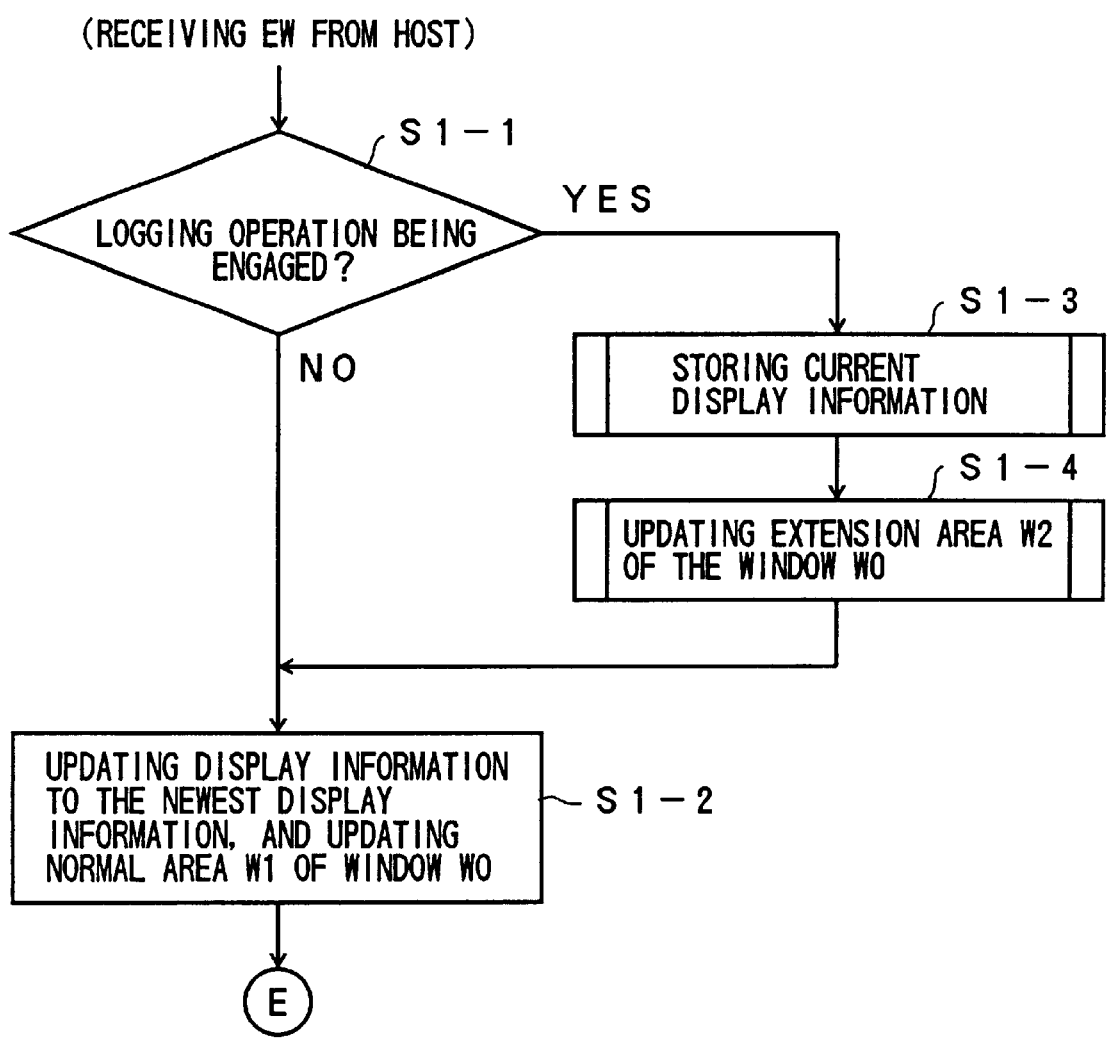
FIG. 11 is a flowchart of a process of the terminal-emulator program responding to an erase-write command according to the first embodiment of the present invention.

FIG. 11 is a flowchart of a process of the terminal-emulator program 102 responding to an erase-write command according to the first embodiment of the present invention.

At a step S1-1, when an erase-write command is received from the host computer 2, a check is made as to whether a logging operation is being engaged.

If a logging operation is not being engaged, display information stored in the screen buffer 16 is updated by the newest display information supplied from the host computer 2, and the normal area W1 of the window W0 is also updated to display the newest display information (step S1-2).

If the step S1-1 finds that a logging operation is being engaged, the current-display information is stored in the previous-screen storage unit 131 (step S1-3).

After the current display information is stored in the previous-screen storage unit 131 at the step S1-3, the display information in the previous-screen storage unit 131 is displayed in the extension area W2 of the window W0 at a step S1-4. After the display information in the previous-screen storage unit 131 is displayed in the extension area W2 of the window W0 at the step S1-4, the display information of the screen buffer 16 is updated by the newest display information supplied from the host computer 2, and the normal area W1 of the window W0 newly displays the newest display information (step S1-2).

In what follows, a process of storing the current display information in the previous-screen storage unit 131 at the step S1-3 will be described.

Figure 12:
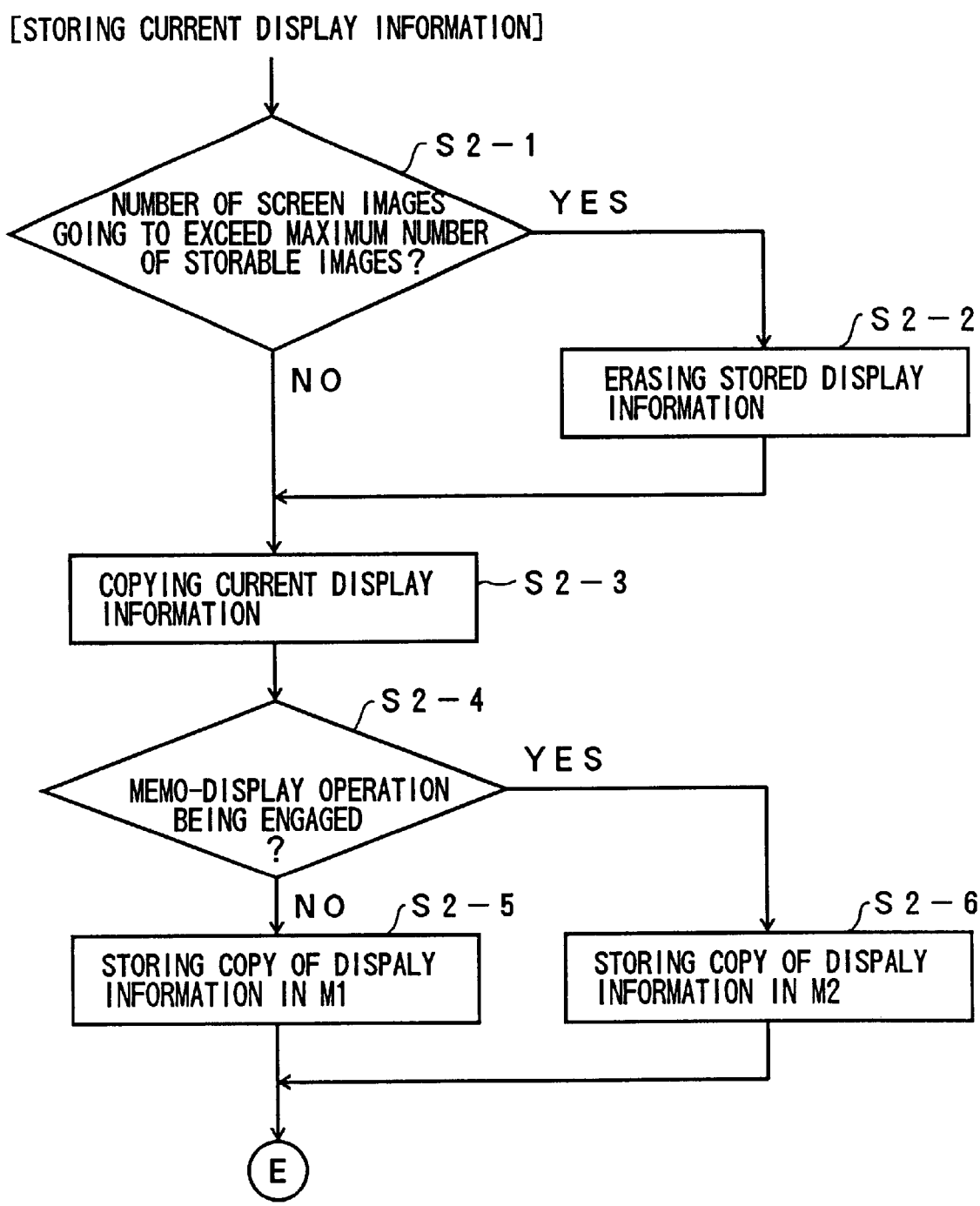
FIG. 12 is a flowchart of a process of storing current display information performed by the terminal-emulator program according to the first embodiment of the present invention.

FIG. 12 is a flowchart of a process of storing current display information performed by the terminal-emulator program according to the first embodiment of the present invention.

When current display information is to be stored by the terminal-emulator program 102, first, a check is made as to whether the number of screen images of stored display information is going to exceed a maximum number of storable images of the previous-screen storage unit 131 (step S2-1).

If it is going to exceed the maximum number of storable images of the previous-screen storage unit 131, the display information stored in the uppermost area of the previous-screen storage unit 131 is erased, i.e., the oldest display information is erased (step S2-2).

If the step S2-1 finds that the number of screen images of stored display information is not going to exceed a maximum number of storable images of the previous-screen storage unit 131, or after the display information stored in the uppermost area of the previous-screen storage unit 131 is erased at the step S2-2, the current display information is copied (step S2-3).

After the step S2-3, a check is made as to whether the memo-display operation is being engaged (step S2-4).

If no memo-display operation is being engaged, all the display information stored in the previous-screen storage unit 131 is shifted upwards from a given area to the next upper area, and, then, the display information is stored in the lowermost area M1 (step S2-5).

If the step S2-4 finds that a memo-display operation is being engaged, all the display information stored in the previous-screen storage unit 131 except for the display information used for the memo-display operation is shifted upwards from a given area to the next upper area, and, then, the display information is stored in the second lowermost area M2 (step S2-6).

Figure 13:
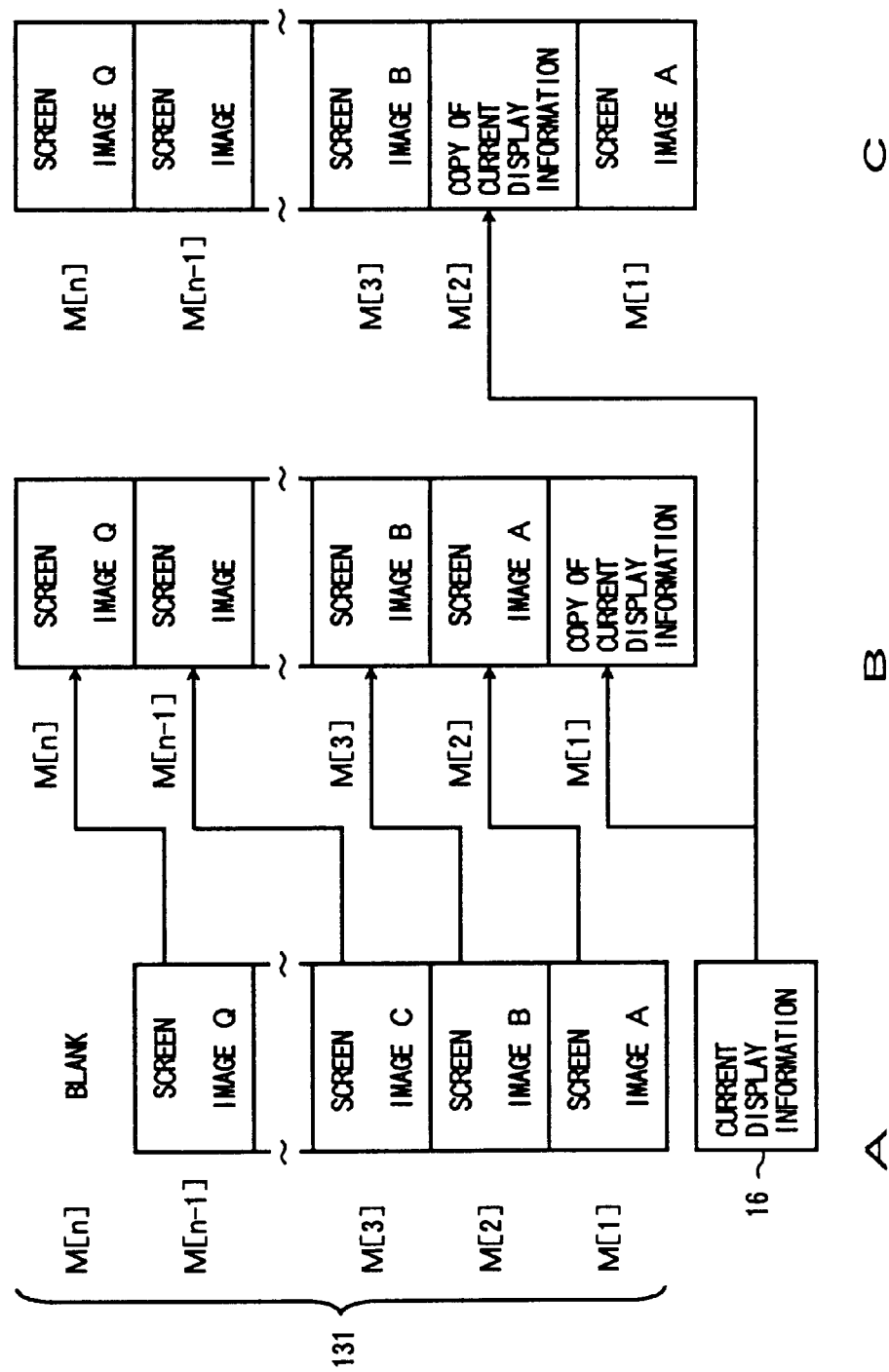
FIGS. 13 and 14 are illustrative drawings for explaining a process of storing current display information performed by the terminal-emulator program according to the first embodiment of the present invention.
Figure 14:
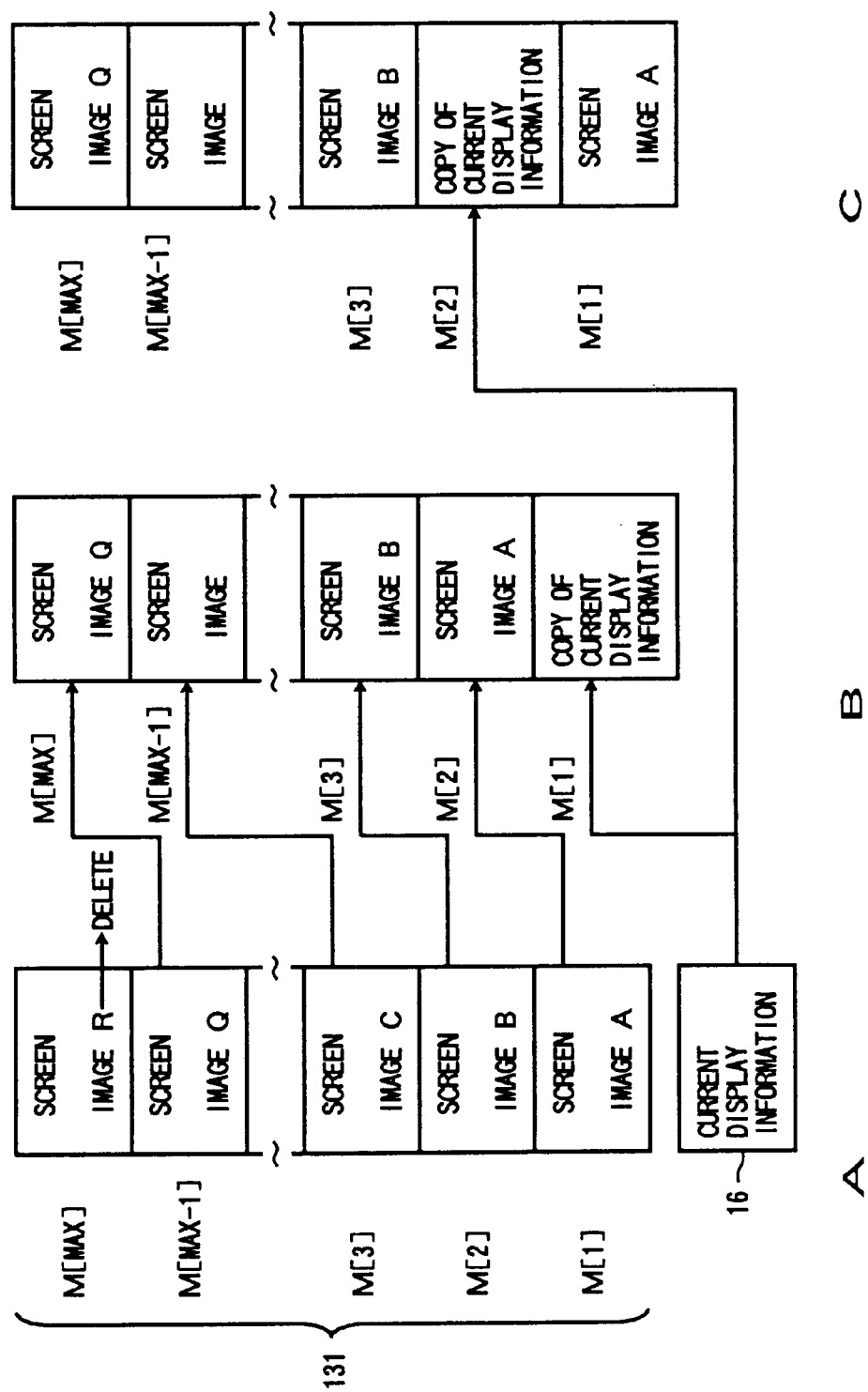

FIGS. 13 and 14 are illustrative drawings for explaining the process of storing the current display information performed by the terminal-emulator program according to the first embodiment of the present invention.

FIG. 13 shows operations of the process when the number of screen images of stored display information is not going to exceed the maximum number by adding the current display information. FIG. 14 shows operations of the process when the number of screen images of stored display information is going to exceed the maximum number by adding the current display information.

As described above, the step S2-3 and the following steps are performed when the step S2-1 finds that the number of screen images of stored display information is not going to exceed the maximum number of images storable in the previous-screen storage unit 131. The operations performed at these steps will be described with reference to FIG. 13.

In FIG. 13, column A shows the way the screen buffer 16 and the previous-screen storage unit 131 appear prior to the storing of the current display information in the previous-screen storage unit 131. Column B shows the way the previous-screen storage unit 131 appears when the current display information is stored in the lowermost area of the previous-screen storage unit 131. Column C shows the way the previous-screen storage unit 131 appears when the current display information is stored in the second lowermost area of the previous-screen storage unit 131.

As shown in column A of FIG. 13, the current display information is stored in the screen buffer 16 at the step S2-1. As shown in column A, also, the previous-screen storage unit 131 includes previous-screen areas M1 through Mn, and screen images A through Q are stored in the previous-screen areas M1 through Mn−1.

If the step S2-5 is performed in the state as shown in column A of FIG. 13, the screen images A through Q stored in the areas M1 through Mn−1 are shifted upwards to be newly stored in the previous-screen areas M2 through Mn as shown in column B of FIG. 13. The previous-screen area M1 of the previous-screen storage unit 131 then stores the current display information which is stored in the screen buffer 16.

In this manner, the current display information stored in the screen buffer 16 is stored in the lowermost area M1 of the previous-screen storage unit 131.

If the step S2-6 is performed in the state as shown in column A of FIG. 13, the following operations are carried out.

When the step S2-6 is performed, the screen images B through Q stored in the previous-screen areas M2 through Mn−1 are shifted upwards to be newly stored in the previous-screen areas M3 through Mn as shown in column C of FIG. 13. Then, the previous-screen area M2 of the previous-screen storage unit 131 stores the current display information which is stored in the screen buffer 16.

In this manner, the current display information stored in the screen buffer 16 is stored in the second lowermost area M2 of the previous-screen storage unit 131.

As described above, the step S2-2 and the following steps are performed when the step S2-1 finds that the number of screen images of stored display information is going to exceed the maximum number of images storable in the previous-screen storage unit 131. The operations performed at these steps will be described with reference to FIG. 14.

In FIG. 14, column A shows the way the screen buffer 16 and the previous-screen storage unit 131 appear prior to the storing of the current display information in the previous-screen storage unit 131. Column B shows the way the previous-screen storage unit 131 appears when the current display information is stored in the lowermost area of the previous-screen storage unit 131. Column C shows the way the previous-screen storage unit 131 appears when the current display information is stored in the second lowermost area of the previous-screen storage unit 131.

As shown in column A of FIG. 14, the current display information is stored in the screen buffer 16 at the step S2-1. As shown in column A, also, the previous-screen storage unit 131 includes previous-screen areas M1 through Mmax, and screen images A through R are stored in the previous-screen areas M1 through Mmax.

If the step S2-5 is performed in the state as shown in column A of FIG. 14, the screen image R stored in the previous-screen area Mmax is deleted, and the screen images A through Q stored in the areas M1 through Mmax−1 are shifted upwards to be newly stored in the previous-screen areas M2 through Mmax as shown in column B of FIG. 14. The previous-screen area M1 of the previous-screen storage unit 131 then stores the current display information which is stored in the screen buffer 16.

In this manner, the current display information stored in the screen buffer 16 is stored in the lowermost area M1 of the previous-screen storage unit 131.

If the step S2-6 is performed in the state as shown in column A of FIG. 14, the following operations are carried out.

When the step S2-6 is performed, the screen image R stored in the previous-screen area Mmax is deleted, and the screen images B through Q stored in the previous-screen areas M2 through Mmax−1 are shifted upwards to be newly stored in the previous-screen areas M3 through Mmax. Then, the previous-screen area M2 of the previous-screen storage unit 131 stores the current display information which is stored in the screen buffer 16.

In this manner, the current display information stored in the screen buffer 16 is stored in the second lowermost area M2 of the previous-screen storage unit 131.

In the following, display updating of the extension area W2 performed at the step S1-4 will be described.

Figure 15:
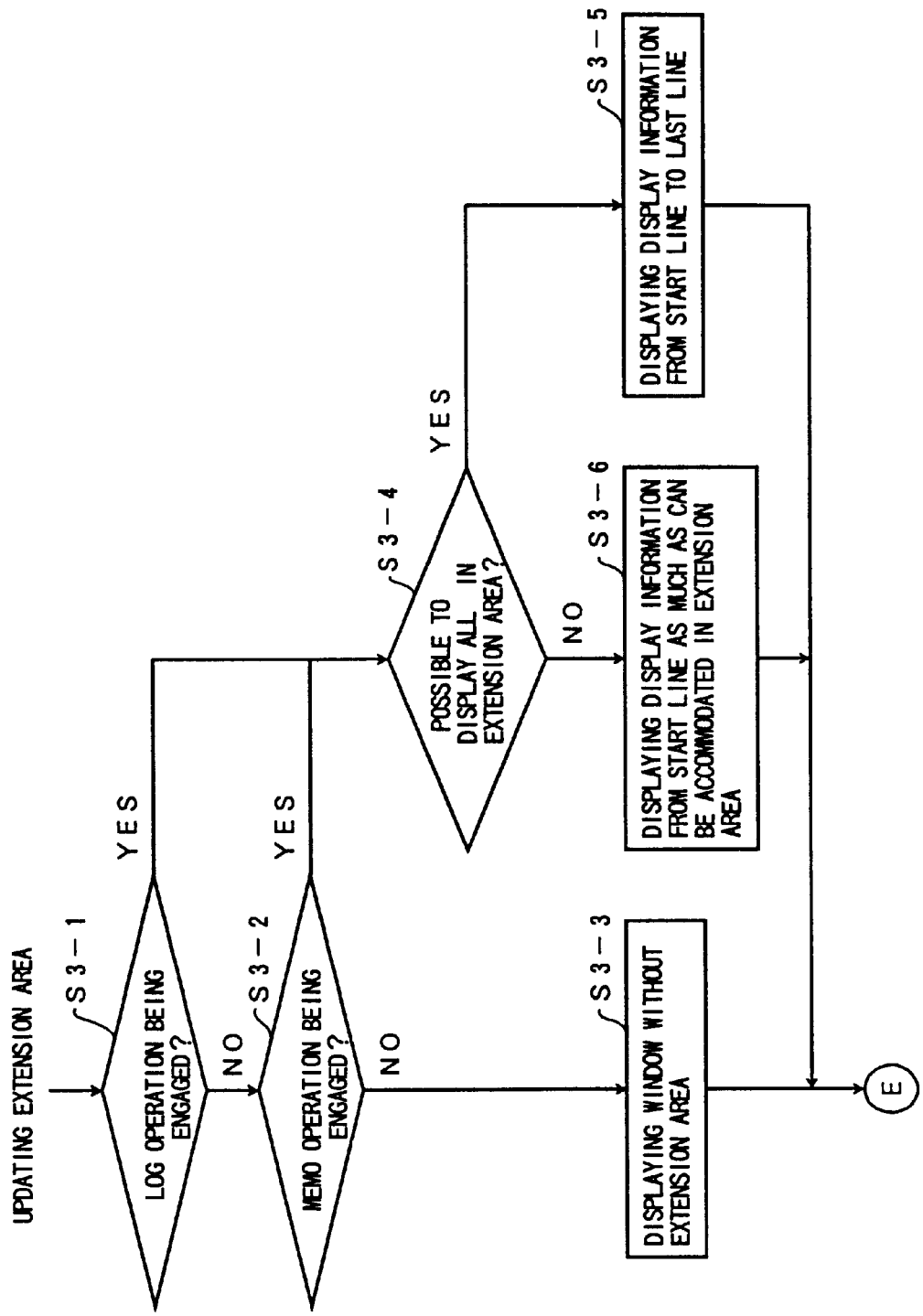
FIG. 15 is a flowchart of a process of updating an extension area performed by the terminal-emulator program according to the first embodiment of the present invention.

FIG. 15 is a flowchart of a process of updating the extension area performed by the terminal-emulator program according to the first embodiment of the present invention.

In the display updating of the extension area W2, a check is made first as to whether a logging operation is being engaged (step S3-1). If no logging operation is being engaged, a check is made whether a memo-display operation is being engaged (step S3-2).

If neither a logging operation nor a memo-display operation is being engaged, the window W0 is controlled in such a fashion as to display only the normal area W1 without displaying the extension area W2 as in the related art (step S3-3).

If both a logging operation and a memo-display operation are being engaged, a check is made whether all the display information stored in the previous-screen storage unit 131 can be displayed in the extension area W2 of the window W0 (step S3-4).

If the step S3-4 finds that all the display information can be displayed, the entirety of the display information stored in the previous-screen storage unit 131 is displayed in the extension area W2 of the window W0 (step S3-5).

If the step S3-4 finds that all the display information stored in the previous-screen storage unit 131 cannot be displayed in the extension area W2 of the window W0, a predetermined number of lines of the display information stored in the previous-screen storage unit 131 are displayed in the extension area W2 by starting from a display start line specified in advance (step S3-6). Here, the predetermined number is the maximum number of lines which can be displayed in the extension area W2.

In what follows, the display updating of the extension area will be further described with reference to drawings.

FIGS. 16A through 16C and FIG. 17 are illustrative drawings for explaining operations of the display updating of the extension area performed by the terminal-emulator program according to the first embodiment of the present invention.

Figure 16:
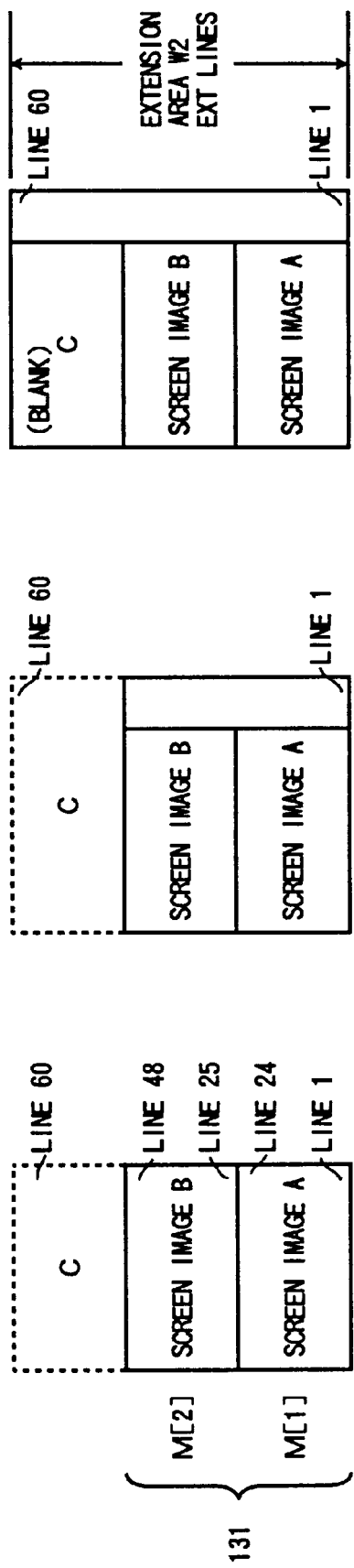
FIGS. 16A through 16C and FIG. 17 are illustrative drawings for explaining operations of display updating of the extension area performed by the terminal-emulator program according to the first embodiment of the present invention.

FIG. 16A shows the way the previous-screen storage unit 131 appears, and FIG. 16B shows the way the display information of the previous-screen storage unit 131 appears when it is displayed in the extension area W2. Further, FIG. 16C shows another example of the way the display information of the previous-screen storage unit 131 appears when it is displayed in the extension area W2.

As shown in FIG. 16A, the previous-screen areas M1 and M2 of the previous-screen storage unit 131 store screen images A and B, respectively, each of which is comprised of lines 1–24. If the display information stored in the previous-screen storage unit 131 has a total number of lines smaller than all the lines of the extension area W2, an excessive blank portion C of the extension area W2 is erased.

As shown in FIG. 16A, the screen images A and B stored in the previous-screen storage unit 131 have 24 lines each, so that the screen images A and B combined together constitute 48 lines on display.

In this example, the extension area W2 is designed to have 60 lines as a display area. When the screen images A and B are displayed in the extension area W2, therefore, the lines 49–60 of the extension area W2 becomes the blank portion C. When this happens, the blank portion C is erased, so that the extension area W2 is displayed as having only lines 1–48 as shown in FIG. 16B. In this manner, the screen images A and B are displayed without the blank area C.

Alternatively, the extension area W2 may display the screen images A and B stored in the previous-screen storage unit 131 as well as the blank portion C as part thereof by retaining all the lines 1–60 of the extension area W2 as shown in FIG. 16C. When the blank portion C is displayed without erasure thereof, there is no need to modify the size of the extension area W2 depending on the size of the screen images A and B. This simplifies the process.

Figure 17:
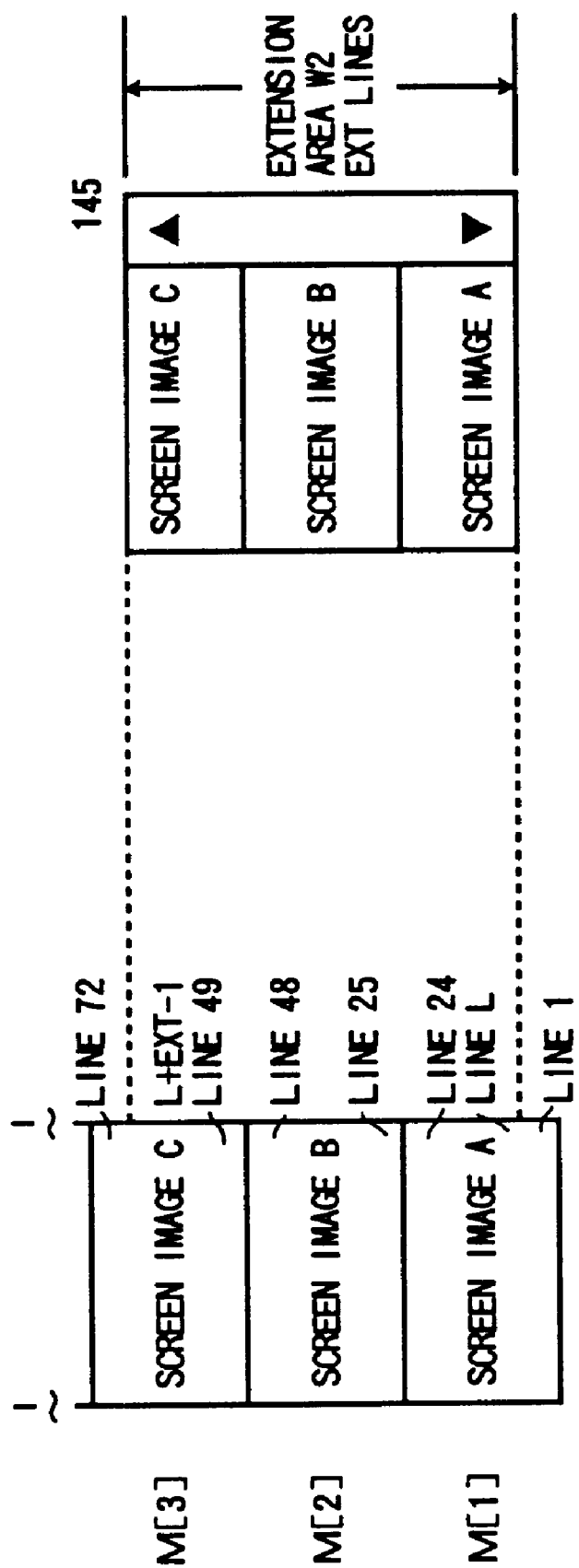

FIG. 17 shows a situation in which screen images A through C are respectively stored in the previous-screen areas M1 through M3 of the previous-screen storage unit 131. Here, each of the screen images A through C is comprised of 24 lines.

When the total number of lines stored in the previous-screen storage unit 131 exceeds the number of lines of the extension area W2 set in advance, lines are extracted from the display information stored in the previous-screen storage unit 131, and are displayed in the extension area W2, such that the number of the extracted lines corresponds to the number of lines of the extension area W2. For example, the screen images A through C stored in the previous-screen storage unit 131 include lines 1–72. With the extension area W2 having EXT lines, L to L+EXT−1 lines of the screen images A through C of the previous-screen storage unit 131 are selectively displayed. Here, the line L is changed by an operation on the extension-area scroll bar 145. By changing the line L, a portion of the screen images A through C displayed on the screen is changed accordingly.

In what follows, a process performed when a log-start request is issued from the host computer 2 to the terminal-emulator program 102 will be described.

Figure 18:
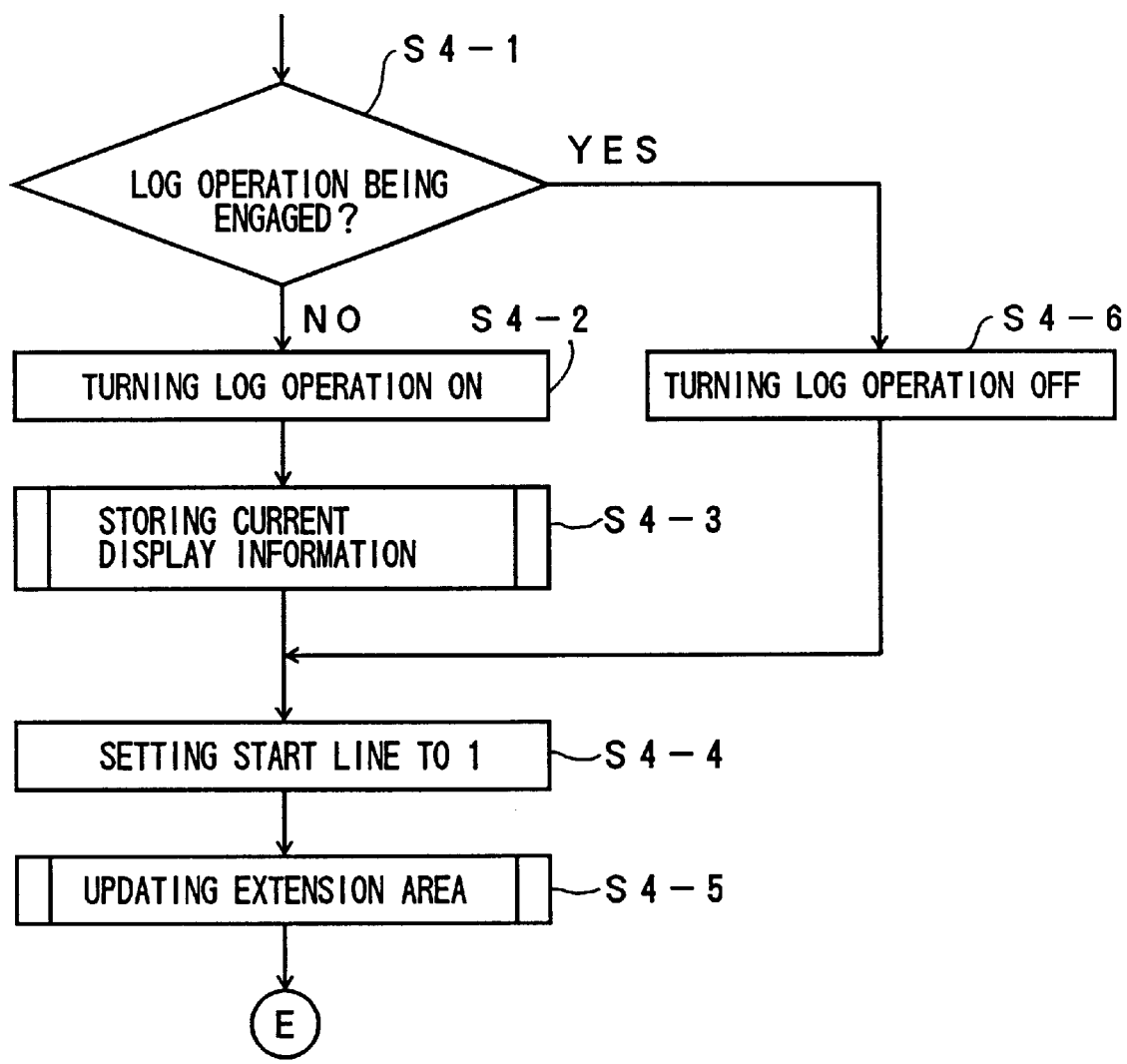
FIG. 18 is a flowchart of a process performed by the terminal-emulator program responding to a log-srart request according to the first embodiment of the present invention.

FIG. 18 is a flowchart of a process performed by the terminal-emulator program responding to a log-srart request according to the first embodiment of the present invention.

At a step S4-1, upon receiving a log-start request from the host computer 2, the terminal-emulator program 102 checks whether a logging operation is being engaged.

If a logging operation is not being engaged, a logging operation is initiated at a step S4-2.

At a step S4-3, the current display information displayed in the normal area W1 of the window W0 is stored in the previous-screen storage unit 131 according to the procedure for storing the current display information as described in connection with FIG. 12.

At a step S4-4, a start line from which the display information stored in the previous-screen storage unit 131 is displayed in the extension area W2 of the window W0 is set to 1.

At a step S4-5, the display information stored in the previous-screen storage unit 131 is displayed by starting from the start line set at the step S4-4. The displaying of the display information is performed according to the process of updating the extension area as described in connection with FIG. 15.

If it turns out at the step S4-1 that a logging operation is being engaged, the logging operation is turned off at a step S4-6. Then, the procedure goes to the step S4-4.

In what follows, a process of the terminal-emulator program 102 responding to a memo-display-start request sent from the host computer 2 will be described.

Figure 19:
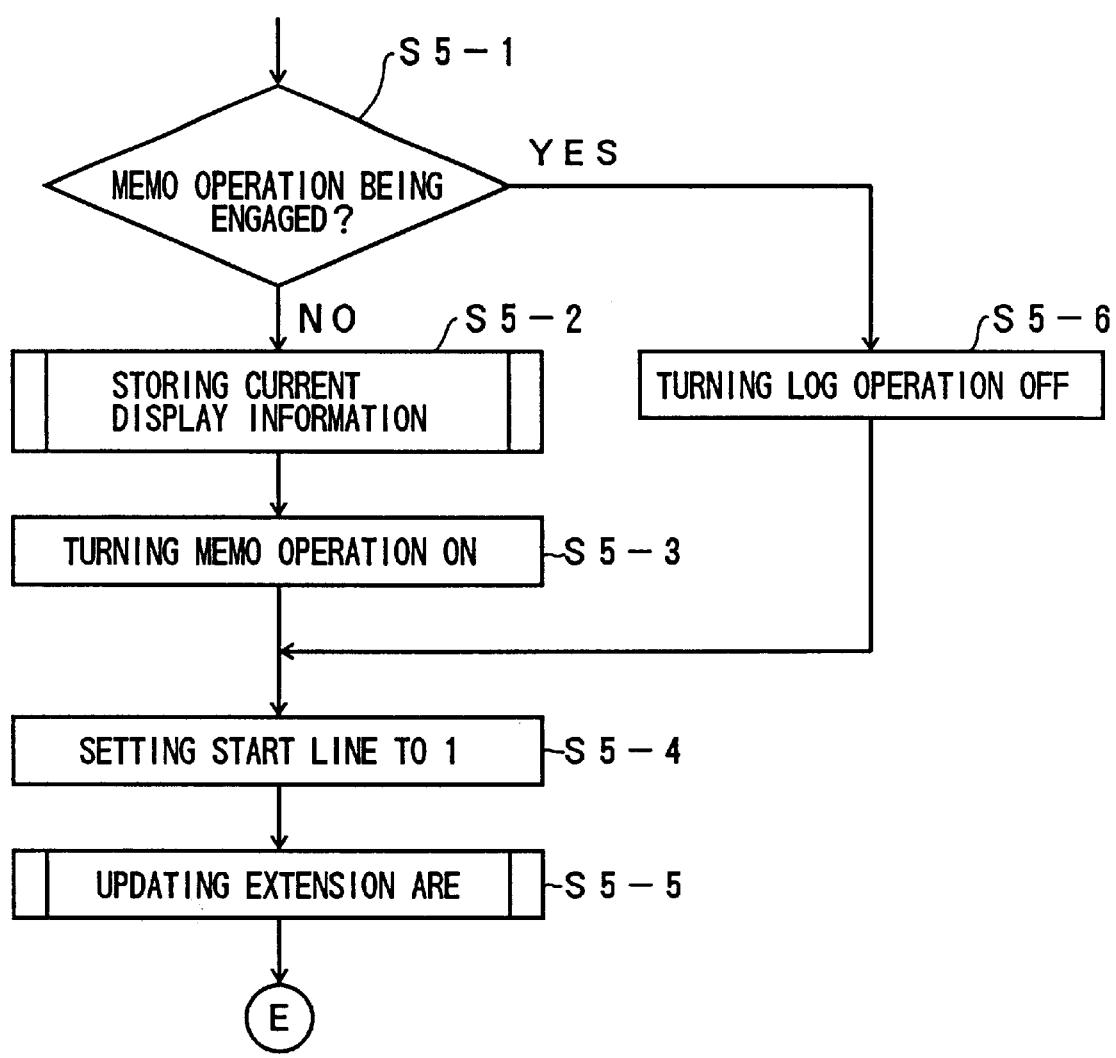
FIG. 19 is a flowchart of a process performed by the terminal-emulator program responding to a memo-display-start request according to the first embodiment of the present invention.

FIG. 19 is a flowchart of a process performed by the terminal-emulator program responding to a memo-display-start request according to the first embodiment of the present invention.

At a step S5-1, upon receiving a memo-display-start request from the host computer 2, the terminal-emulator program 102 checks whether a memo-display operation is being engaged.

If a memo-display operation is not being engaged, at a step S5-2, the current display information displayed in the normal area W1 of the window W0 is stored in the previous-screen storage unit 131 according to the procedure for storing the current display information as described in connection with FIG. 12.

After the current display information is stored in the previous-screen storage unit 131 at the step S5-2, a memo-display operation is initiated at a step S5-3.

At a step S5-4, a start line from which the display information stored in the previous-screen storage unit 131 is displayed in the extension area W2 of the window W0 is set to 1.

At a step S5-5, the display information stored in the previous-screen storage unit 131 is displayed by starting from the start line set at the step S5-4. The displaying of the display information is performed according to the process of updating the normal area as described in connection with FIG. 15.

If it turns out at the step S5-1 that a memo-display operation.is being engaged, the memo-display operation is turned off at a step S5-6. Then, the procedure goes to the step S5-4.

In what follows, a process of the terminal-emulator program 102 responding to an extension-area scroll operation by an operator operating the input device 10 will be described.

Figure 20:
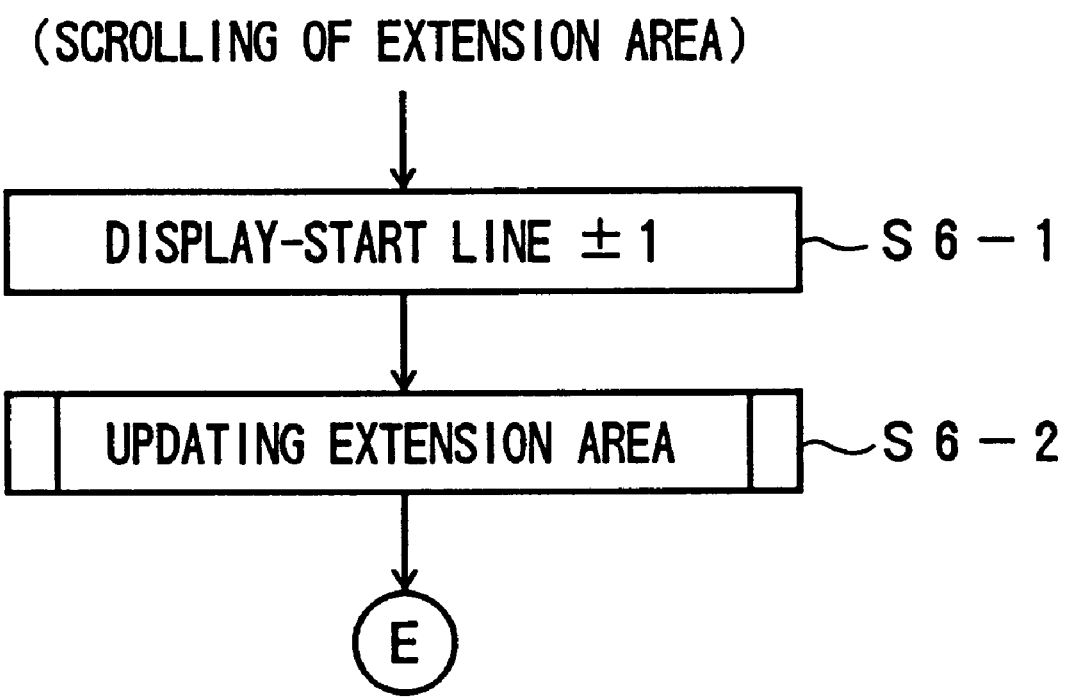
FIG. 20 is a flowchart of a process performed by the terminal-emulator program responding to a user operation on an extension-area scroll bar according to the first embodiment of the present invention.

FIG. 20 is a flowchart of a process performed by the terminal-emulator program responding to a user operation on the extension-area scroll bar according to the first embodiment of the present invention.

At a step S6-1, when an operator operates the input device 10 to scroll the extension area, the terminal-emulator program 102 increases or decreases the line number of a display start line by one, depending on a direction of the scrolling operation.

At a step S6-2, the display information stored in the previous-screen storage unit 131 is displayed by starting from the display start line set at the step S6-1. The displaying of the display information is performed according to the process of updating the normal area as described in connection with FIG. 15.

In this manner, when an operator operates the input device 10 to scroll the extension area, the start line is changed at the step S6-1 according to the scrolling operation so as to display the display information from the changed start line.

Figure 21:
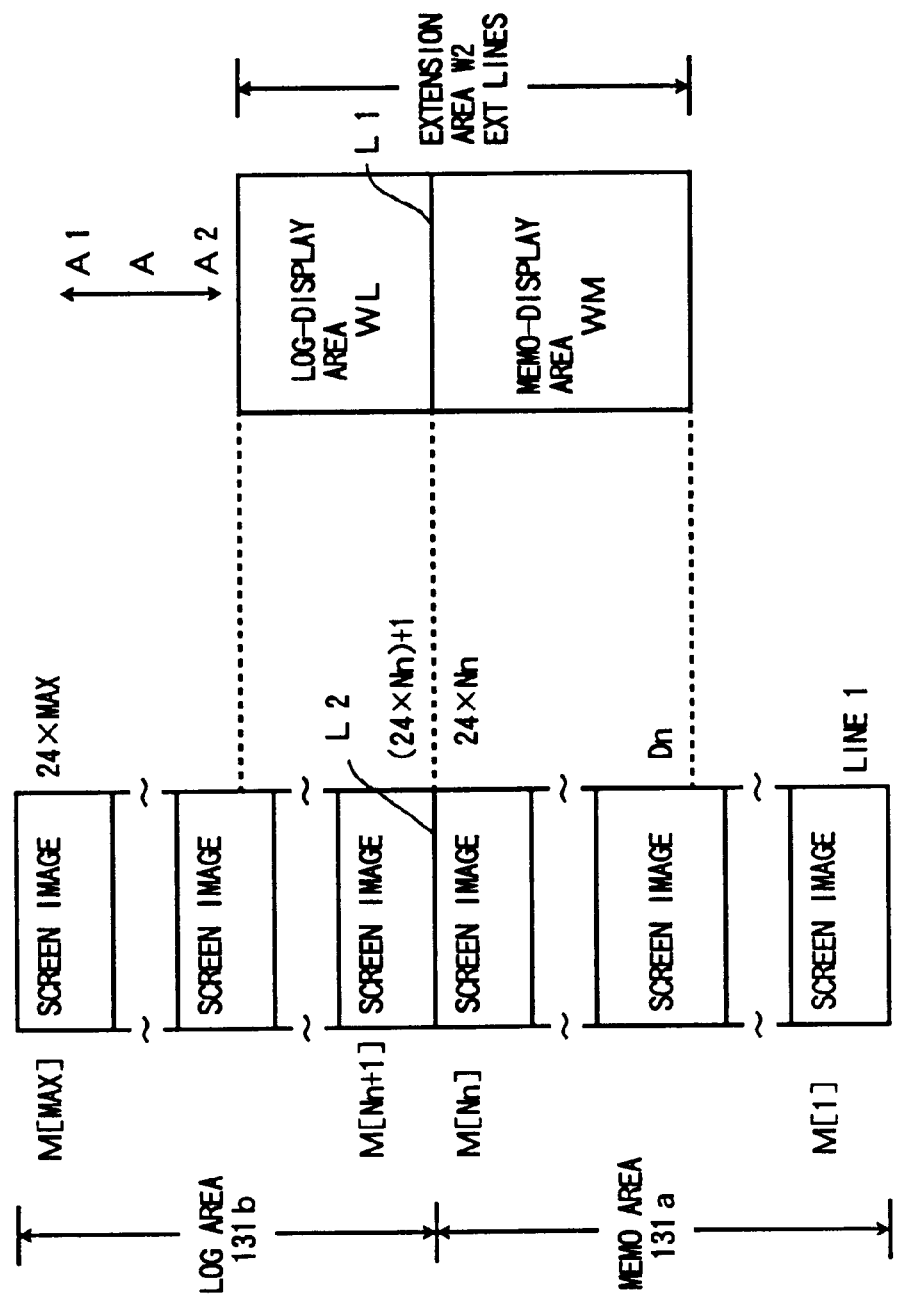
FIG. 21 is an illustrative drawings for explaining an operation of the terminal-emulator program responding to the extension-area scroll operation according to the first embodiment of the present invention.

FIG. 21 is an illustrative drawings for explaining the operation of the terminal-emulator program responding to the extension-area scroll operation according to the first embodiment of the present invention.

During the memo-display operation, the previous-screen storage unit 131 is divided into a memo-display-area-display-information storing unit 131a and a log-display-area-display-information storing unit 131b. The memo-display-area-display-information storing unit 131a can store screen images in the previous-screen areas M1 through MNn of the previous-screen storage unit 131, and the log-display-area-display-information storing unit 131b can store screen images in the previous-screen areas MNn+1 through Mmax of the previous-screen storage unit 131 following the memo-display-area-display-information storing unit 131a.

The extension area W2 is comprised of EXT lines. A boundary L1 between the log-display area WL and the memo-display area WM is placed at a boundary L2 between the memo-display-area-display-information storing unit 131a and the log-display-area-display-information storing unit 131b. As the extension area W2 is scrolled, the extension area W2 is shifted in a direction indicated by an arrow A, so that the display information displayed in the extension area W2 along with the boundary L1 is moved in the direction A. When the extension area W2 is moved in the direction A1, the boundary L1 moves towards the direction A2. When the extension area W2 is shifted in the direction A2, on the other hand, the boundary L1 moves towards the direction A1.

Figure 22:
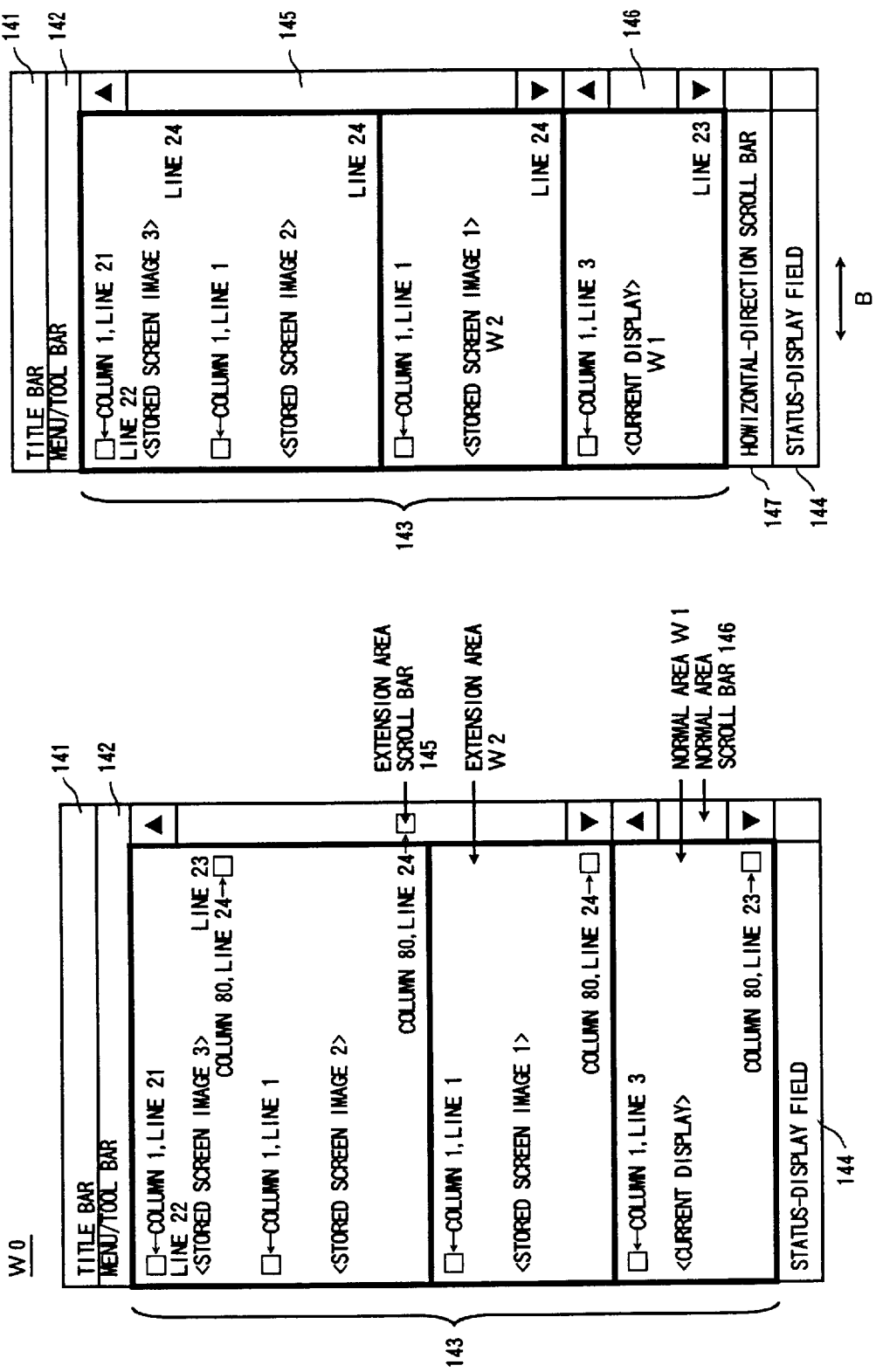
FIGS. 22A and 22B are illustrative drawings showing examples of a window displayed by the terminal-emulator program according to the first embodiment of the present invention.

FIGS. 22A and 22B are illustrative drawings showing examples of the window displayed by the terminal-emulator program according to the first embodiment of the present invention. In FIGS. 22A through 22B, the same elements as those of FIG. 10 are referred to by the same numerals, and a description thereof will be omitted.

FIG. 22A shows the window W0 which has a width of 80 columns the same as the width of the screen image. FIG. 22B shows the window W0 which has a width narrower than 80 columns.

When the width of the window W0 is 80 columns the same as that of the screen image, the window W0 displayed by the terminal-emulator program 102 includes the title bar 141, the menu/tool bar 142, the contents-display field 143, the status-display field 144, the extension-area scroll bar 145, and the normal-area scroll bar 146.

The title bar 141 displays a title of the displayed contents. The menu/tool bar 142 shows various menu/tool buttons for switching and editing of the screen. Such buttons include the memo button 142a for opening the memo-display area WM, the log button 142b for opening the log-display area WL, etc.

The contents-display field 143 includes the normal area W1 and the extension area W2. The normal area W1 displays the newest display information.

The extension area W2 includes one or two areas. Upon click of the memo button 142a in the menu/tool bar 142, the extension area W2 is opened as the memo-display area WM. When the log-button 142b is clicked, the extension area W2 is opened as the log-display area WL.

As shown in FIG. 22B, when the width of the window W0 is smaller than that of the screen image having 80 columns, the window W0 displayed by the terminal-emulator program 102 includes the title bar 141, the menu/tool bar 142, the contents-display field 143, the status-display field 144, the extension-area scroll bar 145, the normal-area scroll bar 146, and a horizontal-direction scroll bar 147. The horizontal-direction scroll bar 147 is shown between the normal area W1 and the status-display field 144, and allows a screen to be scrolled in a direction indicated by an arrow B.

In what follows, a process of the terminal-emulator program 102 when an operator operating the input device 10 gives an instruction to change a log screen to a memo screen in the extension area W2 of the window W0 will be described.

Figure 23:
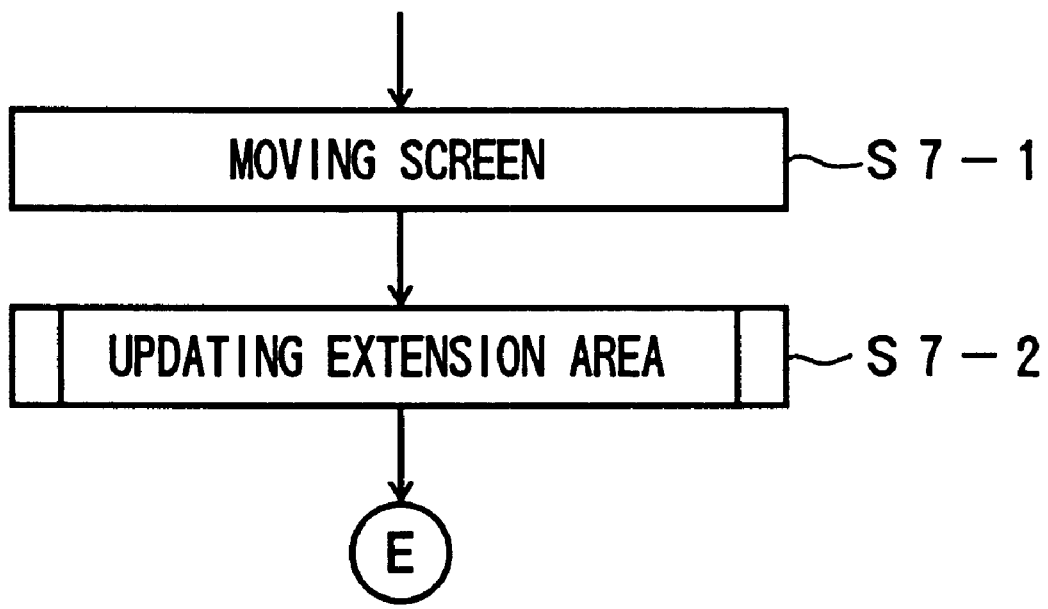
FIG. 23 is a flowchart of a process performed by the terminal-emulator program responding to an instruction by an operator to change a log-display screen to a memo-display screen according to the first embodiment of the present invention.

FIG. 23 is a flowchart of a process performed by the terminal-emulator program responding to an instruction by an operator to change a log-display screen to a memo-display screen according to the first embodiment of the present invention.

At a step S7-1, the terminal-emulator program 102 moves an indicated screen from a log-display area to a memo-display area when an operator operating the input device 10 indicates a change from a log-display screen to a memo-display screen.

At a step S7-2, the display information stored at the step S7-1 in the previous-screen storage unit 131 is displayed according to the procedure for updating the extension area as described in connection with FIG. 15.

Figure 24:
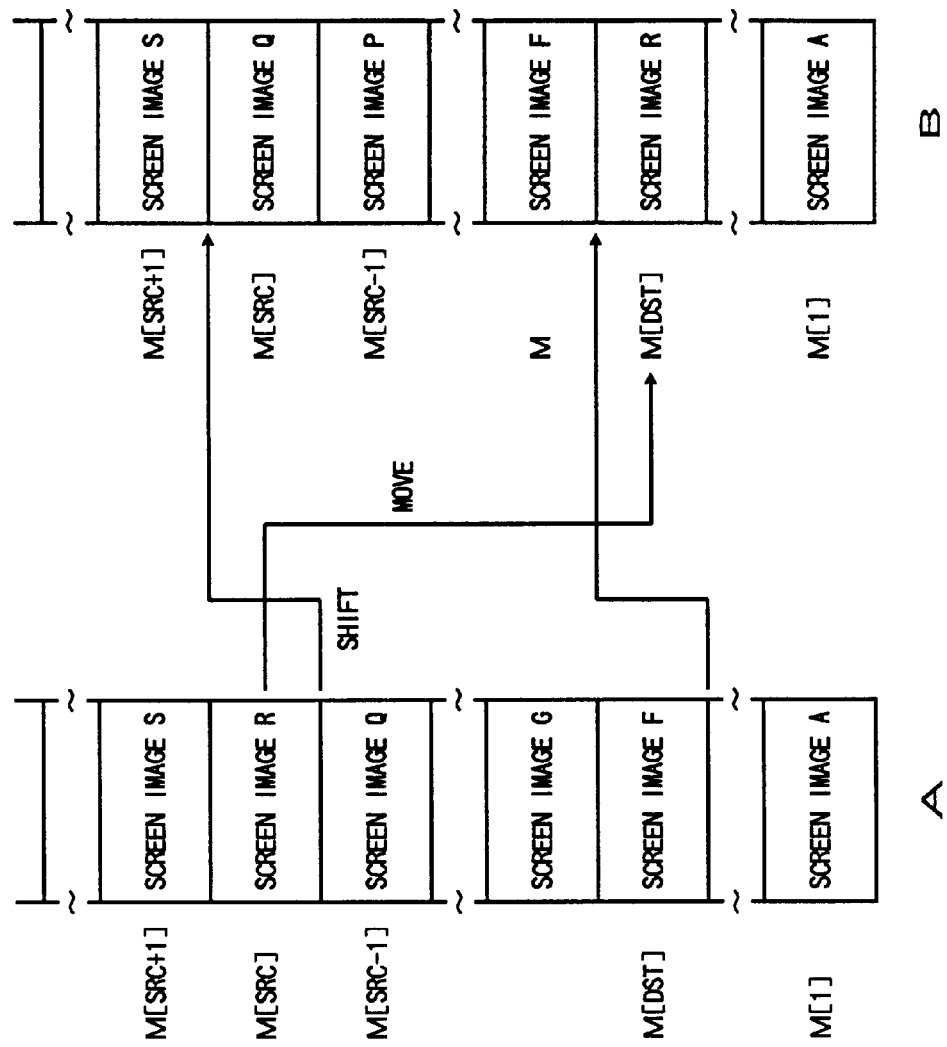
FIG. 24 is an illustrative drawing for explaining operations of the terminal-emulator program when screen images are shifted according to the first embodiment of the present invention.

FIG. 24 is an illustrative drawing for explaining operations of the terminal-emulator program when screen images are shifted according to the first embodiment of the present invention. Column A in FIG. 24 shows the previous-screen storage unit 131 before the shifting of screen images. Column B in FIG. 24 shows the previous-screen storage unit 131 after the shifting of screen images.

The previous-screen storage unit 131 includes previous-screen areas M1 through MSRC+1, which store screen images A through S, respectively.

The following description will be given with regard to a case in which the screen image R stored in the previous-screen area MSRC is moved to the previous-screen area MDST. The screen image R stored in the previous-screen area MSRC is read, and is temporarily stored in a separate memory. The screen images F through Q stored in the previous-screen areas MDST through MSRC−1, respectively, are shifted by one area so as to be stored in the previous-screen areas MDST+1 through MSRC, respectively. Then, the screen image R kept in the temporal storage is stored in the previous-screen area MDST.

In this manner, the screen image S is shifted from the previous-screen area MSRC to the previous-screen area MDST.

In the following, a process performed when an operator operating the input device 10 instructs erasure of display information will be described.

Figure 25:
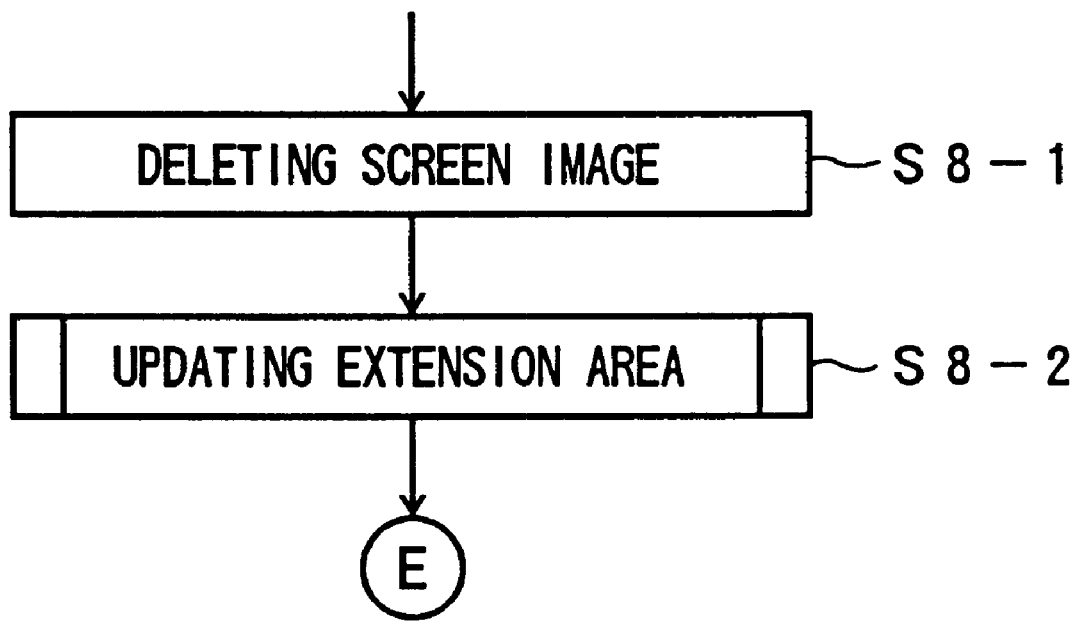
FIG. 25 is a flowchart of a process performed by the terminal-emulator program in response to an instruction to delete display information according to the first embodiment of the present invention.

FIG. 25 is a flowchart of a process performed by the terminal-emulator program in response to an instruction to delete display information according to the first embodiment of the present invention.

At a step S8-1, the terminal-emulator program 102 erases the display information of an indicated screen from the previous-screen storage unit 131 when an operator operating the input device 10 indicates erasure of the indicated screen.

At a step S8-2, the display information still stored in the previous-screen storage unit 131 is displayed according to the procedure for updating the extension area as described in connection with FIG. 15.

Figure 26:
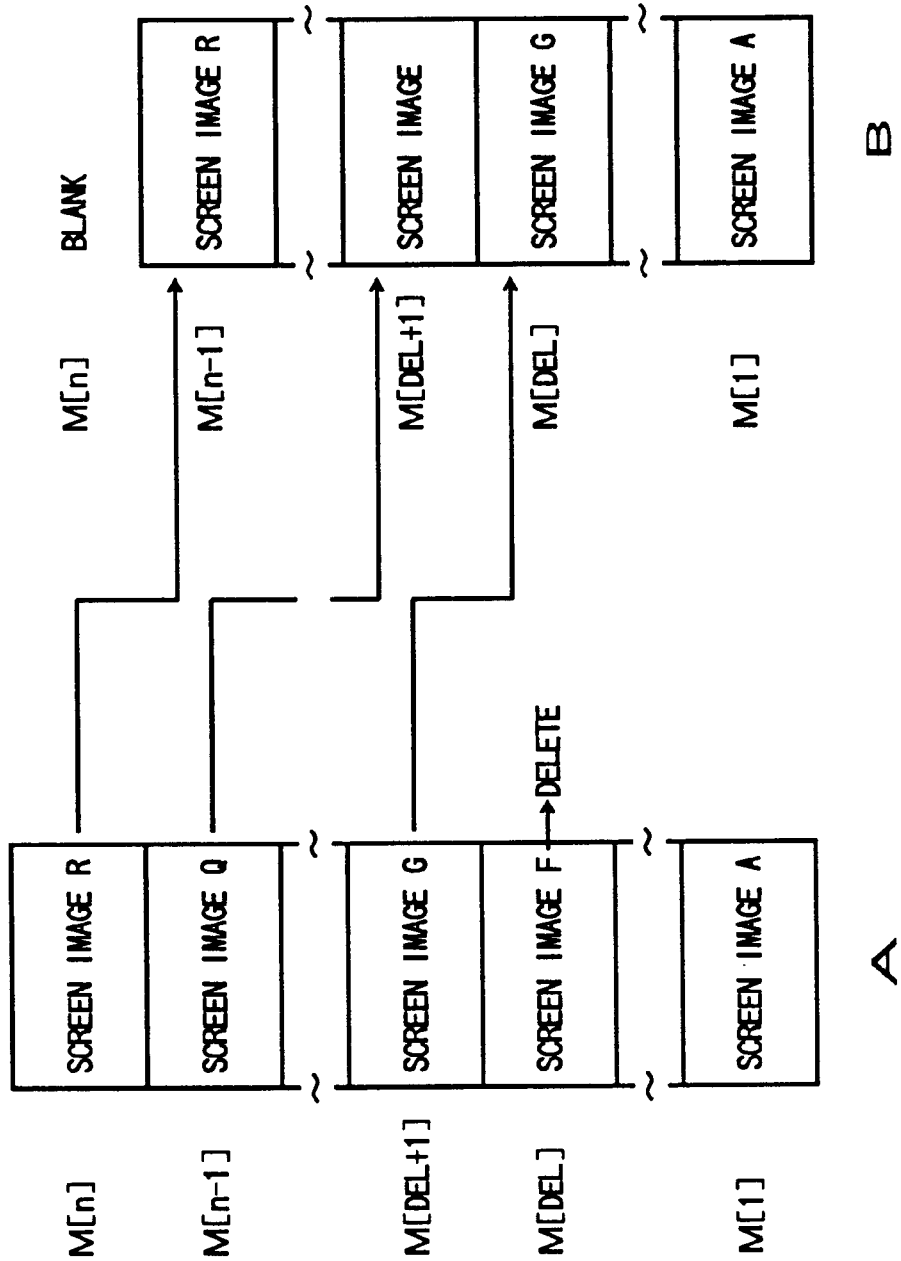
FIG. 26 is an illustrative drawing for explaining operations of the terminal-emulator program when a screen image is deleted according to the first embodiment of the present invention.

FIG. 26 is an illustrative drawing for explaining operations of the terminal-emulator program when a screen image is deleted according to the first embodiment of the present invention. Column A in FIG. 26 shows the previous-screen storage unit 131 before the removal of a screen image. Column B in FIG. 26 shows the previous-screen storage unit 131 after the removal of a screen image.

The previous-screen storage unit 131 includes previous-screen areas M1 through Mn, which store screen images A through R, respectively.

The following description will be given with regard to a case in which the screen image F stored in the previous-screen area MDEL is erased. The screen image F stored in the previous-screen area MDEL is removed first. Then, the screen images G through R stored in the previous-screen areas MDEL+1 through Mn, respectively, are shifted by one area so as to be newly stored in the previous-screen areas MDEL through Mn−1, respectively.

In this manner, an operator operating the input device 10 can delete any display information from the previous-screen storage unit 131.

The first embodiment has been described with reference to an example in which log screens and memo screens are controlled in the same previous-screen storage unit 131. Alternatively, separate previous-screen storage units may be provided for the purpose of controlling log screens and memo screens separately.

Figure 27:
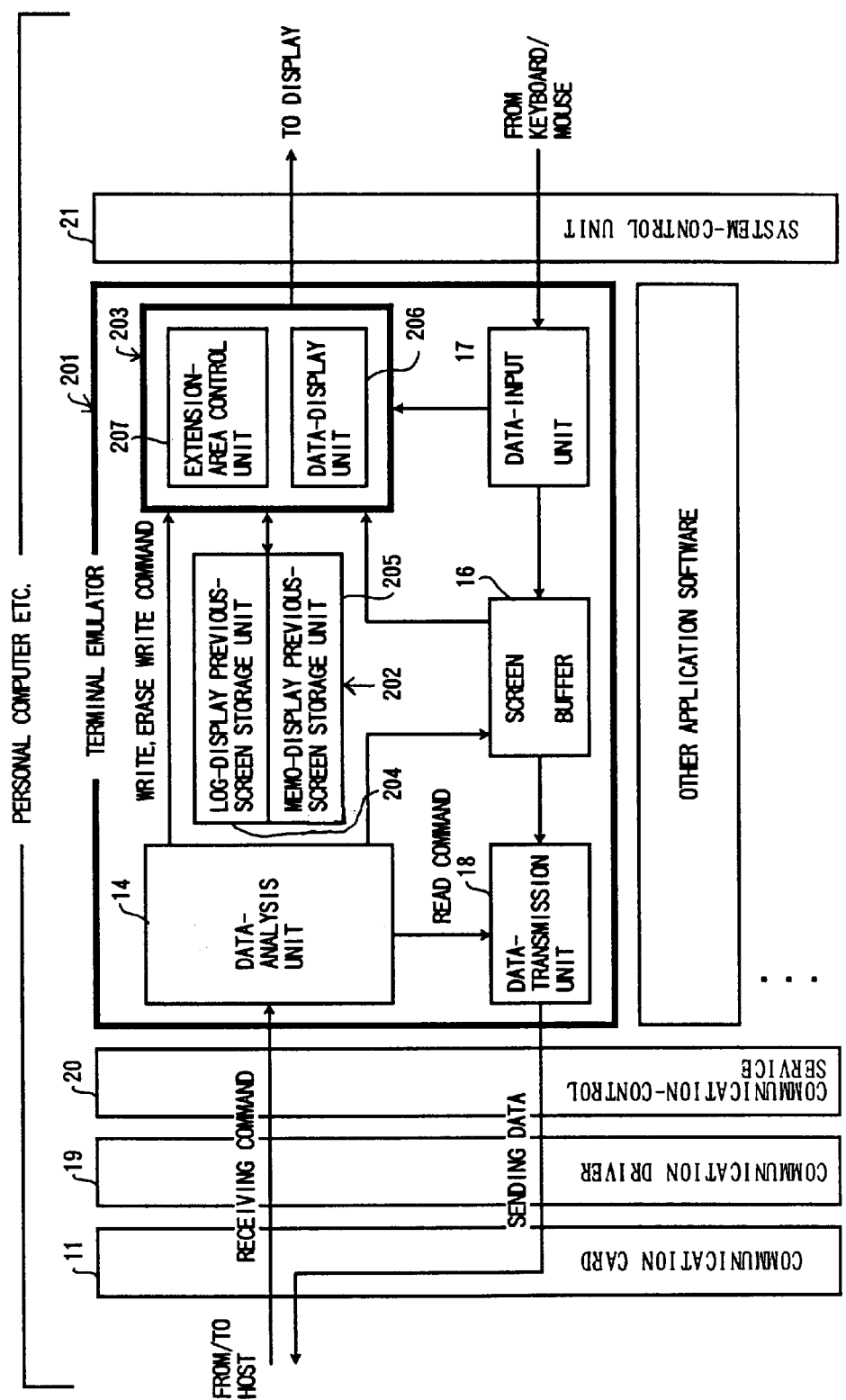
FIG. 27 is a block diagram showing functional blocks of a terminal-emulator program according to a second embodiment of the present invention.

FIG. 27 is a block diagram showing functional blocks of a terminal-emulator program according to a second embodiment of the present invention. In FIG. 27, the same elements as those of FIG. 7 are referred to by the same numerals, and a description thereof will be omitted. A hardware configuration of the terminal device of the second embodiment is the same as that of FIG. 6 and a description thereof will be omitted.

The terminal-emulator program 201 of this embodiment includes the data-analysis unit 14, the screen buffer 16, the data-input unit 17, the data-transmission unit 18, a previous-screen storage unit 202, and a main-control unit 203.

The previous-screen storage unit 202 includes a log-display previous-screen storage unit 204 and a memo-display previous-screen storage unit 205. The log-display previous-screen storage unit 204 stores display information for the log-display purpose, and the memo-display previous-screen storage unit 205 stores display information for the memo-display purpose.

The main-control unit 203 includes a data-display unit 206 and an extension-area control unit 207. The data-display unit 206 reads display information from the previous-screen storage unit 202 in accordance with the control status of the extension area W2 under the control of the extension-area control unit 207, and generates the window W0 to be displayed on the display device 9. The extension-area control unit 207 controls the status of the extension area indicated by user operations via the input device 10, and controls the data-display unit 206 to display information.

In what follows, operations of the terminal-emulator program 201 will be described.

Figure 28:
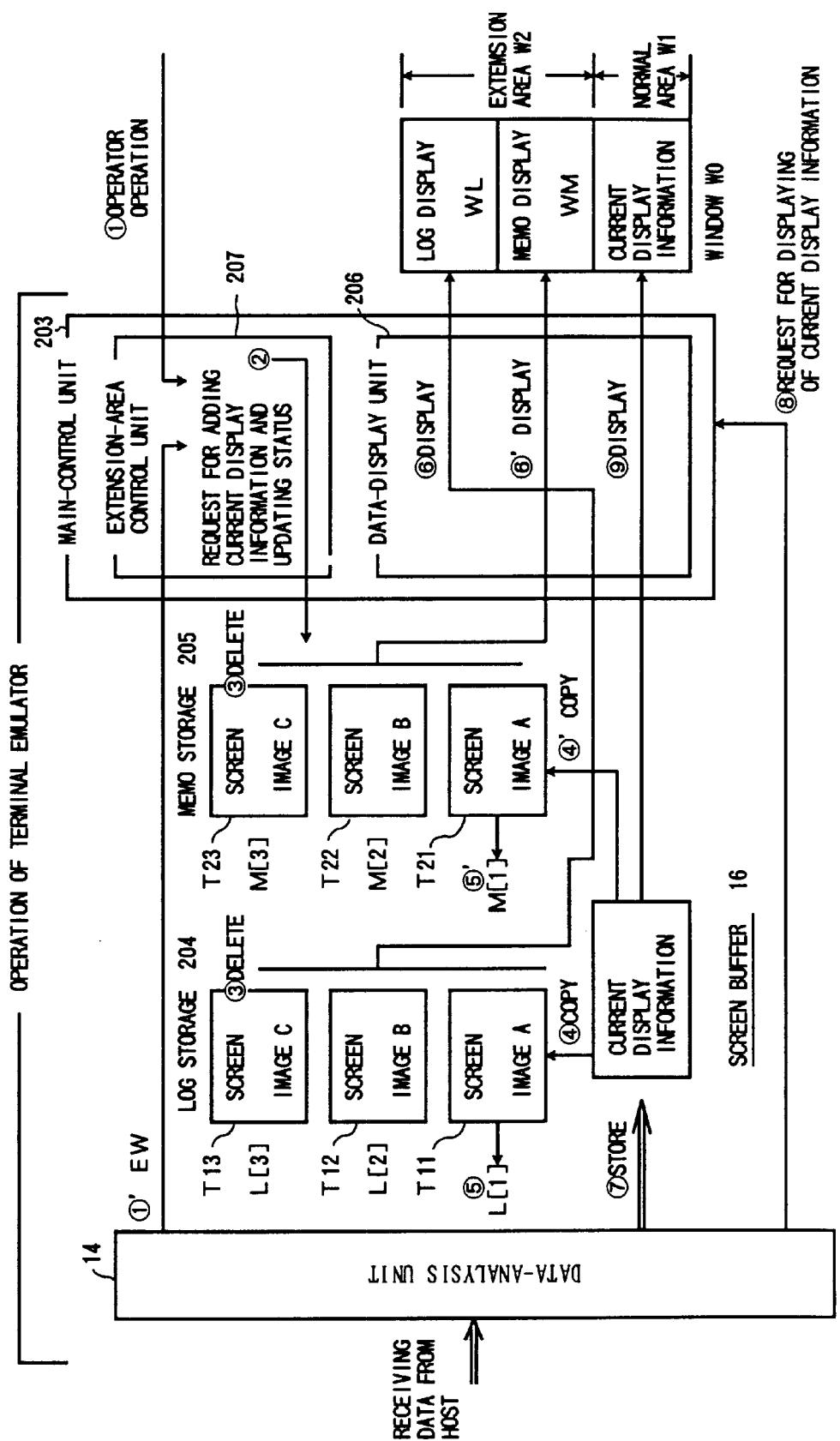
FIG. 28 is an illustrative drawing for explaining operations of the terminal-emulator program according to the second embodiment of the present invention.

FIG. 28 is an illustrative drawing for explaining operations of the terminal-emulator program according to the second embodiment of the present invention.

The extension-area control unit 207 detects commands sent from the host computer 2 or user operations requesting a log-display operation or a memo-display operation. According to the detection results, the extension-area control unit 207 controls the updating and displaying of display information stored in the previous-screen storage unit 202.

The data-display unit 206 controls arrangement of displayed screens according to the detection results of the extension-area control unit 207.

The data-display unit 206 displays the current display information stored in the screen buffer 16 in the normal area W1 of the window W0 on the display device 9. Also, the data-display unit 206 displays display information stored in the log-display previous-screen storage unit 204 in the log-display area WL of the extension area W2 in the window W0, and displays display information stored in the memo-display previous-screen storage unit 205 in the memo-display area WM of the extension area W2 in the window W0.

After receiving a log-display instruction, the extension-area control unit 207 stores display information in the log-display previous-screen storage unit 204 when it is supplied from the host computer 2. After receiving a memo-display instruction, the extension-area control unit 207 stores display information in the memo-display previous-screen storage unit 205 when it is supplied from the host computer 2.

The log-display previous-screen storage unit 204 includes a first log-display previous-screen area T11, a second log-display previous-screen area T12, and a third log-display previous-screen area T13. The first log-display previous-screen area T11 stores the newest display information, and the second log-display previous-screen area T12 stores the second newest display information. By the same token, the third log-display previous-screen area T13 stores the third newest display information.

The memo-display previous-screen storage unit 205 includes a first memo-display previous-screen area T21, a second memo-display previous-screen area T22, and a third memo-display previous-screen area T23. The first through third memo-display previous-screen areas T21 through T23 are used for storing screen images indicated as memo-display screens.

In the following, state transitions of screens displayed by the terminal-emulator program according to the second embodiment of the present invention will be described.

Figure 29:
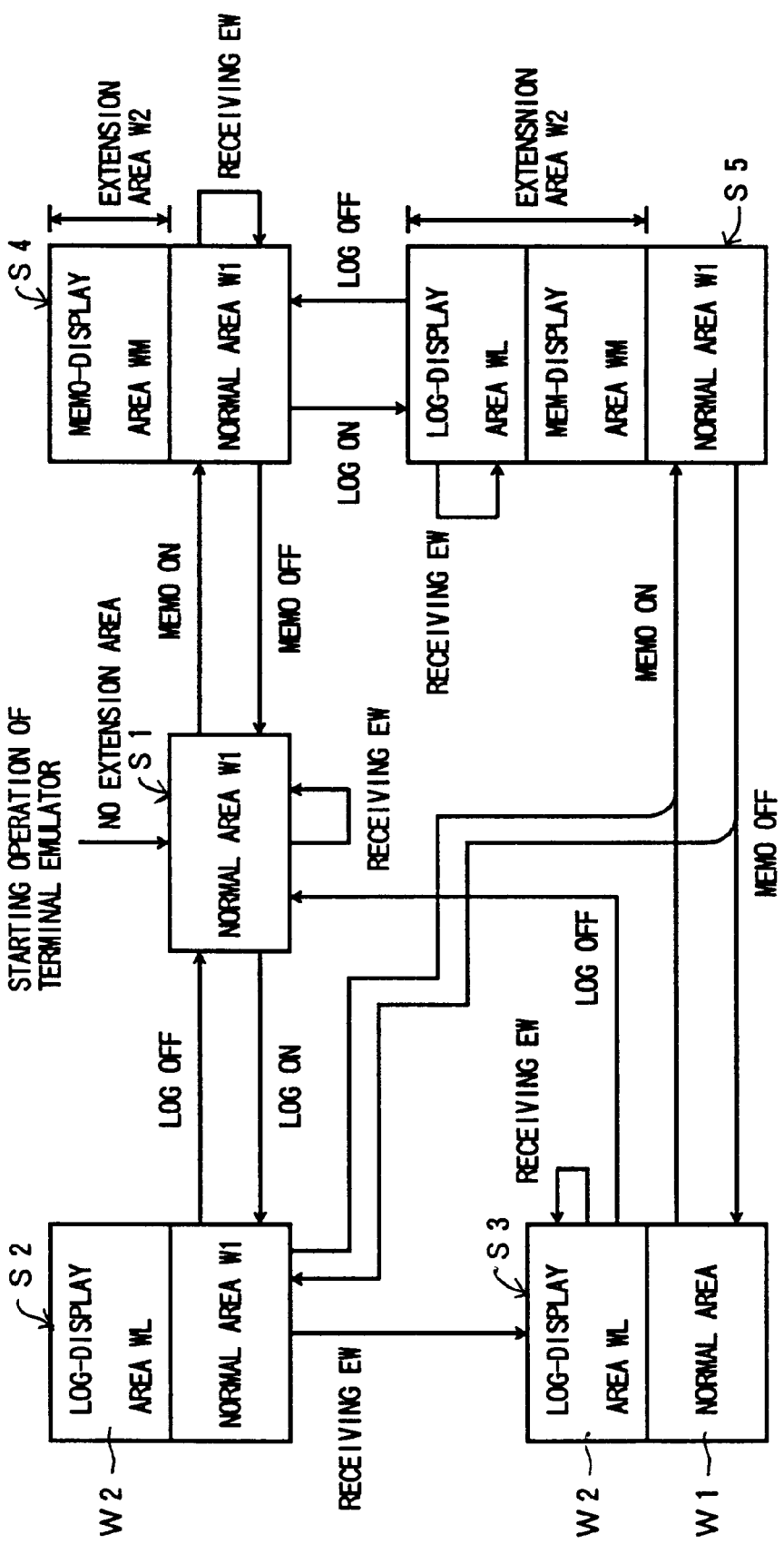
FIG. 29 is an illustrative drawing showing state transitions of screens displayed by the terminal-emulator program according to the second embodiment of the present invention.

FIG. 29 is an illustrative drawing showing state transitions of screens displayed by the terminal-emulator program according to the second embodiment of the present invention.

When the terminal-emulator program 201 starts to run and new display information is supplied from the host computer 2, the new display information from the host computer 2 is displayed in the normal area W1 as shown in a state S1.

If the operator requests a start of a log-display operation, display information newly arriving from the host computer 2 is displayed in the normal area W1 while the display information that has been displayed in the normal area W1 in the state S1 is in turn displayed in the log-display area WL of the extension area W2. This is shown as a state S2.

When new display information is supplied from the host computer 2 in the state S2, the new display information arriving from the host computer 2 is displayed in the normal area W1 while the display information that has been displayed in the normal area W1 in the state S2 is in turn displayed in the log-display area WL of the extension area W2. This is shown as a state S3.

If a memo-display operation is requested in the state S1, the memo-display area WM is set up in the extension area W2 as shown in a state S4. The display information displayed in the normal area W1, for example, is displayed in the memo-display area WM. When new display information is supplied from the host computer 2 in the state S4, the display information currently stored in the normal area W1 is erased, and the display information newly arriving from the host computer 2 is displayed instead. The memo-display area WM continues to display the same display information.

When a log-start request is made by the operator and new display information is supplied from the host computer 2 in the state S4, the log-display area WL is set up in addition to the memo-display area WM in the extension area W2, and the display information that has been displayed in the normal area W1 is newly displayed in the log-display area WL. The normal area W1 shows the new display information supplied from the host computer 2.

Figure 30:
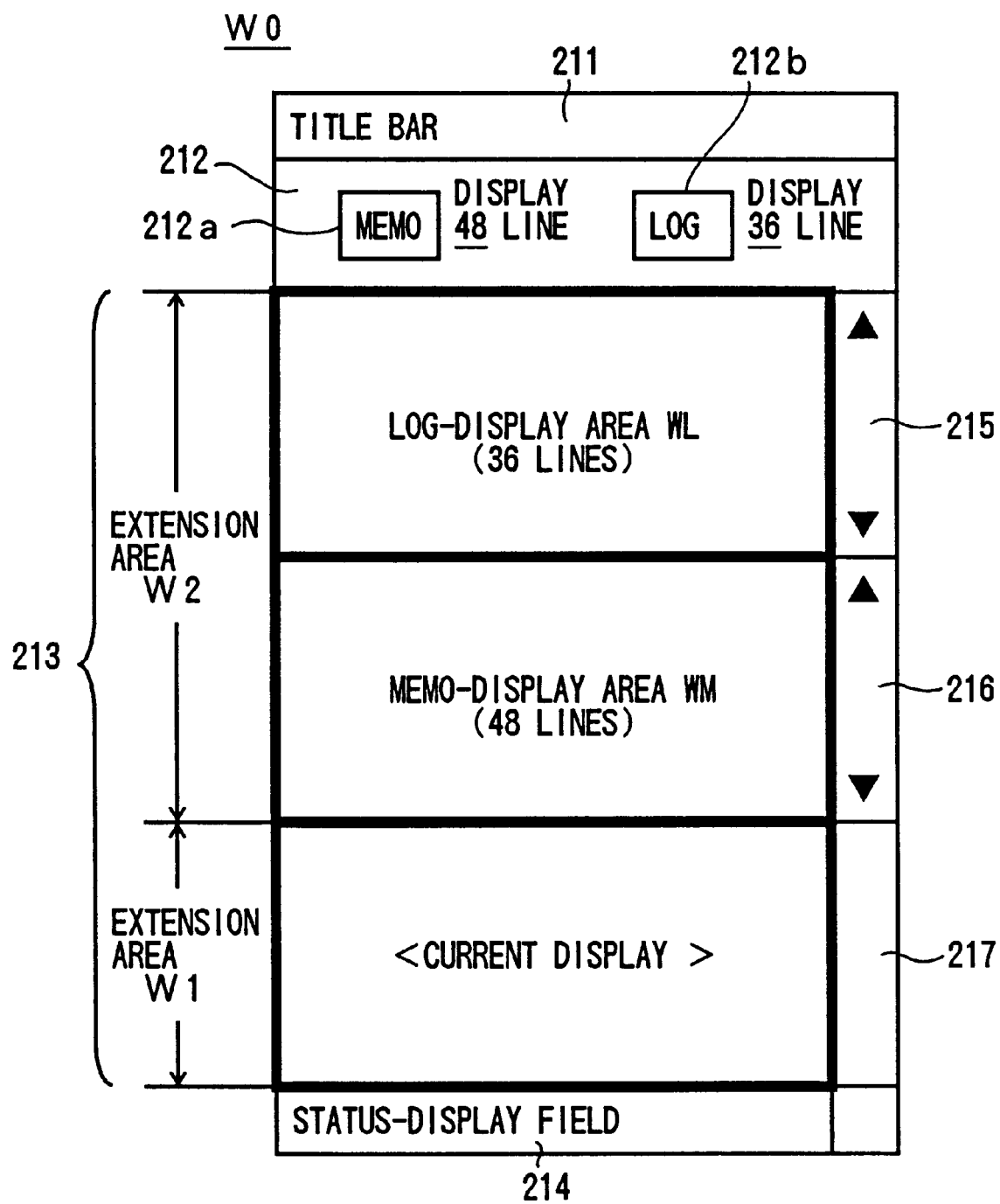
FIG. 30 is an illustrative drawing showing a screen displayed by the terminal-emulator program according to the second embodiment of the present invention.

FIG. 30 is an illustrative drawing showing a screen displayed by the terminal-emulator program according to the second embodiment of the present invention.

The window W0 displayed by the terminal-emulator program 201 includes a title bar 211, a menu/tool bar 212, a contents-display field 213, a status-display field 214, an log-display-area scroll bar 215, a memo-display-area scroll bar 216, and a normal-area scroll bar 217.

The title bar 211 displays a title of the displayed contents. The menu/tool bar 212 shows various menu/tool buttons for switching and editing of the screen. Such buttons include a memo button 212a for opening the memo-display area WM, a log button 212b for opening the log-display area WL, etc.

The contents-display field 213 includes the normal area W1 and the extension area W2. The normal area W1 displays the newest display information.

The extension area W2 includes one or two areas. Upon click of the memo button 212a in the menu/tool bar 212, the extension area W2 is set up as the memo-display area WM. When the log-button 212b is clicked, the extension area W2 is set up as the log-display area WL.

The normal area W1, the memo-display area WM, and the log-display area WL are provided with the respective scroll bars 215, 216, and 217. These scroll bars permit separate scrolling operations directed to respective areas.

In what follows, operations of the terminal-emulator program 201 for implementing the above configuration will be described.

Figure 31:
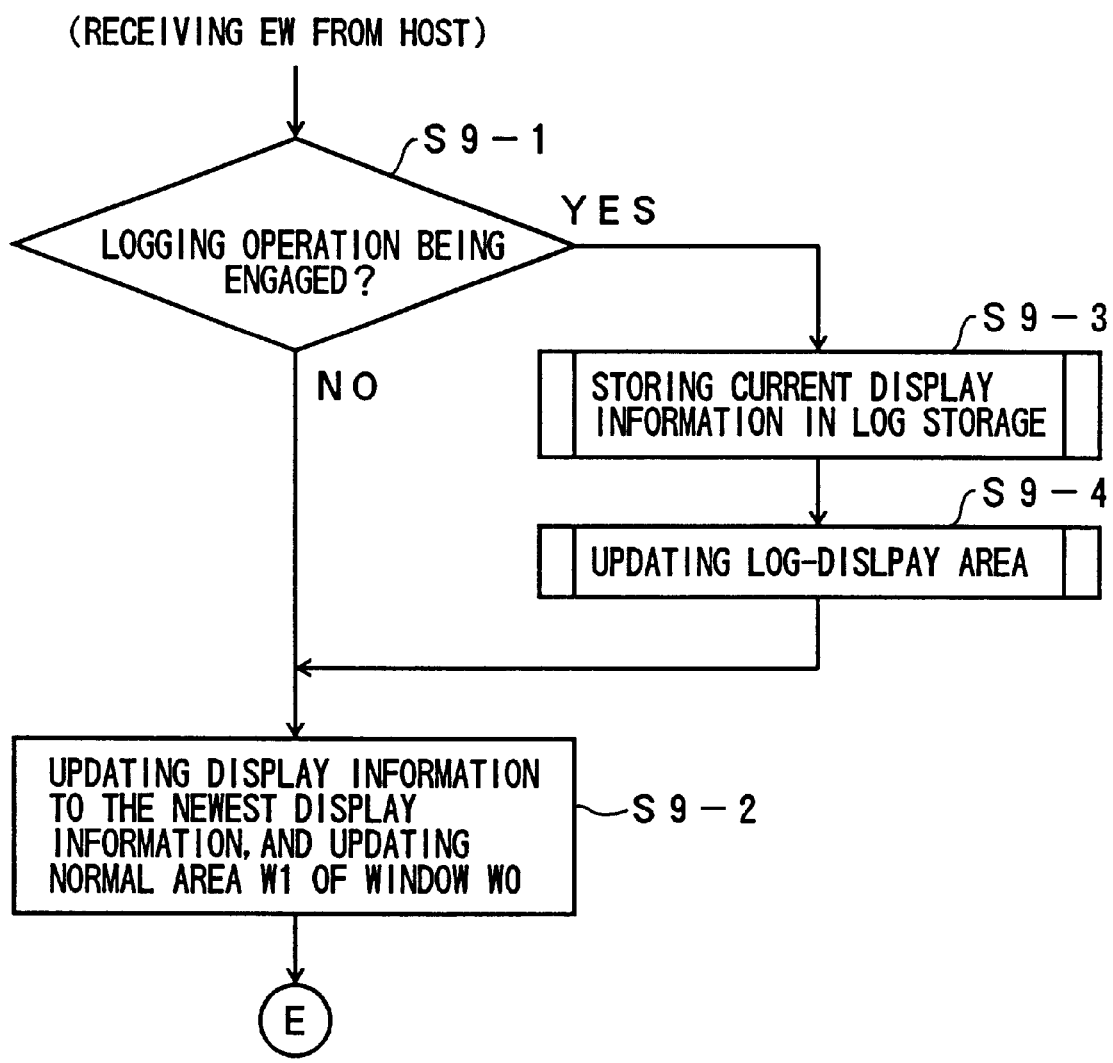
FIG. 31 is a flowchart of a process of the terminal-emulator program responding to an erase-write command according to the second embodiment of the present invention.

FIG. 31 is a flowchart of a process of the terminal-emulator program responding to an erase-write command according to the second embodiment of the present invention.

At a step S9-1, when an erase-write command is received from the host computer 2, a check is made as to whether a logging operation is being engaged.

If a logging operation is not being engaged, display information stored in the screen buffer 16 is updated by the newest display information supplied from the host computer 2, and the normal area W1 of the window W0 is also updated to display the newest display information (step S9-2).

If the step S9-1 finds that a logging operation is being engaged, the current display information is stored in the log-display previous-screen storage unit 204 of the previous-screen storage unit 202 (step S9-3).

After the current display information is stored in the log-display previous-screen storage unit 204 of the previous-screen storage unit 202 at the step S9-3, the display information in the log-display previous-screen storage unit 204 of the previous-screen storage unit 202 is displayed in the extension area W2 of the window W0 at a step S9-4. After the display information in the log-display previous-screen storage unit 204 of the previous-screen storage unit 202 is displayed in the extension area W2 of the window W0 at the step S9-4, the display information of the screen buffer 16 is updated by the newest display information supplied from the host computer 2, and the normal area W1 of the window W0 newly displays the newest display information (step S9-2).

In what follows, a process of storing the current display information in the previous-screen storage unit 202 at the step S9-3 will be described.

Figure 32:
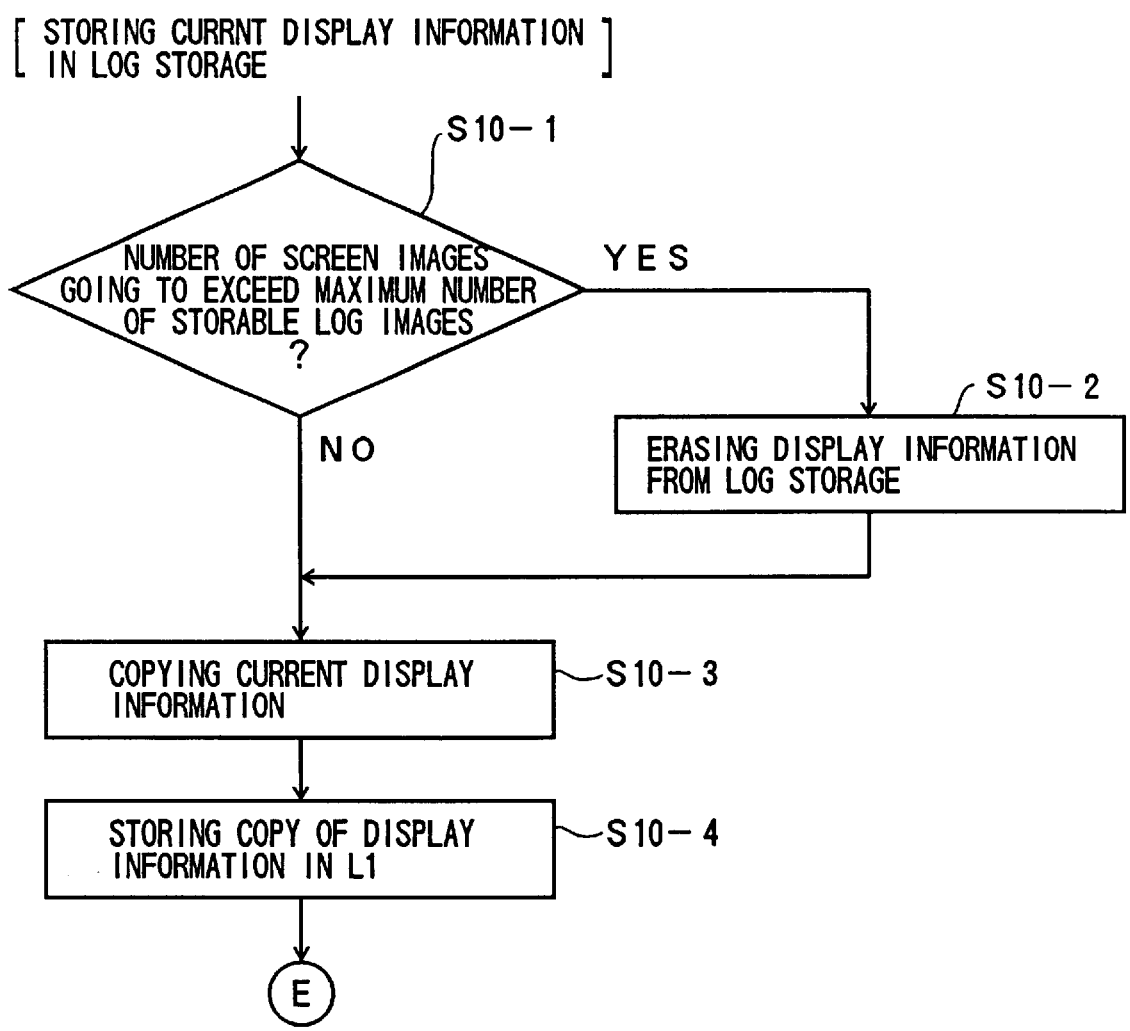
FIG. 32 is a flowchart of a process of storing current display information performed by the terminal-emulator program according to the second embodiment of the present invention.

FIG. 32 is a flowchart of a process of storing current display information performed by the terminal-emulator program according to the second embodiment of the present invention.

When current display information is to be stored by the terminal-emulator program 201, first, a check is made as to whether the number of screen images of stored display information is going to exceed a maximum number of images storable in the log-display previous-screen storage unit 204 (step S10-1).

If it is going to exceed the maximum number of storable images of the log-display previous-screen storage unit 204, the display information stored in the uppermost area of the log-display previous-screen storage unit 204 is erased, i.e., the oldest display information is erased (step S10-2).

If the step S10-1 finds that the number of screen images of stored display information is not going to exceed a maximum number of storable images of the log-display previous-screen storage unit 204, or after the display information stored in the uppermost area of the log-display previous-screen storage unit 204 is erased at the step S10-2, the current display information is copied, and the copy is treated as the latest previous image (step S10-3).

The latest previous image generated at the step S10-3 is stored in the log-display previous-screen storage unit 204 (step S10-4).

In the following, display updating of the log-display area WL of the extension area W2 performed at the step S9-4 will be described.

Figure 33:
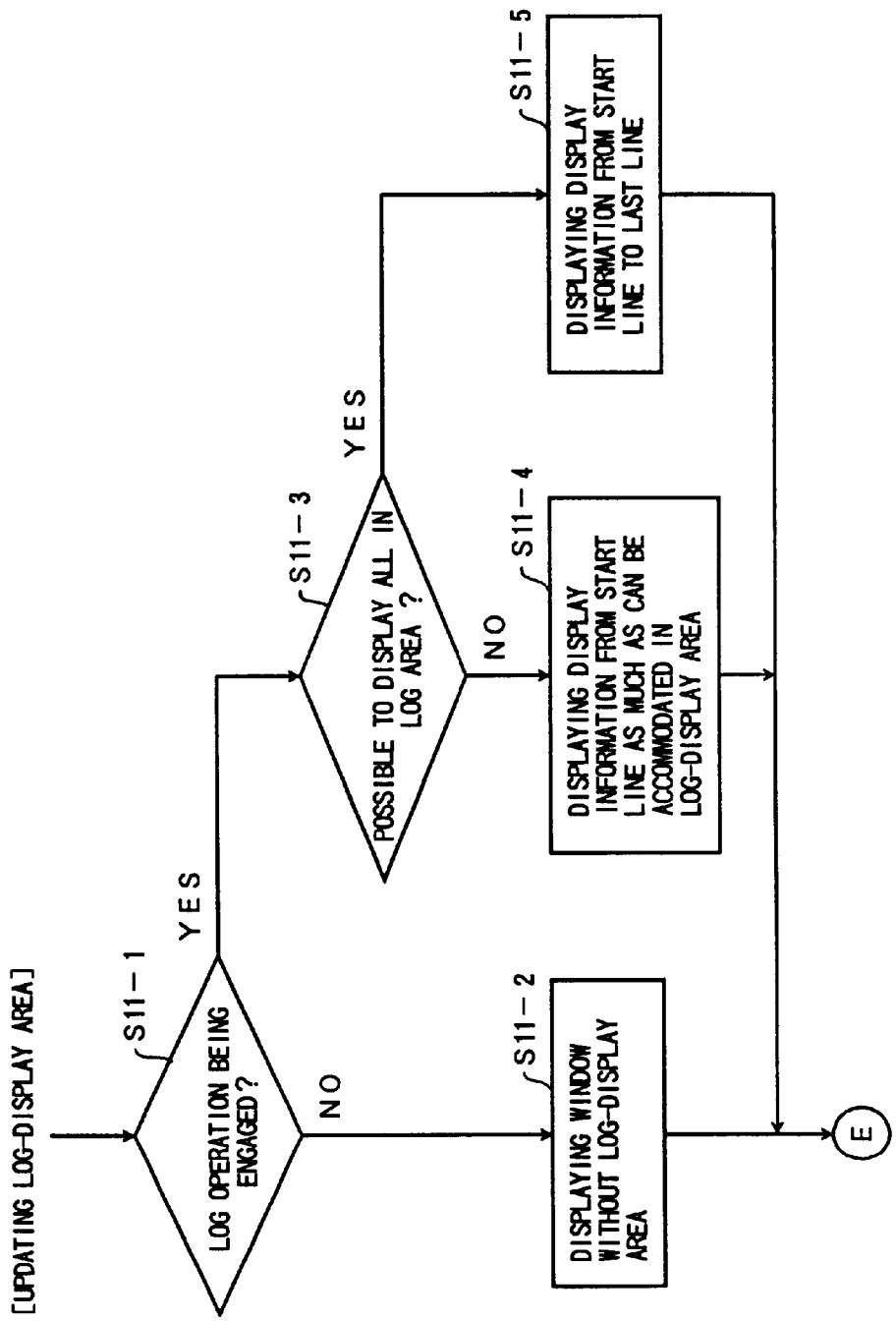
FIG. 33 is a flowchart of a process of updating an extension area performed by the terminal-emulator program according to the second embodiment of the present invention.

FIG. 33 is a flowchart of a process of updating the extension area performed by the terminal-emulator program according to the second embodiment of the present invention.

In the display updating of the log-display area WL of the extension area W2, a check is made first as to whether a logging operation is being engaged (step S11-1).

If a logging operation is not being engaged, the window W0 is controlled in such a fashion as to display only the normal area W1 without displaying the extension area W2 as in the related art (step S11-2).

If it turns out at the step S11-1 that a logging operation is being engaged, a check is made whether all the display information stored in the log-display previous-screen storage unit 204 can be displayed in the extension area W2 of the window W0 (step S11-3).

If the step S11-3 finds that all the display information can be displayed, the entirety of the display information stored in the log-display previous-screen storage unit 204 is displayed in the extension area W2 of the window W0 (step S11-5).

If the step S11-3 finds that all the display information stored in the log-display previous-screen storage unit 204 cannot be displayed in the extension area W2 of the window W0, a predetermined number of lines of the display information stored in the log-display previous-screen storage unit 204 are displayed in the extension area W2 by starting from a display start line specified in advance (step S11-4). Here, the predetermined number is the maximum number of lines which can be displayed in the log-display area WL.

In what follows, a process performed when a log-start request is issued from the host computer 2 to the terminal-emulator program 201 will be described.

Figure 34:
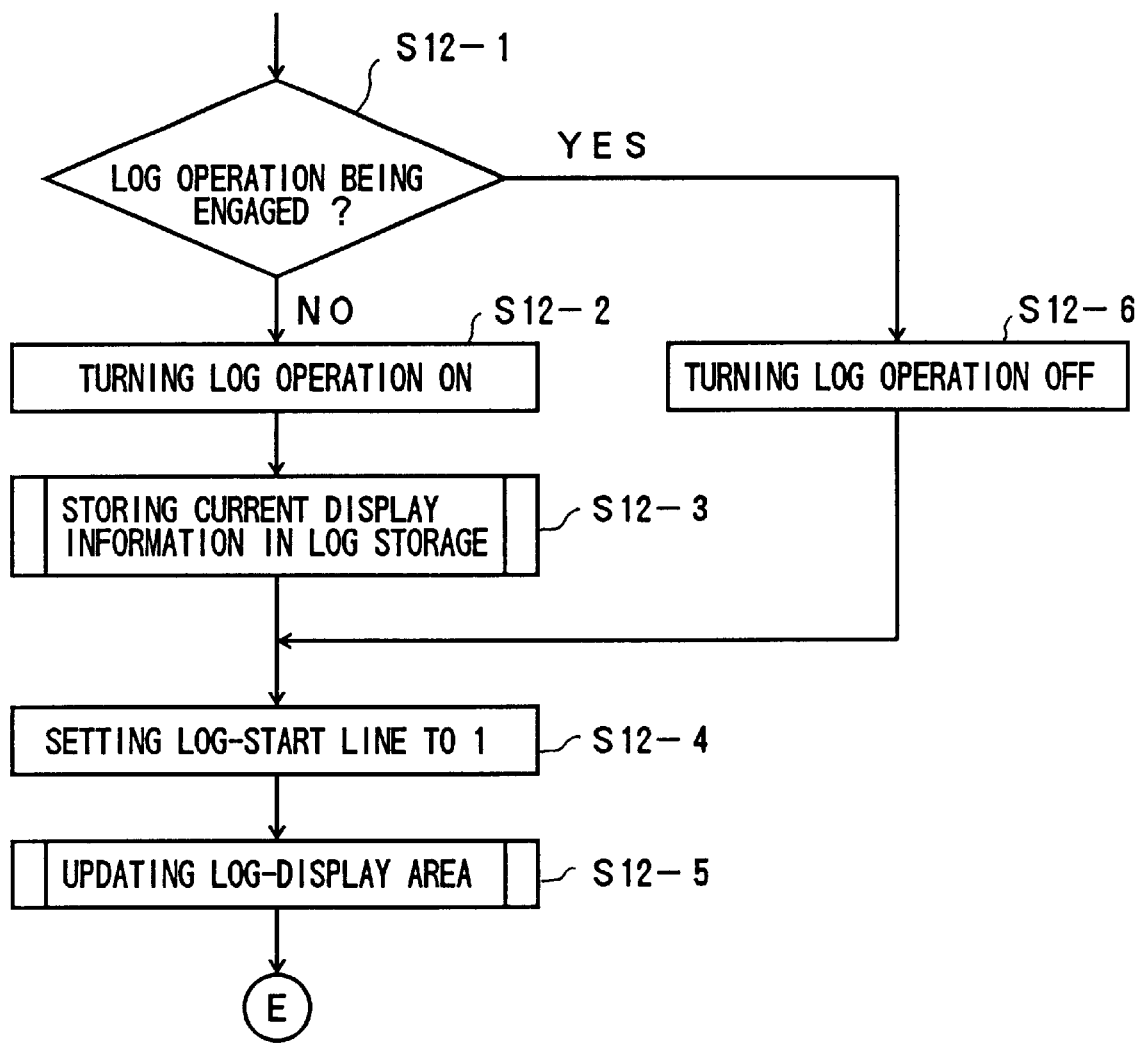
FIG. 34 is a flowchart of a process performed by the terminal-emulator program responding to a log-srart request according to the second embodiment of the present invention.

FIG. 34 is a flowchart of a process performed by the terminal-emulator program responding to a log-srart request according to the second embodiment of the present invention.

At a step S12-1, upon receiving a log-start request from the host computer 2, the terminal-emulator program 201 checks whether a logging operation is being engaged.

If a logging operation is not being engaged, a logging operation is initiated at a step S12-2.

At a step S12-3, the current display information displayed in the normal area W1 of the window W0 is stored in the log-display previous-screen storage unit 204 according to the procedure for storing the current display information as described in connection with FIG. 32.

At a step S12-4, a start line from which the display information stored in the log-display previous-screen storage unit 204 is displayed in the extension area W2 of the window W0 is set to 1.

At a step S12-5, the display information stored in the log-display previous-screen storage unit 204 is displayed by starting from the start line set at the step S12-4. The displaying of the display information is performed according to the process of updating the extension area as described in connection with FIG. 33.

If it turns out at the step S12-1 that a logging operation is being engaged, the logging operation is turned off at a step S12-6. Then, the procedure goes to the step S12-4.

In what follows, a process of the terminal-emulator program 201 responding to a memo-display-start request sent from the host computer 2 will be described.

Figure 35:
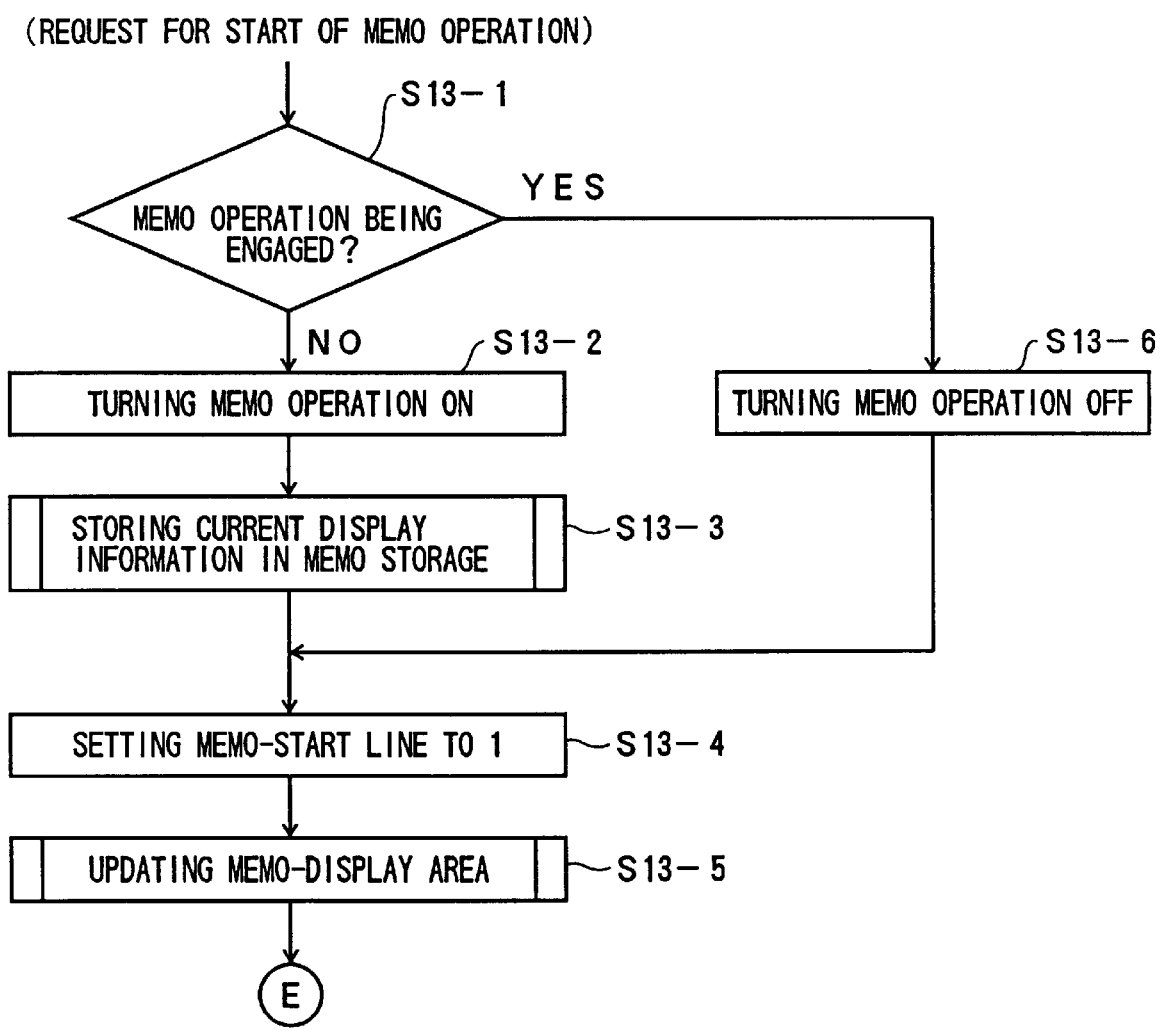
FIG. 35 is a flowchart of a process performed by the terminal-emulator program responding to a memo-display-start request according to the second embodiment of the present invention.

FIG. 35 is a flowchart of a process performed by the terminal-emulator program responding to a memo-display-start request according to the second embodiment of the present invention.

At a step S13-1, upon receiving a memo-display-start request from the host computer 2, the terminal-emulator program 201 checks whether a memo-display operation is being engaged.

If a memo-display operation is not being engaged, a memo-display operation is initiated at a step S13-2.

After a memo-display operation is initiated at the step S13-2, the current display information displayed in the normal area W1 of the window W0 is stored in the memo-display previous-screen storage unit 205 according to a procedure for storing current display information in the memo-display previous-screen storage unit as will be described later (step S13-3).

After this, at a step S13-4, a start line from which the display information stored in the memo-display previous-screen storage unit 205 is displayed in the extension area W2 of the window W0 is set to 1.

At a step S13-5, the display information stored in the memo-display previous-screen storage unit 205 is displayed by starting from the start line set at the step S13-4. The displaying of the display information is performed according to a process of updating the memo-display area WM as will be described later.

If it turns out at the step S13-1 that a memo-display operation is being engaged, the memo-display operation is turned off at a step S13-6. Then, the procedure goes to the step S13-4.

In what follows, a process of storing the current display information in the memo-display previous-screen storage unit 205 at the step S13-3 will be described.

Figure 36:
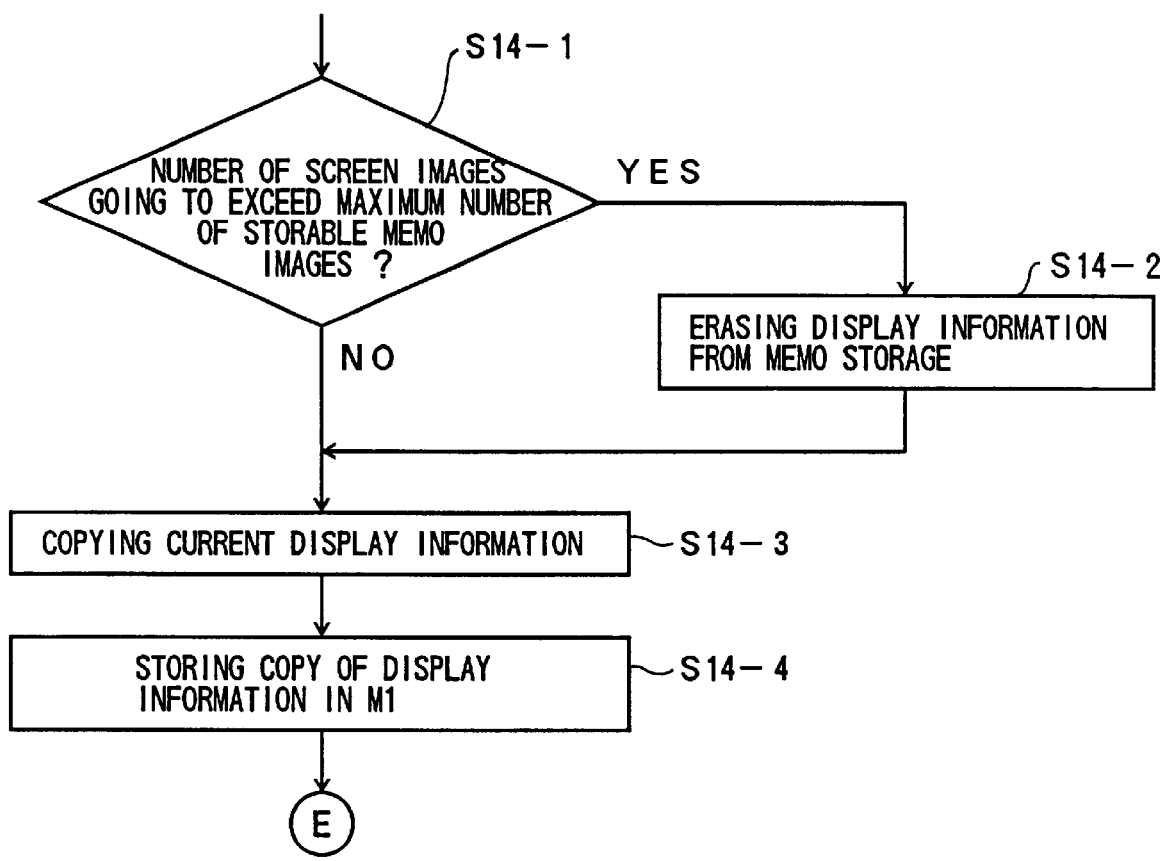
FIG. 36 is a flowchart of a process of storing current display information in a memo-display previous-screen storage unit as it is performed by the terminal-emulator program according to the second embodiment of the present invention.

FIG. 36 is a flowchart of a process of storing current display information in the memo-display previous-screen storage unit as it is performed by the terminal-emulator program according to the second embodiment of the present invention.

When current display information is to be stored in the memo-display previous-screen storage unit 205 by the terminal-emulator program 201, first, a check is made as to whether the number of screen images of stored display information is going to exceed a maximum number of images storable in the memo-display previous-screen storage unit 205 (step S14-1).

If it is going to exceed the maximum number of storable images of the memo-display previous-screen storage unit 205, the oldest display information stored in the memo-display previous-screen storage unit 205 is erased (step S14-2).

If the step S14-1 finds that the number of screen images of stored display information is not going to exceed a maximum number of storable images of the memo-display previous-screen storage unit 205, or after the oldest display information stored in the memo-display previous-screen storage unit 205 is erased at the step S14-2, the current display information is copied, and the copy is treated as the latest previous image (step S14-3).

The latest previous image generated at the step S14-3 is stored in the memo-display previous-screen storage unit 205 (step S14-4).

In the following, display updating of the memo-display area WM performed at the step S13-5 will be described.

Figure 37:
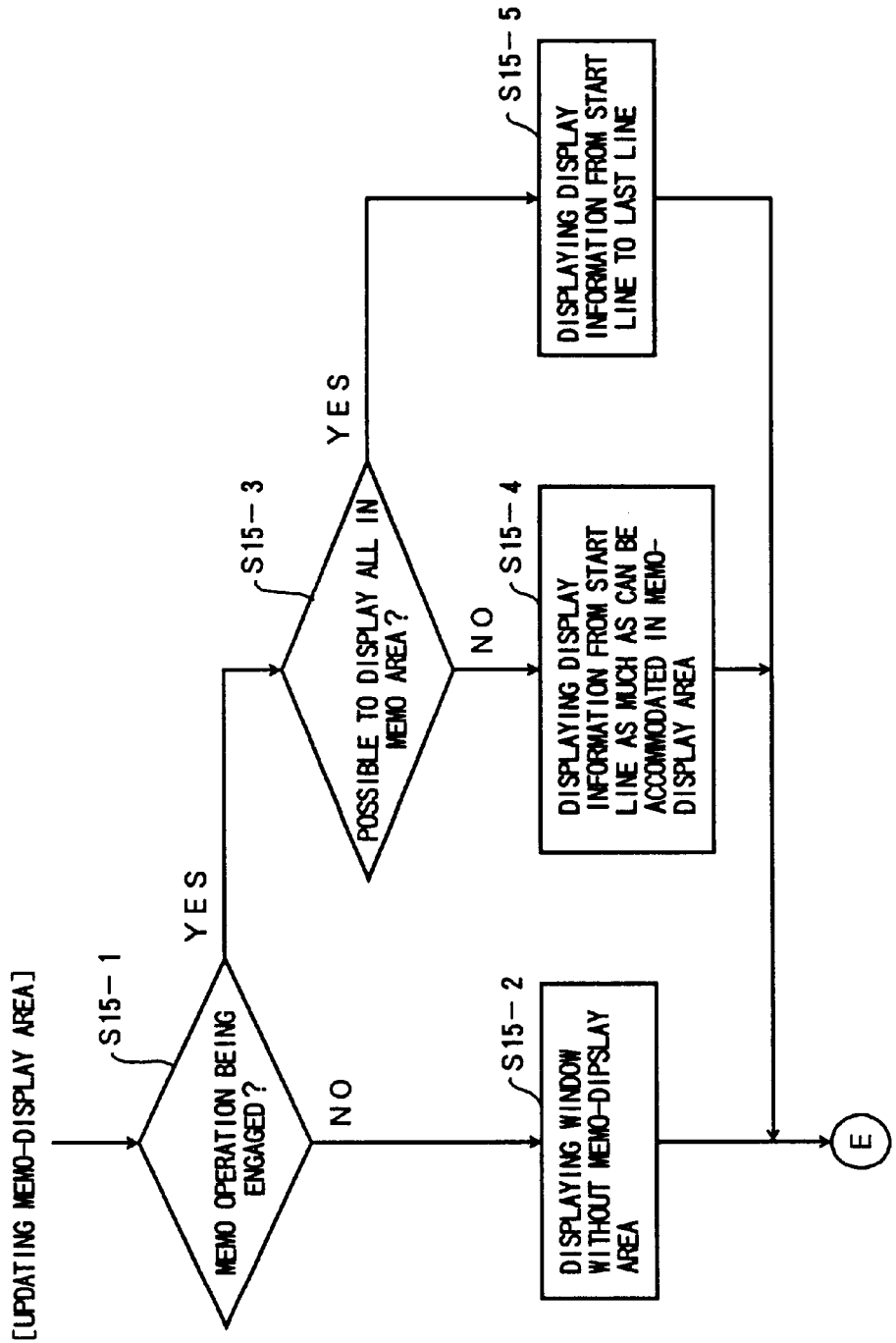
FIG. 37 is a flowchart of a process of updating a memo-display area performed by the terminal-emulator program according to the second embodiment of the present invention.

FIG. 37 is a flowchart of a process of updating the memo-display area performed by the terminal-emulator program according to the second embodiment of the present invention.

When display updating of the memo-display area WM is requested, the terminal-emulator program 201 checks whether a memo-display operation is being engaged (step S15-1).

If a memo-display operation is not being engaged, the window W0 is displayed without the memo-display area WM (step S15-2).

If it turns out at the step S15-1 that a memo-display operation is being engaged, a check is made whether all the display information stored in the memo-display previous-screen storage unit 205 can be displayed in the memo-display area WM (step S15-3).

If the step S15-3 finds that all the display information stored in the memo-display previous-screen storage unit 205 cannot be displayed in the memo-display area WM, a predetermined number of lines of the display information stored in the memo-display previous-screen storage unit 205 are displayed in the memo-display area WM by starting from a display start line specified in advance (step S15-4). Here, the predetermined number is the maximum number of lines which can be displayed in the memo-display area WM.

If the step S15-3 finds that all the display information can be displayed, the display information stored in the memo-display previous-screen storage unit 205 is displayed in the memo-display area WM by starting from the display start line and displaying up to the last line of the stored display information (step S15-5).

In what follows, a process of the terminal-emulator program 201 responding to a log-display-area scroll operation by an operator operating the input device 10 will be described.

Figure 38:
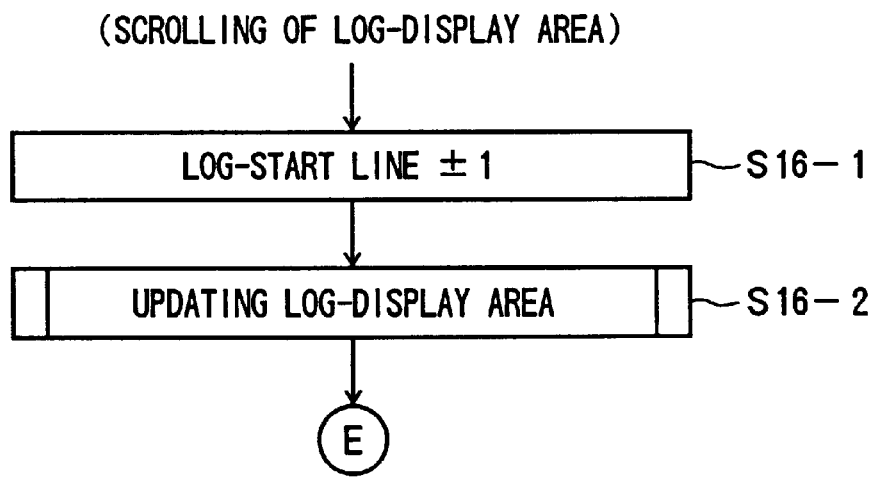
FIG. 38 is a flowchart of a process performed by the terminal-emulator program responding to a user operation on a log-display-area scroll bar according to the second embodiment of the present invention.

FIG. 38 is a flowchart of a process performed by the terminal-emulator program responding to a user operation on the log-display-area scroll bar according to the second embodiment of the present invention.

At a step S16-1, when an operator operates the input device 10 to scroll the log-display area WL, the terminal-emulator program 201 increases or decreases the line number of a display start line by one, depending on a direction of the scrolling operation.

At a step S16-2, the display information stored in the log-display previous-screen storage unit 204 is displayed by starting from the display start line set at the step S16-1. The displaying of the display information is performed according to the process of updating the log-display area as described in connection with FIG. 33.

In this manner, when an operator operates the input device 10 to scroll the log-display area WL, the start line is changed at the step S16-1 according to the scrolling operation so as to display the display information from the changed start line.

In the following, a process performed when an operator operating the input device 10 instructs erasure of display information from the log-display previous-screen storage unit 204 will be described.

Figure 39:
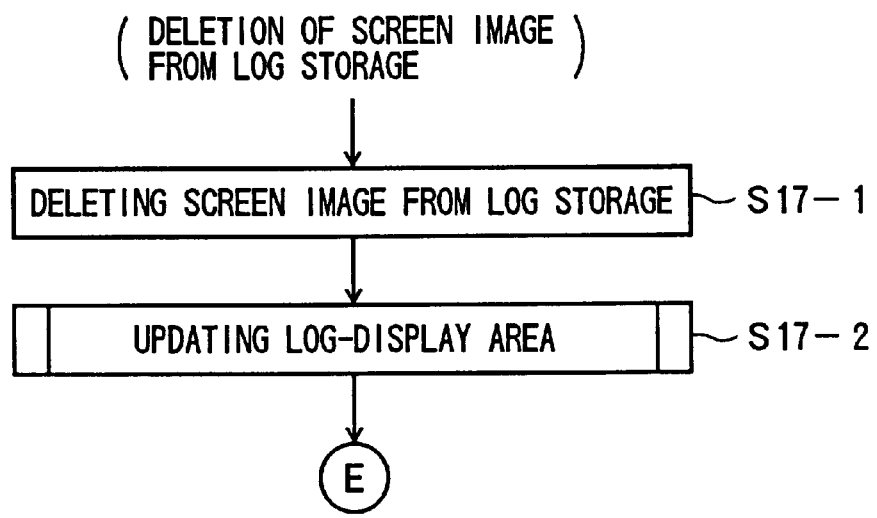
FIG. 39 is a flowchart of a process performed by the terminal-emulator program in response to an instruction to delete display information from a log-display previous-screen storage unit according to the second embodiment of the present invention.

FIG. 39 is a flowchart of a process performed by the terminal-emulator program in response to an instruction to delete display information from the log-display previous-screen storage unit 204 according to the second embodiment of the present invention.

At a step S17-1, the terminal-emulator program 201 erases the display information of an indicated screen from the log-display previous-screen storage unit 204 when an operator operating the input device 10 indicates erasure of the indicated screen.

At a step S17-2, the display information still stored in the log-display previous-screen storage unit 204 is displayed according to the procedure for updating the log-display area as described in connection with FIG. 33.

In what follows, a process of the terminal-emulator program 201 responding to a memo-display-area scroll operation by an operator operating the input device 10 will be described.

Figure 40:
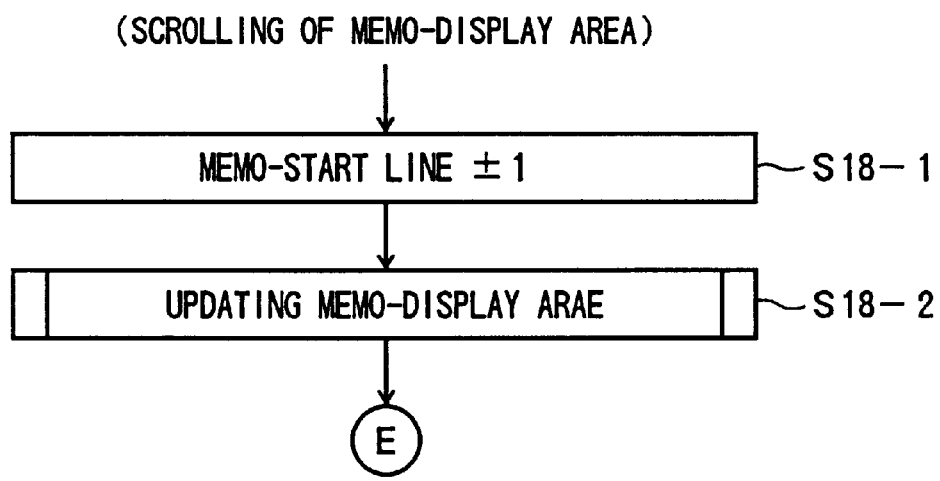
FIG. 40 is a flowchart of a process performed by the terminal-emulator program responding to a user operation on a memo-display-area scroll bar according to the second embodiment of the present invention.

FIG. 40 is a flowchart of a process performed by the terminal-emulator program responding to a user operation on the memo-display-area scroll bar according to the second embodiment of the present invention.

At a step S18-1, when an operator operates the input device 10 to scroll the memo-display area WM, the terminal-emulator program 201 increases or decreases the line number of a display start line by one, depending on a direction of the scrolling operation.

At a step S18-2, the display information stored in the memo-display previous-screen storage unit 205 is displayed by starting from the display start line set at the step S16-1. The displaying of the display information is performed according to the process of updating the memo-display area as described in connection with FIG. 37.

In this manner, when an operator operates the input device 10 to scroll the memo-display area WM, the start line is changed at the step S18-1 according to the scrolling operation so as to display the display information from the changed start line.

In the following, a process performed when an operator operating the input device 10 instructs erasure of display information from the memo-display previous-screen storage unit 205 will be described.

Figure 41:
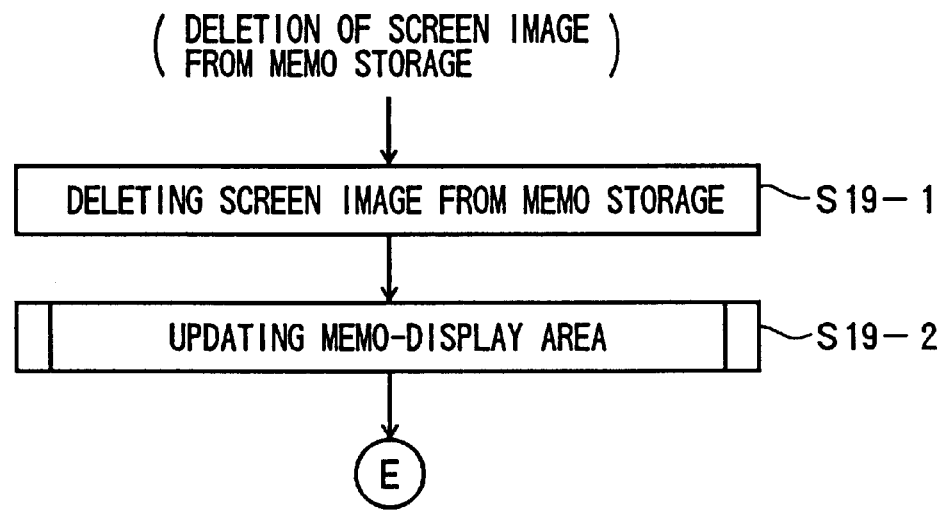
FIG. 41 is a flowchart of a process performed by the terminal-emulator program in response to an instruction to delete display information from the memo-display previous-screen storage unit according to the second embodiment of the present invention.

FIG. 41 is a flowchart of a process performed by the terminal-emulator program in response to an instruction to delete display information from the memo-display previous-screen storage unit 205 according to the second embodiment of the present invention.

At a step S19-1, the terminal-emulator program 201 erases the display information of an indicated screen from the memo-display previous-screen storage unit 205 when an operator operating the input device 10 indicates erasure of the indicated screen.

At a step S19-2, the display information still stored in the memo-display previous-screen storage unit 205 is displayed according to the procedure for updating the memo-display area as described in connection with FIG. 37.

In what follows, a process of the terminal-emulator program 201 when an operator operating the input device 10 gives an instruction to shift display information from the log-display area WL to the memo-display area WM will be described.

Figure 42:
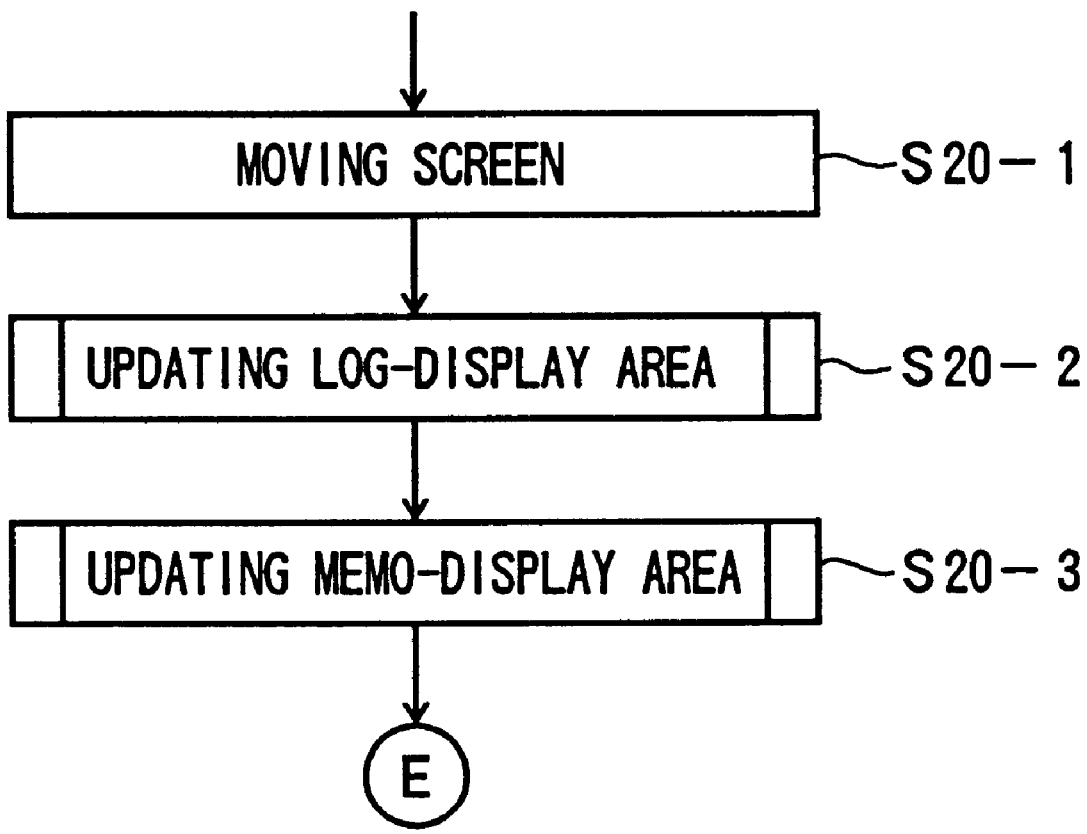
FIG. 42 is a flowchart of a process performed by the terminal-emulator program responding to an instruction by an operator to change a log-display screen to a memo-display screen according to the second embodiment of the present invention.

FIG. 42 is a flowchart of a process performed by the terminal-emulator program responding to an instruction by an operator to change a log-display screen to a memo-display screen according to the second embodiment of the present invention.

At a step S20-1, the terminal-emulator program 201 moves an indicated screen from the log-display previous-screen storage unit 204 to the memo-display previous-screen storage unit 205 when an operator operating the input device 10 indicates a move of the indicated screen from the log-display area WL to the memo-display area WM.

At a step S20-2, display information stored in the log-display previous-screen storage unit 204 having the indicated screen removed therefrom is displayed in the log-display area WL according to the procedure for updating the log-display area as described in connection with FIG. 33.

At a step S20-3, display information stored in the memo-display previous-screen storage unit 205 having the indicated screen added thereto is displayed in the memo-display area WM according to the procedure for updating the memo-display area as described in connection with FIG. 37.

In this manner, display information is moved from the log-display area WL to the memo-display area WM.

FIGS. 43A through 43D are illustrative drawings for explaining operations of the terminal-emulator program when screen images are shifted according to the second embodiment of the present invention. FIGS. 24A and 24B respectively show the log-display previous-screen storage unit 204 and the memo-display previous-screen storage unit 205 before the shifting of screen images. FIGS. 24C and 24D respectively show the log-display previous-screen storage unit 204 and the memo-display previous-screen storage unit 205 after the shifting of screen images.

As shown in FIG. 43A, the log-display previous-screen storage unit 204 includes previous-screen areas L1 through LLN, which store screen images A0 through G, respectively. As shown in FIG. 43B, the memo-display previous-screen storage unit 205 includes previous-screen areas M1 through MMN, which store screen images P0 through V, respectively.

The following description will be given with regard to a case in which the screen image C stored in the previous-screen area LSRC of the log-display previous-screen storage unit 204 is moved to the previous-screen area MDST of the memo-display previous-screen storage unit 205.

The screen image C stored in the previous-screen area LSRC of the log-display previous-screen storage unit 204 is read. The screen images D through G stored in the previous-screen areas LSRC+1 through LLN, respectively, are shifted by one area so as to be newly stored in the previous-screen areas LSRC through LLN−1, respectively (see FIG. 43A and FIG. 43C).

Then, the screen images Q through V stored in the previous-screen areas MDST through MMN of the memo-display previous-screen storage unit 205, respectively, are shifted by one area so as to be newly stored in the previous-screen areas MDST+1 through MMN+1, respectively. Finally, the screen image C read from the log-display previous-screen storage unit 204 is stored in the previous-screen area MDST.

In this manner, the screen image C stored in the log-display previous-screen storage unit 204 is moved to the previous-screen area MDST of the memo-display previous-screen storage unit 205 as shown in FIGS. 43C and 43D.

In the following, relations between the log-display previous-screen storage unit 204, the memo-display previous-screen storage unit 205, and the extension area W2 will be described.

Figure 44:
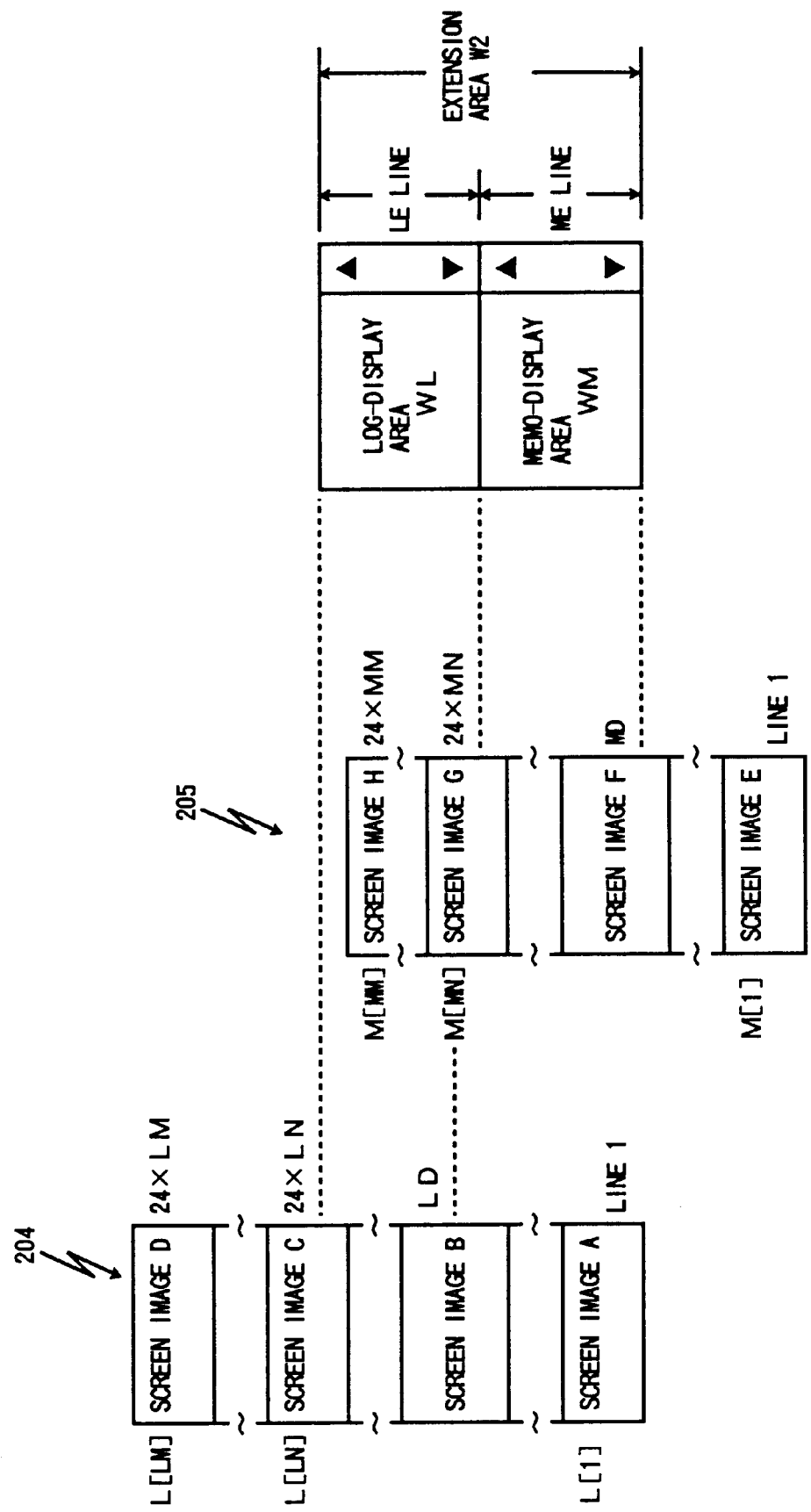
FIG. 44 is an illustrative drawing showing relations between the log-display previous-screen storage unit, the memo-display previous-screen storage unit, and the extension area according to the second embodiment of the present invention.

FIG. 44 is an illustrative drawing showing relations between the log-display previous-screen storage unit, the memo-display previous-screen storage unit, and the extension area according to the second embodiment of the present invention.

As shown in FIG. 44, the log-display previous-screen storage unit 204 includes previous-screen areas L1 through LLM, which store screen images A through D, respectively. Also, the memo-display previous-screen storage unit 205 includes previous-screen areas M1 through MMM, which store screen images E through H, respectively.

The log-display area WL of the extension area W2 displays LE lines of the display information (i.e., screen images A through D) stored in the log-display previous-screen storage unit 204 wherein the number LE is set in the log-display area WL in advance. The memo-display area WM of the extension area W2 displays ME lines of the display information (i.e., screen images E through H) stored in the memo-display previous-screen storage unit 205 wherein the number ME is set in the memo-display area WM in advance.

In the following, invoice processing based on the terminal-emulator program according to the first or second embodiment of the present invention will be described.

Figure 45:
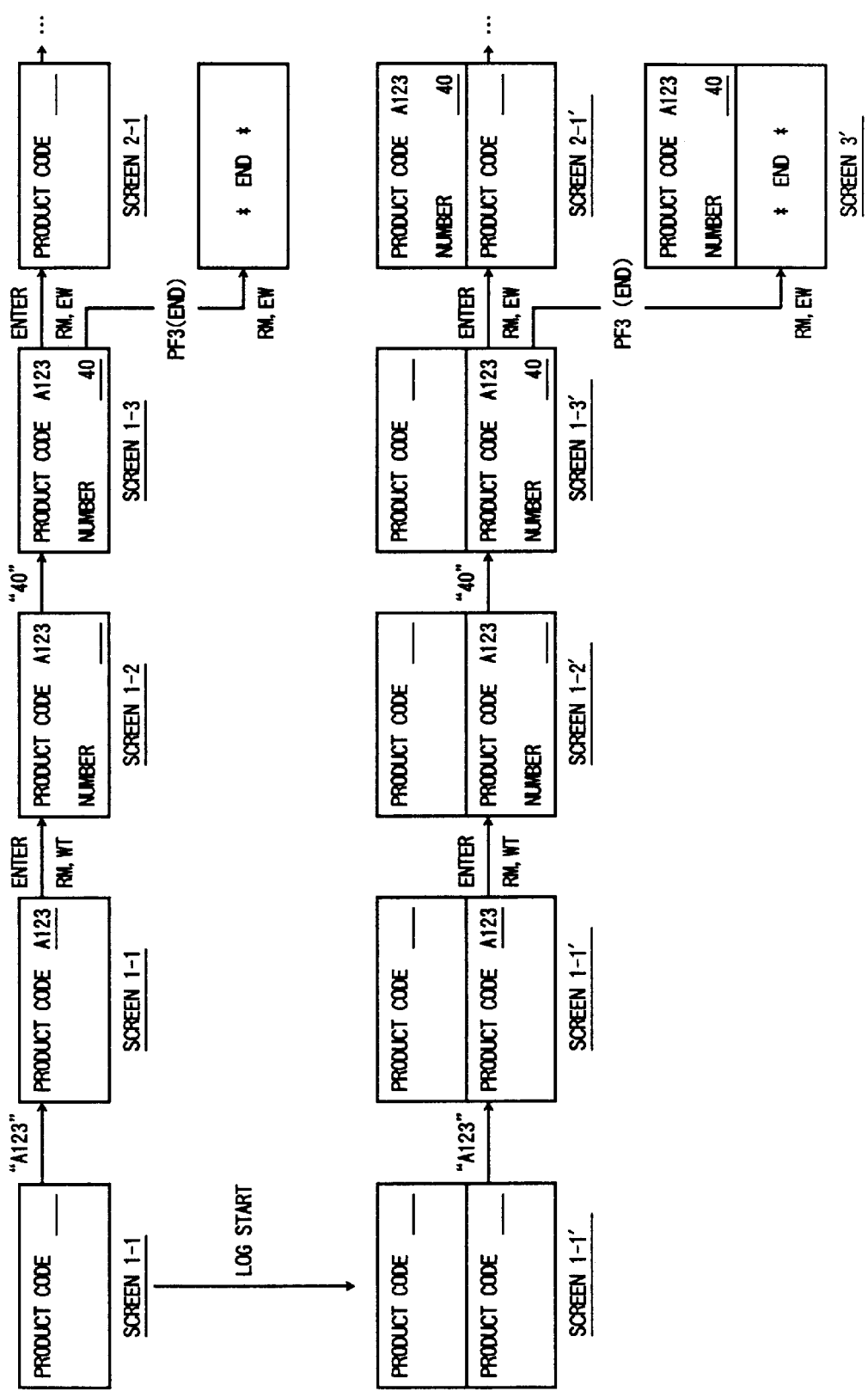
FIG. 45 is an illustrative drawing showing a first example of invoice processing based on the terminal-emulator program according to the first or second embodiment of the present invention.

FIG. 45 is an illustrative drawing showing a first example of invoice processing based on the terminal-emulator program according to the first or second embodiment of the present invention.

When the terminal device 101 starts to run the terminal-emulator program, display information about a screen 1-1 of FIG. 45, for example, is supplied form the host computer 2. The supplied display information is displayed on the display device 9 of the terminal device 101. If a log-display mode is not selected, data entry is started with the screen 1-1 being displayed in the normal area.

On the screen 1-1 displayed in the normal area, a product code "A123" is typed in. When an enter key is pressed, the entered product code "A123" is transmitted to the host computer 2. After relevant display information is updated in the host computer 2, the host computer 2 supplies display information about a next screen 1-2 so as to prompt data entry of the number of products.

When the number of products "40" is typed in on the screen 1-2, the product code and the number of products are displayed as shown in a screen 1-3. When the enter key is pressed, the number of products "40" is supplied to the host computer 2. After relevant display information is updated in the host computer 2, the host computer 2 supplies display information about a next screen, so that a screen 2-1 is now displayed. Alternatively, if a key PF3 is pressed while the screen 1-3 is displayed, the number of products "40" is transmitted to the host computer 2 to update the host computer 2, and the invoice processing comes to an end with display of an end-message screen.

If a logging-start request is made while the screen 1-1 is displayed, a screen 1-1' is newly displayed, showing the normal area W1 in a lower half and the extension area W2 in an upper half.

On the screen 1-1', a product code "A123" is typed in. When an enter key is pressed, the entered product code "A123" is transmitted to the host computer 2. After relevant display information is updated in the host computer 2, the host computer 2 supplies display information as shown in the normal area W1 of a screen 1-2' so as to prompt data entry of the number of products.

When the number of products "40" is typed in on the screen 1-2', the product code and the number of products are displayed as shown in a screen 1-3'. When the enter key is pressed, the number of products "40" is supplied to the host computer 2. After relevant display information is updated in the host computer 2, the host computer 2 supplies next display information, so that a screen 2-1' is now displayed. At this point of time, the normal area W1 of the screen 1-3' showing the product code "A123" and the number of products "40" as supplied data entries is stored and displayed in the extension area W2, and the normal area W1 displays the screen just supplied from the host computer 2.

Alternatively, if the key PF3 is pressed while the screen 1-3' is displayed, the number of products "40" is transmitted to the host computer 2 to update the host computer 2, and the invoice processing comes to an end with display of a screen 3. In this case, the normal area W1 of the screen 1-3' showing the product code "A123" and the number of products "40" as supplied data entries is displayed in the extension area W2.

In this manner, the logging operation displays previous display information in the extension area W2 while displaying the newest display information in the normal area W1. In such arrangement, data entry can be made in the normal area W1 with respect to a product code and the number of products by referring to the display information displayed in the extension area W2. This helps to make reliable data entry.

The above example has been provided with regard to a case in which a displayed screen is a data-entry screen. It is apparent, however, that the displayed screen may be a help screen, for example.

Figure 46:
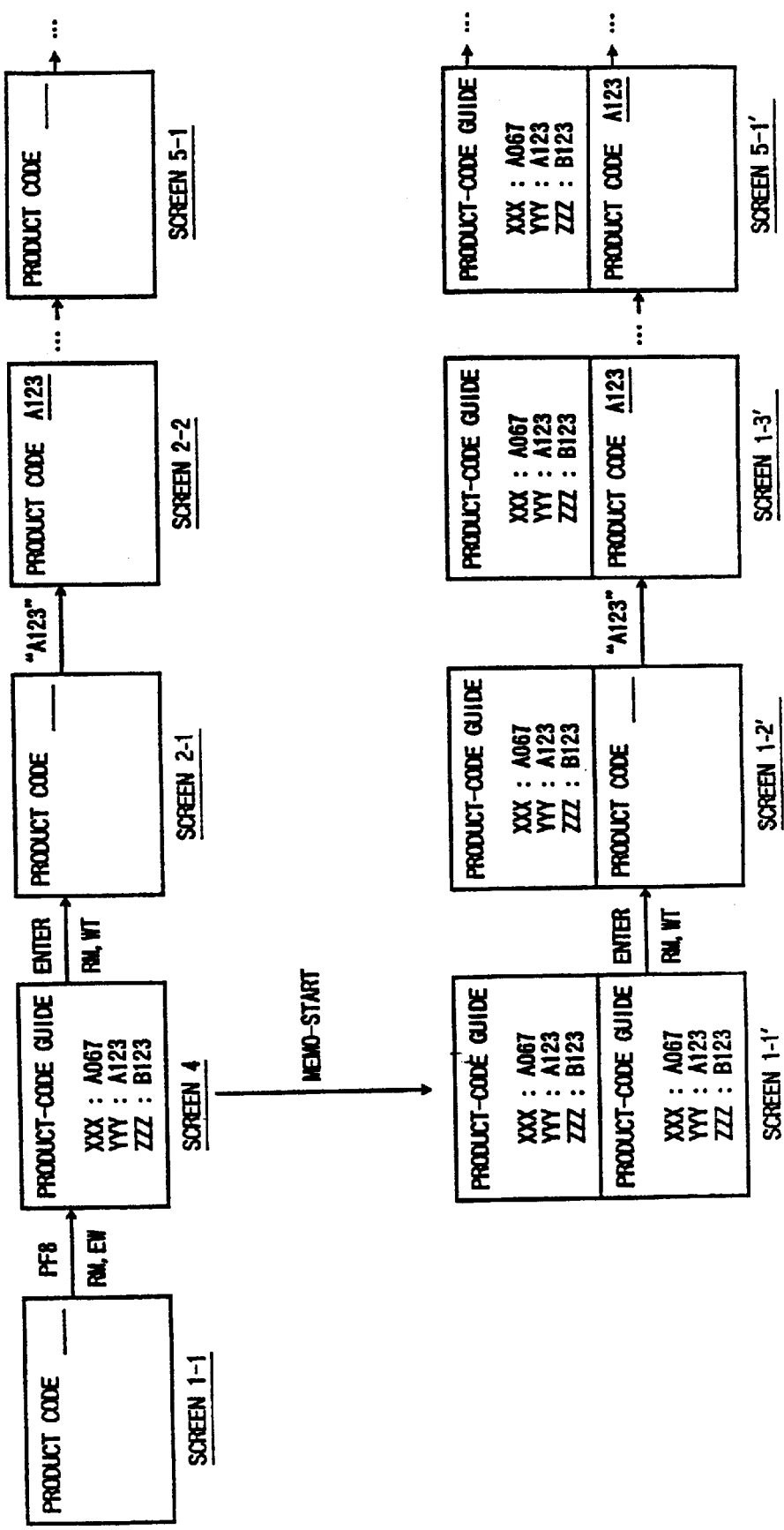
FIG. 46 is an illustrative drawing showing a second example of invoice processing based on the terminal-emulator program according to the first or second embodiment of the present invention.

FIG. 46 is an illustrative drawing showing a second example of invoice processing based on the terminal-emulator program according to the first or second embodiment of the present invention.

When the terminal device 101 starts to run the terminal-emulator program, display information about a screen 1-1 of FIG. 46, for example, is supplied form the host computer 2. The supplied display information is displayed on the display device 9 of the terminal device 101. Pressing a key PF8 at this point of time prompts the host computer 2 to supply product-code-guide information, so that a screen 4 is displayed.

If an enter key is pressed without selecting a memo-display mode, a screen 2-1 is then displayed in the normal area W1.

On the screen 2-1 displayed in the normal area, a product code "A123" is typed in as shown in a screen 2-2. When an enter key is pressed, the entered product code "A123" is transmitted to the host computer 2. After relevant display information is updated in the host computer 2, the host computer 2 supplies display information about a next screen 5-1.

If a memo-display-start request is made while the screen 4 is displayed, a screen 1-1' is displayed to show the product-code-guide information both in the normal area W1 in a lower half and in the extension area W2 in an upper half.

Pressing the enter key on the screen 1-1' prompts the host computer 2 to supply a data-entry screen. As a result, the extension area W2 in the upper half displays the product-code-guide information, and the normal area W1 in the lower half displays a product-code-entry screen. This is shown as a screen 1-2'. On the product-code-entry screen of the screen 1-2', a product code "A123" is typed in. When an enter key is pressed, the entered product code "A123" is transmitted to the host computer 2. After relevant display information is updated in the host computer 2, the host computer 2 supplies display information about a next product-code-entry screen as shown in the normal area W1 of a screen 5-1'.

While the normal area W1 is updated to show the new screen, the product-code-guide information shown in the extension area W2 is not changed since it is displayed as a memo. This allows product codes to be entered in the normal area W1 by referring to the product-code-guide information displayed in the extension area W2, thereby helping to make reliable data entry.

It should be noted that the present invention is applicable to cases in which the product-code-entry screen described above is a different data-entry screen such as a command-entry screen.

Figure 47:
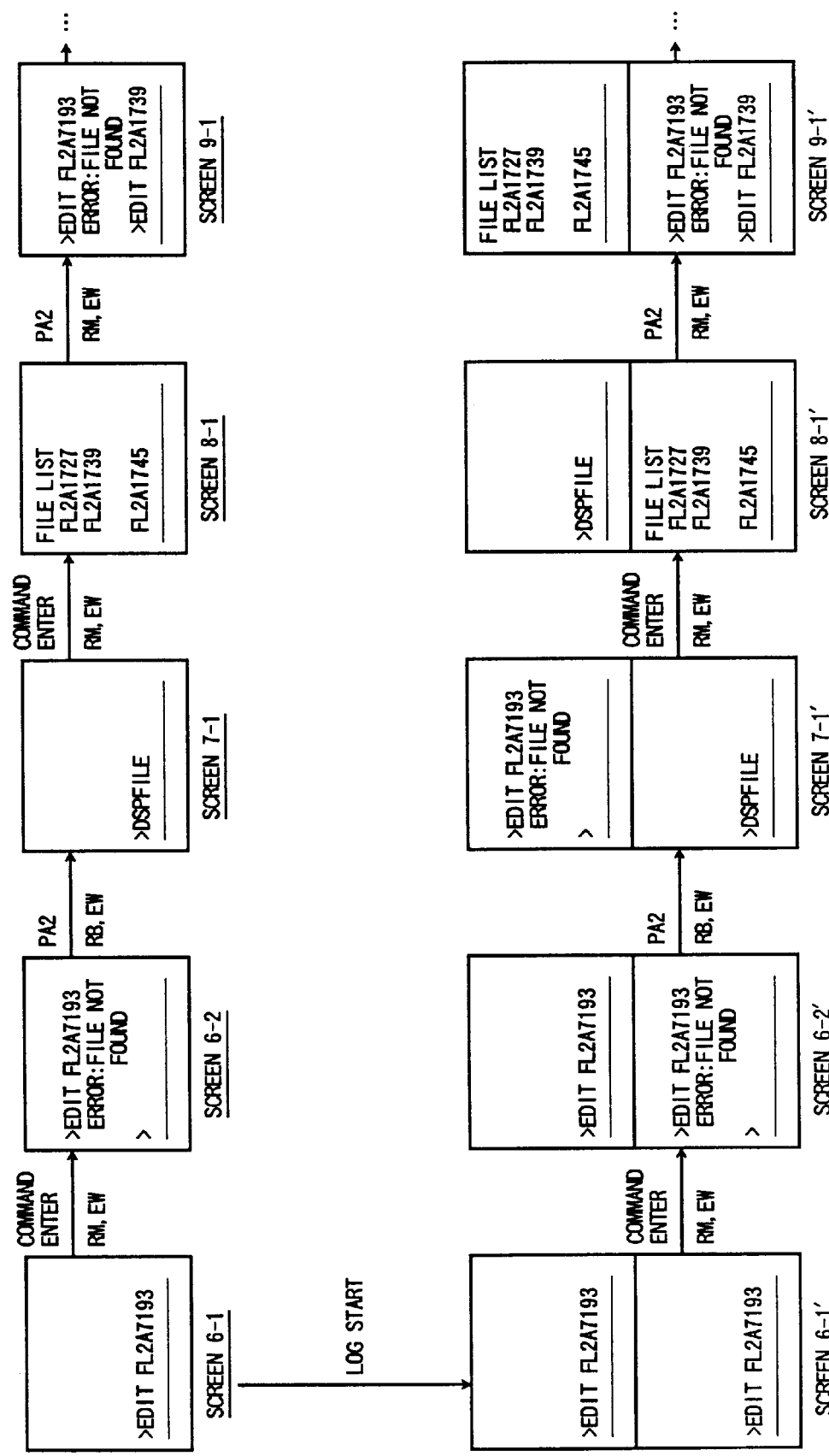
FIG. 47 is an illustrative drawing showing a third example of invoice processing based on the terminal-emulator program according to the first or second embodiment of the present invention.

FIG. 47 is an illustrative drawing showing a third example of invoice processing based on the terminal-emulator program according to the first or second embodiment of the present invention.

When the terminal device 101 starts to run the terminal-emulator program, display information about a screen 6-1 of FIG. 47, for example, is supplied form the host computer 2. The supplied display information is displayed on the display device 9 of the terminal device 101. If a log-display mode is not selected, data entry is started with the screen 6-1 being displayed in the normal area.

When an enter key is pressed while the screen 6-1 is displayed in the normal area, a command which was typed in on the command-entry screen is supplied to the host computer 2. In response, the host computer 2 attends to processing according to the supplied command. The host computer 2 sends a result of the processing to the terminal device 101. As shown in a screen 6-2, the result of the processing may inform that a file specified by the file name entered in the screen 6-1 was not found, for example.

Pressing a key PA2 on the screen 6-2 results in the host computer 2 supplying an interrupt screen. The supplied interrupt screen is displayed as shown in a screen 7-1. A command DSPFILE for listing file names is typed in on the screen 7-1. Pressing the enter key then prompts the host computer 2 to provide a file-list screen 8-1.

After checking the list of files on the file-list screen 8-1, the key PA2 is pressed again to return to the command-input screen the same as that of the screen 6-2. A correct file name which was checked on the file-list screen 8-1 is then entered as shown in a screen 9-1.

If a logging-start request is made while the screen 6-1 is displayed, a screen 6-1' is newly displayed, showing the normal area W1 in a lower half and the extension area W2 in an upper half.

When the enter key is pressed on the screen 6-1', a command entered is supplied to the host computer 2, so that the host computer 2 attends to processing according to the supplied command. The host computer 2 sends a result of the processing to the terminal device 101. As shown in a screen 6-2', the result of the processing may inform that a file specified by the file name entered in the screen 6-1 was not found, for example.

Pressing a key PA2 on the screen 6-2' results in the host computer 2 supplying an interrupt screen. The supplied interrupt screen is displayed in the normal area W1 as shown in a screen 7-1'. At this point of time, the screen on which the command is entered and the result of the processing is displayed is shown in the extension area W2.

A command DSPFILE for listing file names is typed in the normal area W1. Pressing the enter key then prompts the host computer 2 to provide a file-list screen 8-1', which is displayed in the normal area W1. What was shown in the normal area W1 on the screen 7-1' is now shown in the extension area W2.

Pressing the key PA2 on the screen 8-1' results in the original command-entry screen returning in the normal area W1 as shown in a screen 9-1'. The extension area W2 shows a list of file names that was shown in the normal area W1 on the screen 8-1'.

Since a file name can be entered in the command-entry screen displayed in the normal area W1 while the file list shown in the extension area W2 is referred to. This helps to insure correct entry of a file name.

In the first embodiment, display information shown in the normal area W1 is stored in the previous-screen storage unit 131 as described in connection with FIG. 8. Alternatively, display information stored in the screen buffer 16 may be stored as current display information in the previous-screen storage unit 131 as in the second embodiment.

In the second embodiment, display information stored in the screen buffer 16 is stored as current display information in the previous-screen storage unit 131 as described in connection with FIG. 28. Alternatively, display information displayed in the normal area W1 may be stored in the previous-screen storage unit 131 as in the first embodiment.

Further, the present invention is not limited to these embodiments, but various variations and modifications may be made without departing from the scope of the present invention.

The present application is based on Japanese priority application No. 10-190618 filed on Jul. 6, 1998, with the Japanese Patent Office, the entire contents of which are hereby incorporated by reference.

What is claimed is:

1. A method of controlling a terminal device which receives display information from a host device and displays the display information on a screen, said method comprising:

displaying newest display information supplied from the host device in a predetermined area of the screen;

displaying previous display information in a remaining area of the screen, the previous display information having been supplied from the host device and once displayed as the newest display information in said predetermined area, the previous display information including a series of exchanges of data supplied from the terminal device to the host device and data supplied from the host device to the terminal device, and being updated when a command for rewriting of an entire screen of the newest display information is received from the host device, wherein the remaining area includes a plurality of subareas, each of which is dedicated for displaying of the previous display information;

selecting display information;

displaying the selected display information in one of the subareas;

deleting, from the screen, oldest display information among the previous display information except for the selected display information when the newest display information arrives from the host device;

arranging the subareas in a chronological order, except for said one of the subareas; and shifting the previous display information in the chronologically arranged subareas from one subarea to a next subarea toward a chronologically older direction each time the newest display information arrives from the host device.

2. The method as claimed in claim 1, further comprising deleting oldest display information among the previous display information displayed in the subareas when the newest display information arrives from the host device.

3. The method as claimed in claim 2, further comprising:

arranging the subareas in a chronological order; and shifting the previous display information in the subareas from one subarea to a next subarea toward a chronologically older direction each time the newest display information arrives from the host device.

4. The method as claimed in claim 1, further comprising dividing the screen into a plurality of areas, said dividing being performed upon a request from a user operating the terminal device.

5. A terminal device which receives display information from a host device and displays the display information on a screen, comprising:

a first memory which stores newest display information supplied from the host device;

a second memory which stores previous display information that has been supplied from the host device and once stored as the newest display information in said first memory; and a control unit which divides the screen into a plurality of areas, and displays the newest display information in a predetermined one of the areas and the previous display information in one or more remaining areas, the previous display information including a series of exchanges of data supplied from the terminal device to the host device and data supplied from the host device to the terminal device, and being updated when a command for rewriting of an entire screen of the newest display information is received from the host device, wherein said control unit keeps selected display information in said second memory, and displays the selected display information in one of the one or more remaining areas, said control unit deleting oldest display information among the previous display information except for the selected display information from said second memory when the newest display information arrives from the host device, and wherein said control unit arranges the one or more remaining areas in a chronological order, except for said one of the one or more remaining areas, and shifts the previous display information in the chronologically arranged areas from one area to a next area toward a chronologically older direction each time the newest display information arrives from the host device.

6. The device as claimed in claim 5, wherein said control unit deletes oldest display information among the previous display information stored in said second memory when the newest display information arrives from the host device.

7. The device as claimed in claim 6, wherein said control unit arranges the one or more remaining areas in a chronological order, and shifts the previous display information in the one or more remaining areas from one area to a next area toward a chronologically older direction each time the newest display information arrives from the host device.

8. A computer-readable medium having a program embodied therein for controlling a terminal device which receives display information from a host device and displays the display information on a screen, said program comprising:

means for displaying newest display information supplied from the host device in a predetermined area of the screen;

means for displaying previous display information in one or more remaining areas of the screen, the previous display information having been supplied from the host device and once displayed as the newest display information in said predetermined area, the previous display information including a series of exchanges of data supplied from the terminal device to the host device and data supplied from the host device to the terminal device, and being updated when a command for rewriting of an entire screen of the newest display information is received from the host device;

means for selecting display information;

means for displaying the selected display information in one of the one or more remaining areas;

means for deleting, from the screen, oldest display information among the previous display information except for the selected display information when the newest display information arrives from the host device;

means for arranging the one or more remaining areas in a chronological order, except for said one of the one or more remaining areas; and means for shifting the previous display information in the chronologically arranged areas from one area to a next area toward a chronologically older direction each time the newest display information arrives from the host device.

9. The computer-readable medium as claimed in claim 8, wherein said program further comprises means for deleting oldest display information among the previous display information displayed in the one or more remaining areas when the newest display information arrives from the host device.

10. The computer-readable medium as claimed in claim 9, wherein said program further comprises:

means for arranging the one or more remaining areas in a chronological order; and means for shifting the previous display information in the one or more remaining areas from one area to a next area toward a chronologically older direction each time the newest display information arrives from the host device.

* * * * *

UNITED STATES PATENT AND TRADEMARK OFFICE
CERTIFICATE OF CORRECTION

PATENT NO. : 6,593,946 B1 Page 1 of 1
DATED : July 15, 2003
INVENTOR(S) : Kazushi Yoda It is certified that error appears in the above-identified patent and that said Letters Patent is hereby corrected as shown below:

<u>Title page,</u>
Item [56], References Cited, FOREIGN PATENT DOCUMENTS, insert:

-- JP    4-157497    05/1992
   JP    5-341771    12/1993 --

Signed and Sealed this

Eighth Day of June, 2004

JON W. DUDAS
*Acting Director of the United States Patent and Trademark Office*